(12) United States Patent
D'Anjou et al.

(10) Patent No.: US 12,523,373 B1
(45) Date of Patent: Jan. 13, 2026

(54) METHOD AND APPARATUS FOR THERMAL REMEDIATION OF CONTAMINANT IMPACTED MEDIA WITH HYBRID ENERGY SYSTEMS

(71) Applicants: Robert D'Anjou, Long Beach, CA (US); Michael Dodson, Longview, WA (US); Allen Swift, Gig Harbor, WA (US); James Keegan, Temecula, CA (US)

(72) Inventors: Robert D'Anjou, Long Beach, CA (US); Michael Dodson, Longview, WA (US); Allen Swift, Gig Harbor, WA (US); James Keegan, Temecula, CA (US)

( * ) Notice: Subject to any disclaimer, the term of this patent is extended or adjusted under 35 U.S.C. 154(b) by 262 days.

(21) Appl. No.: 18/342,659

(22) Filed: Jun. 27, 2023

(51) Int. Cl.
*B09C 1/06* (2006.01)
*F23G 5/10* (2006.01)

(52) U.S. Cl.
CPC ............ *F23G 5/10* (2013.01); *F23G 2204/20* (2013.01); *F23G 2209/24* (2013.01)

(58) Field of Classification Search
CPC .. F23G 5/10; B09C 1/06; B09C 1/062; B09C 1/065; B09C 2101/00; E02D 3/11
See application file for complete search history.

(56) References Cited

U.S. PATENT DOCUMENTS 3,185,201 A * 5/1965 Herbst .................. F24H 9/2085
126/110 E
4,670,634 A 6/1987 Bridges et al.
4,770,629 A 9/1988 Bohan, Jr.
4,984,594 A 1/1991 Vinegar et al.
(Continued)

OTHER PUBLICATIONS

Fisher, Angela, Life-Cycle Assessment of In Situ Thermal Remediation, Remediation Journal, vol. 22, Issue 4, pp. 75-92 (2012) https://doi.org/10.1002/rem.21331, U.S.

(Continued)

*Primary Examiner* — Amber R Anderson
*Assistant Examiner* — Stacy N Lawson
(74) *Attorney, Agent, or Firm* — Elizabeth Reilly; Patentpending, PLLC

(57) ABSTRACT

A method and device for thermally remediating contaminant impacted media whereby heat and electricity are cogenerated by an integrated fuel combustor and semiconductor thermoelectric generation devices and applied as multiform energy to an individual, or multiple connected heating assemblies to generate and thermally conduct heat to contaminant impacted media. A hybrid energy thermal remediation system employs semiconductor thermoelectric generation devices to transform temperature differences created in the hybrid energy thermal remediation system by fuel combustion into electrical energy being reapplied as electricity to electrically resistive heating unit(s) to power auxiliary equipment and devices associated with the hybrid energy thermal remediation system, or to generate additional fuel through electrolysis. The hybrid energy thermal remediation system includes an energy co-generation assembly with integrated fuel combustor and semiconductor thermoelectric generating device(s) and heating assembly with a thermally conductive outer conduit in contact with the contaminant impacted media.

13 Claims, 16 Drawing Sheets

(56) References Cited

U.S. PATENT DOCUMENTS

| | | | |
|---|---|---|---|
| 5,190,405 | A | 3/1993 | Vinegar et al. |
| 5,193,934 | A | 3/1993 | Johnson et al. |
| 5,318,116 | A | 6/1994 | Vinegar et al. |
| 5,449,251 | A | 9/1995 | Daily et al. |
| 6,485,232 | B1 | 11/2002 | Vinegar et al. |
| 6,632,047 | B2 | 10/2003 | Vinegar et al. |
| 7,618,215 | B2 | 11/2009 | Haemers et al. |
| 8,562,252 | B2 | 10/2013 | Baker et al. |
| 9,718,103 | B2 | 8/2017 | Haemers |
| 10,201,042 | B1 | 2/2019 | Oberle et al. |
| 10,688,545 | B2 | 6/2020 | Flanders et al. |
| 2015/0010359 | A1* | 1/2015 | Geckeler ............... F23D 14/84 405/128.85 |
| 2020/0353520 | A1* | 11/2020 | Seeman ................. E21B 36/04 |
| 2021/0259054 | A1 | 8/2021 | Small et al. |

OTHER PUBLICATIONS

Jaziri, et al., A Comprehensive View of Thermoelectric Generators:Technologies and Common Applications, Energy Reports, 6, pp. 264-287(2020) https://doi.org/10.1016j.egyr.2019.12.011, U.S.

Johnson, et al., Critical Evaluation of State-of-the-Art In Situ Thermal Treatment Technologies for DNAPL Source Zone Treatment, Published by Environmental Security Technology Certification Program, ESTCP Project ER-0314, May 2009, U.S. ESTCP, https://apps.dtic.mil/sti/pdfs/ADA520637.pdf.

J. LaGrandeur, Automotive Waste Heat Conversion to Electric Power Using Skutterudites, TAGS, PbTe and Bi2Te3, Published by Diesel Engine-Efficiency and Emissions Research (DEER) Conference, Detroit, MI, (2004), International Conference on Thermoelectrics, pp. 343-348) Published by IEEE.

Lemming, et al., Optimizing the Environmental Performance of In Situ Thermal Remediation Technologies Using Life Cycle Assessment, Groundwater Monitoring & Remediation, vol. 33, Issue 3, pp. 38-51 (May 13, 2013), https://doi.org/10.1111/gwr.12014. U.S.

Mamur, et al., Thermoelectric Generators Act As Renewable Energy Sources, Cleaner Materials, 2, 100030 (2021) https://doi.org/10.1016/j.clema.2021.100030, U.S., https://doi.org//10.1016/ j.clema.2021.100030.

Mostafavi, et al., Modeling and Fabricating A Prototype of a Thermoelectric Generator System of Heat Energy Recovery From Hot Exhaust Gases and Evaluating the Effects of Important System Parameters, Applied Thermal Engineering, vol. 132, 5 (Mar. 2018) pp. 624-636, https://doi.org/10.1016/j.applthermaleng.2018.01.018, U.S.

Snyder, et al, Complex Thermoelectric Materials, Nature Materials, vol. 7, pp. 105-114 (Feb. 2008), Nature Publishing Group, U.S. www.nature.com/naturematerials, https://doi.org/10.1038/nmat2090.

U.S. Army Corps of Engineers, (USACE) Design: In Situ Thermal Remediation, Engineer Manual, EM 1110-1-4015,28 Aug. 28, 2009, Prepared by the U.S. Army Corps of Engineers, Washington, D.C.

U.S. Environmental Protection Agency, (USEPA) Engineering Paper, In Situ Thermal Treatment Technologies: Lessons Learned, https://www.epa.gov/remedytech/situ-thermal-treatment-technologies-lessons-learned.

U.S. Environmental Protection Agency, (USEPA) Superfund Sites With Proposed, Designed, or Implemented IST Technology, Technology News & Trends, pp. 1-11 (Oct. 2012), EPA 542-N-12-005, Issue, 61, clu-in.org/newsletters. U.S.

Vidonish, et al., Thermal Treatment of Hydrocarbon-Impacted Soils: A Review of Technology Innovation for Sustainable Remediation, Engineering 2 pp. 426-437 (2016), https://dx.doi.org/101016/J.ENG.2016.04.005, Published by Elsevier, Ltd, U.S.

Vinegar, et al., In Situ Thermal Desorption (ISTD) of PCBs. In proceedings of HazWaste World/Superfund XVIII, Washington, D.C. December.

Yang, J., Potential Applications of Thermoelectric Waste Heat Recovery in the Automotive Industry, IEEE, pp. 170-174, (Oct. 24, 2005), International Conference on Thermoelectrics, DOI:10:1109/CT.2005.1519911.

Yuan, et al., Improving the Performance of a Screen-Printed Micro-Radioisotope Thermoelectric Generator Through Stacking Integration, Journal of Power Sources, vol. 414, pp. 509-516 (Feb. 28, 2019), Published by Science Direct, U.S., https://doi.org/10.1016/j.jpowsour.2019.01.040, U.S.

Zhou, et al., Harvesting Wasted Heat In A Microprocessor Using Thermoelectric Generators: Modeling, Analysis, and Measurement, Published by IEEE, U.S., 2008 Design, Automation and Test in Europe, Conference Mar. 10-14, 2008, pp. 98-103.

Horst, et al., In Situ Thermal Remediation for Source Areas:Technology Advances and a Review of the Market from 1988-2020. Groundwater Monitoring & Remediation, 41 (1), 17-31. readable copy available, at https://doiorg/10.1111/gwmr.12424.

* cited by examiner

100 ⬎

- 101 identifying a volume of contaminated impacted media for remediation
- 102 providing a hybrid energy thermal remediation system for remediating the volume of contaminated impacted media
- 103 producing a cylindrical opening within the volume of the contaminant impacted media
- 104 installing the any one of the media heating assembly device within the cylindrical opening
- 105 positioning the one or more external temperature monitoring thermocouples within the annulus space
- 106 sealing the annulus space with heat tolerant thermally conductive annulus fill securing the outer thermally conductive heating conduit
- 107 positioning the one or more electrically resistive heating units and the heat tolerant electrically conductive low resistively electrical cable and connections within the annulus space between the inner combustion air conduit and outer thermally conductive heating conduit
- 108 fluidly connecting the media heating assembly device to the energy co-generation assembly housing thereby sealing the proximal end of the outer thermally conductive heating conduit thereby providing a fluid connection between the inner combustion air conduit and the energy co-genertion assembly housing
- 109 connecting the one or more electrical resistive heating units of the media heating assembly device to electrical connections and programmable logic controller actuating the distribution of electrical energy from the corresponding energy co-generation assemblies to the one or more electrical resistive heating units
- 110 managing electrical energy distribution to the one or more electrical resistive heating units temperature setpoints and temperature readings from the one or more external temperature monitoring thermocouples
- 111 introducing combustible fuel from the centralized blended fuel supply into a fuel combustor being fluidly connected to the inner chamber of the integrated thermoelectric generation housing

112 igniting the combustible fuel with the fuel ignitor causing a combustion reaction producing fuel combustion heat providing a sustained source of heat energy and combustion byproducts being introduced into the identified volume of contaminant impacted media

113 generating an induced draft flow by way of the one or more centralized combustion air blowers being fluidly connected to the energy co-generation assembly housing inner chamber of the energy co-generation housing of an integrated thermoelectric generation device thereby moving the heat energy therethrough the energy co-generation assembly therethrough the energy co-generation assembly combustion air conduit and each of the one or more heat tubes such that the heat energy and the combustion byproducts create a hot side on each of the one or more sealed thermoelectric generation units

114 dissipating heat energy away from the hot side of the one or more sealed thermoelectric generation units creating a cold side of each of the one or more sealed thermoelectric generation units forcing a diffusion of electric carriers towards the cold side creating a voltage potential causing the one or more sealed thermoelectric generation units to generate electric energy

115 introducing the heat energy and combustion byproducts from the fuel combustor to the inner combustion air conduit inlet portal of the inner combustion air conduit of the media heating assembly pulled by way of the induced draft flow of the one or more centralized combustion air blowers therethrough the inner-combustion air conduit outlet portal of the inner combustion air-conduit and upward therethrough the outer thermally conductive heating conduit exiting the combustion air exhaust aperture therethrough the combustion air discharge conduit such that the heat energy and combustion byproducts transfer heat energy to an exterior surface of the outer thermally conductive heating conduit by way of conductive heat transfer

116 augmenting the fuel combustion heating by distributing electrical energy generated within the energy co-generation assembly to the one or more electrically resistive heating units such that temperatures of the one or more electrically resistive heating units increases as the one or more electrically resistive heating units resist the flow of current

117 transferring heat and co-generated electrical energy from the outer thermally conductive heating conduit therethrough to the heat tolerant thermally conductive annulus fill of the annulus space and therethrough the identified volume of the contaminant impacted media by way of thermal conduction thereby causing degradation of contaminants within the identified volume of the contaminant impacted media affecting remediation of the identified volume of the contaminant impacted media

118 providing a combustion air discharge chamber-thermoelectric generation assembly of the one or more combustion air discharge chamber-thermoelectric generation assemblies

119 positioning the combustion air discharge chamber-thermoelectric generation assembly between the energy co-generation assembly and the centralized combustion air blower

120 utilizing a portion of abeyant heat energy flowing through the combustion air discharge chamber-thermoelectric generation assembly prior to expelling the portion of abeyant heat energy into the external atmosphere by way of the one or more centralized combustion air discharge stacks

121 providing one or more electrical energy distribution cables delivering a two-way transfer of the electrical energy among a plurality of ex situ components comprising the grid-based electrical power supply, the centralized electrical energy storage device, the one or more centralized primary electrical energy conditioning and distribution boxes, and the one or more secondary electrical energy conditioning and distribution devices

122 transfering electrical energy from the one or more combustion air discharge-thermoelectric generation assemblies to the one or more one or more centralized primary electrical energy conditioning and distribution boxes

123 transferring electrical energy from the one or more energy co-generation assemblies and from the one or more auxiliary photo voltaic solar panels to the one or more secondary electrical energy conditioning and distribution devices

124 providing a plurality of electrical energy transfers to the hybrid energy thermal remediation system

125 determining periods of time characterized with surplus levels of the electrical energy for the operation of the hybrid energy thermal remediation system

126 providing a plurality of reverse energy transfers to the hybrid energy thermal remediation system including:

a reverse energy transfer from the one or more secondary electrical energy conditioning distribution devices to the one or more centralized primary electrical energy condition and distribution boxes;

a reverse energy transfer from the one or more centralized primary electrical energy conditioning distribution boxes to the centralized electrical energy storage device; and a reverse energy transfer from the centralized electrical energy storage device onto the grid-based electric energy supply

127 converting a predetermined quantitiy of the heat energy from the one or more fuel combustors to electrical energy by way of the one or more sealed thermoelectrical generation units of the one or more energy co-generation assemblies and the sealed thermoelectric generation modules of the one or more combustion air discharge chamber-thermoelectric generation assemblies

128 storing and conditioning the electrical energy within the centralized electrical energy storage device, the one or more primary electrical energy conditioning and distribution boxes, and the one or more secondary electrical energy conditionig and distribution devices

129 returning excess electrical energy from the one or more secondary electrical energy conditioning and distribution devices and the one or more primary electrical energy conditioning and distribution boxes to the electrical energy grid at the grid-based electric energy supply

130 removing the hybrid energy thermal remediation system from the remediated impacted media

*FIG. 1D*

100 further comprising: 

131 providing a deionized water electrolyzing hydrogen generation system

132 conveying the electric energy generated from the one or more integrated thermoelctric co-generation devices of the one or more energy co-generation assemblies to the deionized water electrolyzing hydrogen generation system by way of the one or more centralized electrical energy distibution cables

133 conveying a metered flow of deionized water supply from the deionized water device therethrough the deionized water conveyance piping to the hydrogen generation electrolyzer device of the deionized water electrolyzing hydrogen generation system thereby providing a predetermined volume of deionized water being contained in the hydrogen generating electrolyzer device

134 passing the conveyed electric energy generated from the one or more integrated thermoelectric co-generation devices therethrough the predetermined volume of deionized water thereby actuating the electric energy from the hydrogen generating electrolyzer device causing the decomposing of the deionized water producing oxygen gas ($O_2$) and hydrogen gas ($H_2$)

135 storing the hydrogen gas ($H_2$) in the hydrogen storage unit

136 providing a sustainable source of an on-site hydrogen gas ($H_2$) supply

137 combining a combustible fuel from the fuel supply with the hydrogen gas ($H_2$) from the hydrogen gas ($H_2$) storage unit within the fuel blending unit providing a blended fuel mixture

138 supplying the blended fuel mixture to each of the fuel combustors of the one or more energy co-generation assemblies 

139 igniting the blended combustible fuels and hydrogen gas ($H_2$) within the fuel combustor causing a combustion reaction whereby cogenerating additional heat energy, combustion byproducts, and additional electric energy from the one or motr integrated thermoelectric generation device for use in the thermal remediation of contaminants from the volume of the contaminant impacted media

↓

140 removing the deionized water electrolyzing hydrogen generation system

FIG. 2B

METHOD AND APPARATUS FOR THERMAL REMEDIATION OF CONTAMINANT IMPACTED MEDIA WITH HYBRID ENERGY SYSTEMS

TECHNICAL FIELD

The present system(s) method(s) and device(s) relate to the field of environmental remediation, with particular focus on the remediation of contaminated soil and groundwater. The systems method(s) and devices claimed herein relate to the application and use of heat energy transferred to media, system(s), or formation(s), natural and anthropogenic, in situ or ex situ, through thermal conduction, in order to catalyze abiotic and biotic processes which result in the removal, degradation, destruction, or favorable alteration of contaminants, with the intended purpose of remediation.

This document uses the term "well" as a colloquialism that may be commonplace within the environmental industry to describe any cylindrical device installed into subsurface media, but most commonly into soils or groundwater, which may be in direct contact with the subsurface environment through perforations, opening, or otherwise, and which is not restricted to the traditional definition of a "well" which refers to any excavation or structure created in the ground by digging, driving, or drilling to access liquid resources, usually water.

BACKGROUND OF THE INVENTION

The concept of using thermal technologies for in situ remediation purposes began in the oil and gas sector in the 1950s to enhance recovery of petroleum. Since this time numerous different technologies, devices, systems, and strategies have been developed and commercialized for environmental remediation applications. These robust technologies have been applied to a wide variety of contaminant types and in a wide variety of geologic and hydrogeologic conditions. When applied aggressively, these technologies can reduce residual contamination to very low levels which are often unmatched by other commercially available remedial technologies and approaches. Horst et al. 2021 provides an up-to-date and comprehensive overview of the history, development, and commercialization of thermal remediation technologies. Steam enhanced extraction (SEE) used for environmental remediation was developed in the 1980's and further commercialized in the early 1990's (Udell et al. 1991). Electrical resistance heating (ERH), which had been studied since the 1970s for bitumen recovery was first applied for environmental remediation in the early 1990's (U.S. Pat. Nos. 5,190,405 & 5,449,251). Thermal conductive heating (TCH) use for remediation was developed and patents were filed by Shell Oil Company in the late 1980's and early 1990's (U.S. Pat. No. 4,984,594.). Radio frequency heating (RFH) was commercialized in the late 1980s (U.S. Pat. No. 4,670,634, U.S. Army Corps of Engineers [USACE] 2009). Detailed descriptions of these various thermal remediation technologies is found in Horst et al., 2021.

The method and device described herein pertains mostly to thermal conductive heating (TCH), although the entire field of thermal remediation technologies remains relevant. Several TCH technologies have been commercialized following the earliest implementations of electric TCH in the late 1980's. In the 1980's and 1990's, the first patents for TCH by means of an electrically resistive heating element (U.S. Pat. Nos. 4,984,594, 5,190,405, 5,318,116, 6,485,232 and 6,632,047) were filed by Shell Oil Company (Vinegar and Stegemeier 1991; Vinegar et al. 1993), and later donated to the University of Texas prior to being licensed in 2000 for commercial environmental remediation application (U.S. Pat. No. 6,632,047 B2). In the early 2000's and 2010s, a revival of gas-fired TCH burners and remediation systems began, building off of original concepts developed in the early 1990's by the oil industry and further applied to environmental remediation by the University of Texas System (U.S. Pat. No. 5,193,934). The revamped technologies included art for a combustion-based system for heating, extracting, and treating extracted contaminant vapors in the same device (U.S. Pat. No. 7,618,215) and for the volatilization and extraction of contaminants using a combustion powered heating device to heat a perforated column and contaminated soils surrounding that column under vacuum to extract contaminant vapors (U.S. Pat. No. 9,718,103 B2). Since then, these systems have been redeveloped and implemented by multiple commercial vendors throughout North America and the world.

Continued development and commercialization of TCH technologies has engendered recent advancements, as the thermal remediation market grows and evolves. Recent technologies using induction heaters have been developed and commercialized, which eliminates the radiant heat transfer step (U.S. Pat. No. 20,210,308,730) inherent to other TCH technologies and attempts to improve energy efficiency. More recently still, electric based TCH technologies, such as the spiraling resistive Flexheaters® (U.S. Pat. No. 10,201,042 & 20,210,259,054) that modify and control thermal or power input along the length of the device have been developed and commercialized (Horst et al., 2021), as well as TCH technologies which co-locate ERH and TCH devices and heating methods in a single device and installation (U.S. Pat. No. 20,200,353,520).

During the 70-year development of these various thermal remediation technologies, great progress has also been made in the methods by which the heat generated and transferred to contaminant impacted media by these technologies and devices may be thereby used to remediate the contaminants being targeted.

In Situ Thermal Desorption (ISTD) was first developed (U.S. Pat. No. 4,984,594) in the 1990's, which combined the concept of heating contaminant impacted media using TCH devices in combination with sub-surface air movement technologies to volatilize or remove the contaminant species through various vapor phase mechanisms (Vinegar et al. 1997). In these instances, thermal heater devices were combined with soil vapor extraction (SVE) or multi-phase extraction (MPE) wells to physically remove contaminant species in the vapor phase through volatilization and physical entrainment mechanisms. This ISTD process has since been used as the cornerstone of thermal remediation technologies and applications for approaches which target temperatures where contaminants readily transition to the vapor phase and are then physically extracted from the impacted media.

In the early 1990's, ERH was combined with SEE in a process termed dynamic underground stripping (DUS) (U.S. Pat. No. 5,449,251). Not all too dissimilar from ISTD, DUS was also used to physically remove contaminants through vapor phase extraction. However, it was also intended to physically drive concentrated contaminant mass existing as non-aqueous phase liquids (NAPL) towards aqueous, dual, or multi-phase extraction points using pressurized steam injection.

During the 2000's and early 2010's, TCH began finding use in higher temperature applications, targeting temperatures over 100° C., with many projects successfully attaining temperatures of greater than 350° C., to physically remove or degrade higher molecular weight compounds with higher boiling points. However, when compared to lower temperature thermal remediation approaches, higher temperature applications have larger remedial costs, levels of energy consumption, and carbon footprints. They also increase the potential for damage to physical and ecological soil properties (Vidonish, et al. 2016). During this time, methods, and devices for ex situ TCH application on excavated soils were commercialized (U.S. Pat. No. 8,562,252), finding further utility for thermal remediation technologies.

In the 2010's through the current period, much attention has been given to enhancing various biotic and abiotic processes using lower temperature thermal remediation applications, including thermally enhanced hydrolysis, thermally catalyzed chemical reduction and oxidation reactions, and thermally enhanced biotic degradation. These lower temperature applications have allowed thermal remediation technologies to be applied to a wider range of contaminant reduction and removal projects and have provided lower overall remedial costs and smaller carbon footprints than traditional, higher temperature, applications.

A shared feature of all current thermal remediation technologies and approaches are high costs and low sustainability due to the inherently large energy consumption required for implementation (Fisher, 2012) which has historically precluded the meaningful use of renewable energy sources to significantly offset reliance on carbon intensive grid energy. During the past decade, concerted efforts within the industry have been focused on further ways to reduce the high cost and carbon footprint of thermal applications without sacrificing the ability of these technologies to remediate a wide range of contaminant species expeditiously (Lemming et al, 2013). With sustainability and cost reduction in mind, the majority of these technological developments, such as the TCH based Thermal In Situ Sustainable Remediation (TISR) system (U.S. Pat. No. 10,688,545), have been aimed specifically at lower temperature biotic and abiotic applications.

Historically, despite the wide range of technologies and heat generating mechanisms used in thermal remediation, there exists little variation in energy requirements for a given application. The required energy to achieve, and maintain, a certain temperature throughout a defined volume of impacted media may be a function of thermodynamics, project specific conditions and targets, and physio-chemical requirements. Application of the best suited technology to each project, and using monitoring data to inform shutdown timelines, have been shown to be the most significant means of reducing energy consumption, despite technological variety and focused research and development efforts. Certain technological advances have been proposed to minimize energy losses from inefficient heat generation or transfer coefficients, yet the energy requirements and carbon footprints for thermal remediation technologies are still far higher than most alternative remediation strategies.

Energy requirements for heating to average temperatures of 100° C. or higher typically range between 200 and 400-kwh per cubic yard of treated impacted media, although this range does not include extreme outliers on either end. Including electrical power requirements for auxiliary treatment system components such as vacuum blowers, vapor abatement units, transfer pumps, and data gathering devices, total project energy consumption of these traditional thermal remediation technologies can exceed 600 kwh per cubic yard of treated soil (US EPA, 2012 & US EPA, 2014).

Inherent to these high energy requirements may be the reliance on traditional grid-based energy infrastructure. Electric based thermal remediation technologies require very large, and typically expensive project specific, power supplies, that demand a robust connection to grid electricity which can often be unavailable. In many instances, lack of adequate grid electricity precludes electric based thermal remediation technologies from being deployed. Where adequate grid electricity is unavailable, combustion based thermal remediation technologies have shown a unique strength, as mobile fuel storge systems are more cost effective, and are easier to construct than mobile electrical systems. However, fuel combustion based thermal remediation systems still require a high demand of electricity to power the heating units, extracted liquid and vapor treatment systems, and auxiliary pump, fan, and control systems. This electrical energy may be provided by mobile generator systems, adding to the already high cost, energy consumption, and carbon footprint of fuel combustion based thermal remediation technology implementations.

While they offer a lower reliance on available grid energy infrastructure, fuel combustion based thermal remediation technologies have additional, significant, limitations which currently preclude them from suitable application at many contaminated media remediation projects. Inherent to the technology, fuel combustion-based technologies are incapable of meaningfully controlling the amount of energy being applied to each device without becoming impracticably inefficient. Similarly, the ability to differentiate heat output along the longitudinal axis of these devices may be poor, or nonexistent. Further still, in many embodiments of these technologies, treating intervals greater than 80-ft below grade becomes increasingly difficult, as water condensate, a byproduct of the combustion reaction, forms within the sealed devices due to excessive cooling of the combustion air as it recirculates up the extended device length, pools in the lower end of the device causing eventual failure of the entire device.

In general, application of fuel combustion-based technologies often represents one of the highest carbon footprints of any thermal remediation technology, as heat transfer is comparatively inefficient, with approximately 50% of heat energy from the combustion process being transferred to the intended media, and up to 50% of the energy being expelled to the atmosphere as waste heat in the combustion air discharge.

The push to reduce reliance on grid electricity and fuel combustion as main energy forms, and the move to sustainable renewable energy generation is not unique to the remediation field. Increasing costs of traditional power from grid based electric and natural gas, increasing awareness of greenhouse gas emissions, and the overall negative impacts power generation and consumption has on environmental pollution and global warming are issues that are driving innovation across all commercial sectors, from utility companies, to electronics, commercial and residential construction, automotive and aerospace engineering, to name just a few.

Thermoelectric generators (TEGs) are active devices that consist of converting thermal energy into electrical one (Mamur, et al., 2021). TEGs are made of dissimilar thermocouples connected electrically in series and thermally in parallel, to generate voltage from apparent temperature differences across the thermocouples. TEGs are widely used in many fields as they combine energy efficiency, free maintenance, and long lifetime (Jaziri et al., 2019). While the concept of thermoelectric generation has found some application for the past 60-years, with applications in aerospace engineering starting with NASA in the early 1960's, over last decade they have become an area of increasing interest across a number of commercial market sectors as a cost-effective means of electric energy harvesting on large scale applications in automobiles to the use of micro-harvesting systems to power microelectronic devices.

In the 2020's, TEG development has greatly accelerated, and they are now commercially available across several market sectors. Current applications include automobile engines (Mostafavi and Mahmoudi, 2018) industrial electronic devices (Zhou et al., 2008), and aerospace (Yuan et al., 2018), as well as industrial process and facilities for waste energy harvesting. Most commercially available TEG systems are easily constructed from a range of readily available materials, and the lack of chemical products and mechanical components or moving parts, makes them cheap, effective, and long-lasting renewable energy harvesting devices.

Combustion based heaters and burners used in residential and commercial applications, such as boilers, and building heating systems have been integrating combustive heat sources with TEG modules since the early 1960's. Early integration of these energy transforming [harvesting] systems focused on off-grid power generation combined with residential or commercial building heating (U.S. Pat. No. 3,185,201), or for self-powered combustion control and safety systems, for instance, as disclosed in U.S. Pat. No. 4,770,629, wherein the TEG unit is built with a thermocouple heated directly by the pilot flame, generating direct current (DC) voltage.

As part of combustor safety systems in free standing appliances, integrated thermoelectric generators using flat semiconductor-based P and N thermocouple junction unit(s) have been applied to several different applications and configurations, whereby the co-generated DC voltage from TGEs is used to power critical safety components. For instance, the thermoelectric unit(s) disclosed in U.S. Pat. No. 7,018,200, whereby the combustor uses a pilot flame which generates a DC voltage to supply an electronic control circuit, including a safety valve solenoid, a main gas supply valve solenoid.

Global Power Technologies is the largest manufacturer of TEGs under the trade name of Mobil Power Supplies (MPSs), whose various models and configurations provide a reported output ranging from 5 to 5,000 watts. The Company uses a combustor with integrated TEG modules, based off early NASA designs, to generate off-grid energy from fossil-fuel combustion, with apparatuses which range from small scale MPPs capable of generating less than 10 watts to larger scale multi-kilowatt generator systems. These generators are intended to supply off-grid power to remote applications in environmentally challenging locations.

Similar to applications of thermal remediation technologies, high fuel costs and carbon dioxide (CO2) emission have driven many industries to integrate TEGs into their systems. Notably, the automotive industry has recently seen a significant push towards integrating TEG modules into hybrid energy automotive systems, to convert the heat wasted by the exhaust gas, emitted from the internal combustion engine, into electrical energy to run accessories and re-charge batteries.

Jaziri et al. 2019, note that, in a modern passenger vehicle, only 25% of the energy from fuel combustion may be used for vehicle mobility and running accessories, while 40% may be wasted as exhaust gas. The amount of heat emitted from the exhaust system, where temperatures vary from 100° C. to 800° C., may be very high with a potential thermal power up to 10 kW, depending on the vehicle speed and fuel category (Yang, 2005).

Similarly, in fuel combustion based thermal remediation systems, approximately 50% or more of the heat energy being generated at the combustion point may be exhausted in the combustion air stream at temperatures of 200-450° C. Aside from the waste heat energy being discharged, the combustion source itself provides 80,000 to 200,000 BTU per hour at temperatures of upwards of 1,000° C. Large scale combustion based thermal remediation projects have now been successfully implemented with total combined combustion energy consumptions of 2,000-MMBTU per day of operation or greater. For projects of this size and magnitude, an efficiently designed hybrid energy thermal remediation device integrating TEG modules could harvest 2,000-kW or greater of usable electricity, without impacting the efficiency of the combustion reaction or heat transfer coefficients.

This large amount of wasted heat is a valuable energy source capable of providing additional heat energy to the remediation process and powering auxiliary equipment. Converting this waste heat to electrical energy could remove the need for traditional electrical infrastructure, reduce the consumption of hydrocarbon-based fuels, generate sustainable fuel from on-site hydrogeneration, or generate excess energy to return to the grid. Thus, converting usable heat to electrical energy through passive TEG systems is a significant solution to improve traditional thermal remediation systems, reduce atmospheric pollution and power costs, and improve the functionality of the device(s) and remediation system(s).

There exists a significant, and real need in the references to; recover and reuse waste energy, reduce reliance on grid-based energy, reduce the carbon footprint, improve the ability to differentiate longitudinal heat output at discrete intervals and extend the practical remedial treatment interval. The hybrid energy thermal remediation (HETR) method and device claimed herein provide a simple, cost effective, and sustainable option that assembles commercially available materials in an easy to construct manner that improves upon each one of these deficits in the references.

SUMMARY OF THE INVENTION

Hybrid energy thermal remediation system, method(s) and device(s) are claimed herein, which integrate a fuel combustor and thermoelectric generating device(s) to collectively transform and apply multiform energy to individual, or multiple connected, heating assembly(s) by means of convective, conductive, and radiative heat transfer to an outer conduit which thermally conducts heat to contaminated media in contact with the heating assembly, including soils, groundwater, non-aqueous phase liquids and other matrices with the intended purpose of contaminant removal, degradation, destruction, or stabilization, thereby remediating said contaminant impacted media.

The hybrid energy thermal remediation device is constructed using commercially available system components and materials which may be easily integrated into the device and may be easy to install using standard industry construction practices. The main components of the HETR device may include an energy co-generation assembly and a heating assembly. The energy co-generation assembly may consist of a fuel combustor; integrated thermoelectric generation device; electrical power conditioning and distribution device (s); electrical energy storage device(s) or battery(s); an energy cogeneration assembly housing; and a temperature monitoring and regulation system integrated into a programmable logic controller. The heating assembly may consist of an inner combustion air conduit; an electrically resistive heating unit(s); a thermally conductive outer conduit.

The hybrid energy thermal remediation system may be used to provide thermal enhancement of various remediation mechanisms and may be used in conjunction with one or more remediation devices, systems, or approaches which may include, but is not limited to, soil vapor extraction (SVE), multiple phase extraction (MPE), groundwater extraction, groundwater recirculation, bioremediation, permeable reactive barriers (PRBs) or chemical injection(s).

Commercially available fuel combustor and burner systems may be used in this device. A number of suitable systems exist, including fully compatible systems from the commercial heating industry which may be easily adapted to the HETR energy co-generation assembly(s) with little to no modification. Similarly, combustion system kits, parts and components can be purchased from commercial suppliers, and customized burners may be easily constructed using standard practices. Suitable combustor systems which use liquid fuel, such as diesel or gasoline may be used. Similarly, gas-based combustor systems which use natural gas, propane, or blended fuel mixture which may include hydrogen gas mixtures may be selected for the HETR device. The fuel combustor system may contain a gas control valve and ignition control board, a sparker system for intermittent pilot operation, pressure regulator, manifold and pressure gauges, an interchangeable fuel orifice, and a burner nozzle. Depending on the system being used, whether purchased or constructed from commercially available components, the combustor system should have the ability to optimize primary air flow through an air shutter or controllable aperture.

The fuel combustor system should contain safety features such as flame detection or air pressure switches, to ensure the HETR device does not operate if conditions are not within safe operating parameters. The combustor system may be fully enclosed in a weatherproof enclosure or junction box for suitable outdoor application. The hybrid energy thermal remediation device (HETR) is configured to operate using forced draft, induced draft, or balanced draft combustion air blowers or fans. If a commercially available system is used for the fuel combustor component of the HETR device, accompanying combustion air blower systems may be used as part of a pre-engineered system from the commercial supplier. In the preferred embodiment of the present invention, induced draft systems may be used. Induced draft configurations may feature a single combustion blower at the combustion air discharge opening of each individual HETR device, or several HETR devices may be connected in series using combustion air conduits from the combustion air discharge openings of each device tied to a centralized combustion air blower which manages the combustion air flow from the entire circuit of HETR devices. In another exemplary embodiment, forced draft systems may be used, where a combustion air blower may be used to supply the combustion air from the combustor, pushing the combustion air through the HETR device.

In another exemplary embodiment of the present invention, both forced and induced draft systems may be constructed on opposite ends of the device's conduit(s), which may further control combustion air flow. Combustible fuel supply may be predetermined by application specific constraints, such as the availability of natural gas infrastructure. The commercial availability of suitable combustor systems which can operate using liquid petroleum hydrocarbon-based fuels, gases, and alternative fuels and fuel blends, allow the HETR system to use permanent connections or temporary fuel storage and distribution systems. Depending on application specific constraints, the combustor system can be selected based on the cheapest and most readily available fuel supply for each application, and the HETR device can be easily modified to accept a multitude of combustive fuels and fuel blends, including hydrogen gas blends, by simply replacing the combustor system or simply replacing minor components of the combustor system.

In the preferred embodiment of the present invention, natural gas connections may be used, either solely, or in combination with additional fuel sources. In other exemplary embodiments of the present invention, electrical energy generated by the energy cogeneration assembly and associated thermoelectric generation device(s), as well as other auxiliary renewable energy sources, such as solar photovoltaic panels, may be used to generate hydrogen on-site. Recent advances in proton exchange membrane (PEM) electrolysis have made the process of electrolysis significantly more efficient in terms of both energy usage and operational costs. This, in turn, has made it much easier to couple electrolyzer systems with dynamic renewable energy sources like thermoelectric generation devices and systems as well as solar based renewable energy devices and systems. Commercially available devices and systems purchased or rented and incorporated in the method to generate and store hydrogen for blending with petroleum hydrocarbon-based fuels for subsequent use in the HETR device combustors.

A fuel distribution system may be constructed using piping, valves and pressure regulators to supply fuel to the combustor systems on each HETR device. The fuel distribution system may be installed above ground on stands to isolate it from heat, weather, or other complications. Pressure regulators may be placed to safeguard and control the necessary operating pressure of natural gas delivered to the control systems of the individual HETR devices.

The electric power source may be comprised of a grid-based electric energy supply, as few as one, or as a plurality of interconnected semiconductor thermoelectric generation units, modules or devices, configured in multiple series of multiple parallel runs, with different configurations to generate ideal power for a given power storage system, device, or electrically resistive heating unit based on its resistance, or combination of both grid based electrical and thermoelectrically generated electrical sources. Thermoelectric generation devices are commercially available from a multitude of manufacturers and vendors, and may be obtained as individual thermocouples, units (otherwise referred to as modules), devices, or as complete systems including integrated heat exchangers which can be mounted directly to the HETR device.

The thermoelectric generation units or devices can be constructed from different simple solid-state semiconductor elements depending on temperature regime and application, which may include $Bi_2Te_3$, $Sb_2Te_3$, $PbTe$, $CoSb_3$, $CeFe_4Sb_{12}$, $Yb_{14}MnSb_{11}$, $(GeTe)_{0.85}(AgSbTe_2)_{0.15}$ (commonly referred to as TAGS) and SiGe (Snyder and Toberer, 2008). Because of the high-temperature range in the combustor, using more than one type of thermoelements may be required which will lead to better effective conversion efficiency. LaGrandeur et al. (2006) have arranged three stages segmented thermoelectric materials as follows: N- and P-type Bi2Te3 for low temperature range (<250° C.), P-TAGS and N—PbTe for medium temperature range (250°

C.-500° C.) and skutterudite materials (P—CeFe3RuSb12 and N—CoSb3) for high temperature range (500° C.-800° C.), although a multitude of commercially available modules using different materials exist, and are continuously evolving with burgeoning market adoption.

Thermoelectric generation devices convert a temperature difference and heat flow into a DC power source, generating voltage. This generated voltage drives electrical current and produces useful power at a load. A single thermocouple may be made up of one p-type semiconductor and one n-type semiconductor. The semiconductors are connected by a metal strip that connects them electrically in series to create a thermoelectric generation unit, device, or module.

Thermoelectric generation units, devices, and modules are available commercially from the automotive and renewable energy sector and may be easily installed on portions of the apparatus where the highest temperature deltas are generated by the combustion process. In the preferred embodiment of the present invention, thermoelectric generation units, devices and modules may be integrated into the energy co-generation assembly by surrounding the energy co-generation assembly inner combustion air casing such that an open annulus remains within the energy co-generation assembly, between the TEG module and the inside of the energy co-generation assembly housing and any internal screw, spiral, or finned structure(s) or refractory. The energy co-generation assembly, in other exemplary embodiments of the present invention, may not be co-located within a single energy co-generation assembly housing, and thermoelectric generation devices may instead, or in addition, be placed on the exterior of the combustion air discharge conduits where waste heat energy is conveyed prior to atmospheric discharge. Thermoelectric generation modules and systems integrated into the HETR device includes an automatic temperature shutdown system comprises of a thermocouple and relay to the fuel shut-off valve which will close the valve if an overtemperature event occurs in order to protect the thermoelectric generation device and other energy cogeneration assembly components.

The thermoelectric generating devices may be electrically connected to power conditioning and distribution devices as well as individual power storage devices (battery(s)) prior to delivering power to HETR device components including electrically resistive heating unit(s), electrically powered devices, or energy conversion and auxiliary power storage systems. The electrical system may include an electric power stabilizer, voltage limiter or regulator, power controller, inverter, and energy storage system for electricity, or as generated hydrogen fuel. In the preferred embodiment of the present invention, the thermoelectric generation device may be connected through a voltage regulator and electrical conditioning system before being electrically connected to either, or both, a local battery and a low voltage DC electrically resistive heater unit(s) capable of handling dump or diversion load powering of the electrically resistive heating unit(s) using the direct DC power generation of the hybrid energy system(s) when the battery may be full. Conversely, dump or diversion load distributions could be routed to the grid-based electric energy supply, or auxiliary equipment or storage devices in applications where this may be the most favorable use of excessive electrical energy generation. The power conditioning and distribution device may be connected to the heating assembly temperature monitoring device(s) through electrical connection(s) and programmable logic control or automations programming, controlling the distribution of electrical power to the electrically resistive heating device based on temperatures achieved at the exterior of the thermally conductive outer conduit.

The energy co-generation assembly housing may attach to the heating assembly by means of simple flanged coupling connection with flanged ends on both the distal end of the energy co-generation assembly and proximal end of the heating assembly by way of flanged collar connector cap. The heating assembly may consist of a combustion air conduit; electrically resistive heating unit(s); and a thermally conductive outer conduit. The inner combustion air conduit may be constructed of a number of different heat tolerant materials, such as ceramics, silica carbide ceramic, metals and metal alloys, including stainless steel, and may be configured as an open-ended conduit circulating air upward between the inner conduit and outer conduit, or may be configure in u-shaped configuration where combustion air does not enter the annular space between the inner conduit and outer conduit. In certain exemplary embodiments of the present invention, where single pass non-recirculated combustion air may be possible, such as highly angled, bent or horizontal applications, in situ or ex situ, the inner combustion air conduit may, also, serve as the outer thermally conductive conduit in contact with the contaminant impacted media and any type of collocated electrically resistive heating unit(s) may be placed inside the combustion air conduit, or in separately contained installation(s). Numerous systems comprising of the combustor, and inner conduit, in both an open ended or u-shaped formation, and in some instances outer thermally conductive conduits are commercially available and may be incorporated directly into this device and applied to this method.

In the preferred embodiment of the present invention, one or more electrically resistive heating unit(s) may be placed in the annulus between the inner combustion air conduit and the outer thermally conductive conduit. In other exemplary embodiments of the present invention, one or more electrically resistive heating unit(s) may be placed below the inner combustion air conduit outlet, or bottom of the u-shaped conduit bend, where the outer thermally conductive conduit may extend to greater lengths. In other exemplary embodiments of the present invention, one or more electrically resistive heating unit(s) may be placed in a stand-alone device installation at the center of an array of a minimum of two, in some instances up to 20, and less likely more than 30, separate thermoelectric generating device installations.

In certain exemplary embodiments of the present invention, the electrically resistive heating unit(s) acts as dump or diversion load dissipators. In other exemplary embodiments of the present invention, the electrically resistive heating unit(s) may be connected to an auxiliary power source, conditioner, and distribution system, such as an electrical storage device or system, grid-based electric energy supply, or both. In the preferred embodiments and the other exemplary embodiments of the present invention, the electrically resistive heating unit(s) acts to augment heat output within the hybrid energy device installation, improves the ability to extend the length of the thermally conductive conduit without critical drawbacks or failures, and/or targets variable temperature outputs in discreet intervals, either higher or lower, than the combustion-based system can achieve alone. These added features allow the HETR device to circumvent several limitations facing other commercially available thermal remediation technologies and allow this device to take advantage of different contaminant remediation mechanisms.

The metal that forms the electric heating unit may be constructed using, but may not be limited to, stainless steel, nickel-chromium, or other metal alloys commercially available and used in electrically resistive heating units and systems. The specific metal used in the heater may be chosen based on cost, the operative temperature of the contaminated media remediation process, and the electrical or physical properties of the metal. The device can be configured in several different morphologies to minimize combustion air flow impediment and fit within the spatial and geometric constraints of the anulus formed between heating assembly combustion air conduit and thermally conductive outer conduit. In certain exemplary embodiments, the resistive heating unit may be constructed in a manner that acts to diffuse the recirculated combustion air, such as a screw or fin pattern. This construction incorporates the electrically resistive heating unit into the device while improving heat distribution and residence time of combustion air, which may in turn improve heat transfer and reduce hot spot formation and early construction material degradation, both of which improve overall efficiency of the HETR device. Similarly, electrically insulative plugs, and sleeves may be constructed to electrically isolate the electrically resistive heating unit(s) from any other metal components of the device. Electrical insulators may be chosen based on the configuration, operating temperatures, and operating conditions. In the preferred embodiment, the electrically resistive heating unit(s) may be a commercially available reverse ceramic band or pipe configuration, that can be placed between the inner conduit and outer conduit.

A heating unit may be fashioned in an open annular (tubular) spiral, or screw shape, using electrically insulating, thermally conducting material, which may include silica carbide ceramic, and act as both an electrically resistive heating unit and a combustion air, heat and combustion reaction byproducts diffuser. Commercially available reverse band electrically resistive heating unit designs exist that could be suitable for this application, or these could easily be constructed using commercially available materials and processes. In other exemplary embodiments, specifically where the electrically resistive heating unit may be housed below the inner combustion air conduit, or placed in spatially separate conduits, installed within the larger array of HETR device installations, the electrically resistive heater unit may be constructed as an open coil design, with circular ceramic spacers or plugs. Similarly, suitable heating units exist commercially, such as the WATTCO™ Open Coil Pipe Heaters, or could be easily constructed from available materials and components. Several other configurations, designs, and materials could be suitably used for the electrically resistive heating unit.

The thermally conductive outer conduit may be constructed of material that features high temperature compatibility, chemical resistance, and thermal conductivity appropriate for the application. Carbon steel or Stainless steel may be used when appropriate. The outer conduit may also be constructed of silica carbide ceramic or other comparable materials, depending on the application. The outer conduit may be sealed at the bottom to remove any direct communication with the contaminant impacted material or may be left open if the conduit daylights to accessible locations, as may be applicable in horizontal applications. In horizontal applications, the inner combustion tube may be excluded, and the HETR device may be configured as a single pass system, directly venting to the atmosphere.

In various exemplary embodiments, the method and device can be configured to utilize a variable amount of energy and reliance from either energy source, be it fuel combustion, or electrically resistive heating of an electrically resistive unit or device, and both energy systems can be configured and utilized in a grid-connected modality, partial grid connected modality, or entirely isolated from grid. In the preferred embodiment and exemplary embodiments of the method(s) and device(s) claimed herein reduce the carbon footprint of the HETR system, increase the efficacy of energy consumption and utilization, minimize reliance on traditional energy sources requiring heavy infrastructure and circumvent many traditional utility availability constraints. Similarly, this device allows differential heat application both longitudinally and laterally, depending on the configuration and modality being applied.

BRIEF DESCRIPTION OF THE DRAWINGS

The detailed description is set forth with reference to the accompanying drawings. The use of the same numerals indicates similar or identical items. Various exemplary embodiments utilize elements and/or components other than those illustrated in the drawings, and some elements and/or components may not be present in the various exemplary embodiments. Elements and/or components in the figures are not necessarily drawn to scale. Throughout this disclosure, depending on the context, singular and plural terminology may be used interchangeably.

FIG. 1A depicts a flow diagram of method steps 101-111 for heating a contaminant impacted media for remediation of a contaminant impacted media implemented with a hybrid energy thermal remediation system, according to an embodiment of the present invention.

FIG. 1B depicts a flow diagram of method steps 112-117 for heating in the hybrid energy thermal remediation of the contaminant impacted media continuing from FIG. 1A, according to an embodiment of the present invention.

FIG. 1C depicts a flow diagram of method steps 118-124 for heating in the hybrid energy thermal remediation of the contaminant impacted media continuing from FIG. 1B, according to an embodiment of the present invention.

FIG. 1D depicts a flow diagram of method steps 125-130 for heating in the hybrid energy thermal remediation of the contaminant impacted media continuing from FIG. 1C, according to an embodiment of the present invention.

FIG. 2A depicts a flow diagram further comprises method steps 131-138 for heating in the hybrid energy thermal remediation of the contaminant impacted media further continuing from FIG. 1D, according to an embodiment of the present invention.

FIG. 2B depicts a flow diagram of method steps 139-140 for heating in the hybrid energy thermal remediation of the contaminant impacted media continuing from FIG. 2A, according to an embodiment of the present invention.

DETAILED DESCRIPTION

Figure 3:
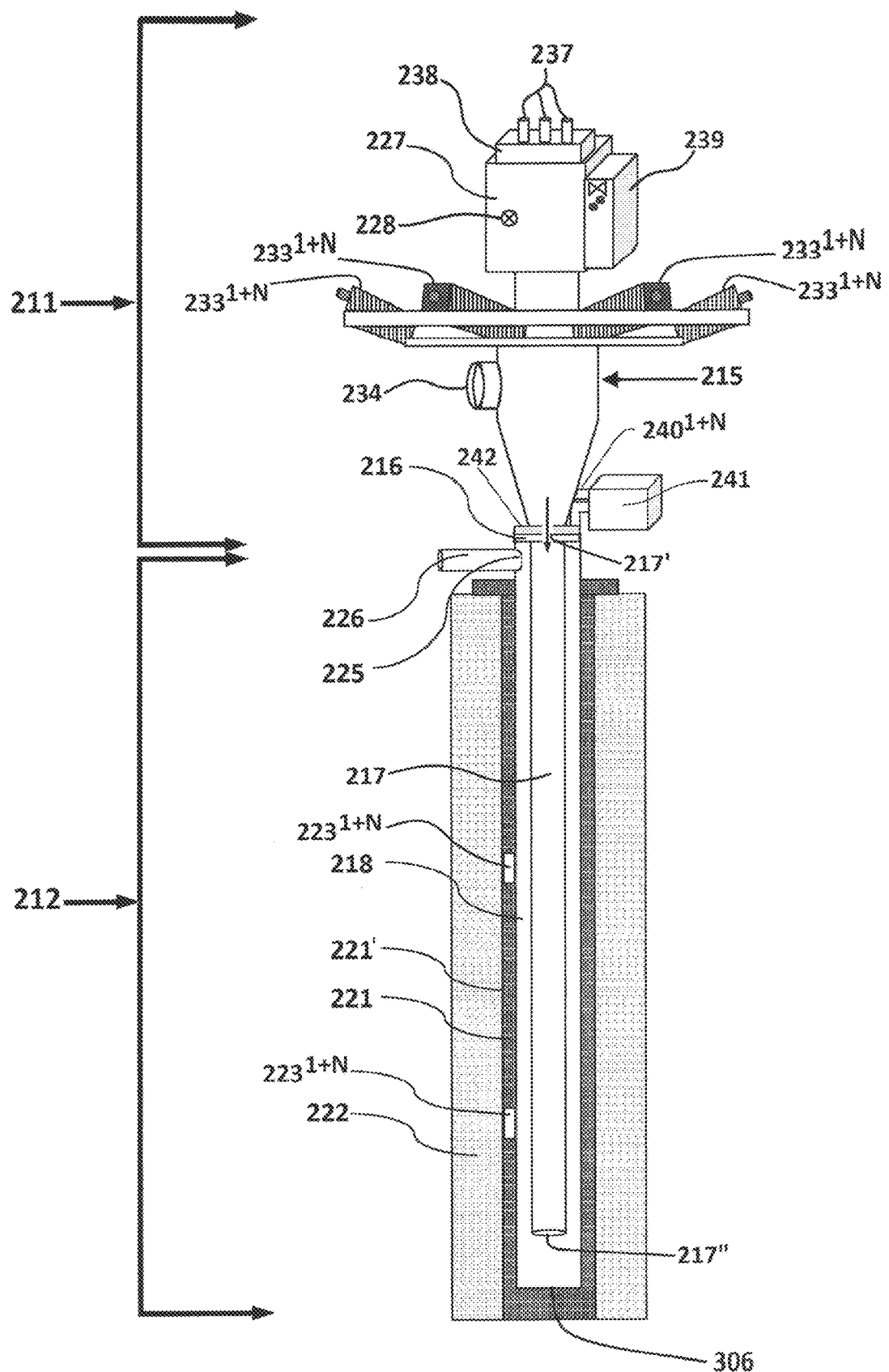
FIG. 3 depicts a front planar perspective view of an energy co-generation assembly; an energy co-generation assembly housing; and a front cross-sectional perspective view of a media heating assembly of the hybrid energy thermoelectric remediation system, according to an embodiment of the present invention.

There exists a significant, and real need within the field of thermal remediation of contaminant impacted media, and environmental remediation at large, to recover and reuse waste energy, reduce reliance on grid-based energy, reduce carbon footprint, improve the ability to differentiate longitudinal heat output at discrete intervals, and extend the practical treatment interval. The hybrid energy thermal remediation (HETR) method(s) and device(s) disclosed and claimed herein provide a simple, cost effective, and sustainable method and hybrid energy thermal remediation device that assembles devices and materials and implementation of novel features and steps in an easy to construct manner that improves upon each one of these deficits in the in the field of thermal remediation of contaminant impacted media.

In various exemplary embodiments of the present invention, the hybrid energy thermal remediation methods and devices disclosed and claimed herein can be configured to utilize a variable amount of energy and reliance from either of an energy source, be it fuel combustion, or electric resistance heating of an electrically resistive unit. Both energy sources can be configured and utilized in a grid-connected modality, partial grid connected modality, or entirely isolated from grid modality.

The preferred and exemplary embodiments of the hybrid energy thermal remediation method(s) and device(s) disclosed and claimed herein reduce the carbon footprint of the hybrid energy thermal remediation system, increase the efficacy of energy consumption and utilization, minimize reliance on traditional energy sources requiring heavy infrastructure, and circumvent many traditional utility availability constraints. Similarly, the hybrid energy thermal remediation methods and devices disclosed and claimed herein allows differential heat application both longitudinally and laterally, depending on the configuration and modality being applied.

Hybrid energy thermal remediation (HETR) method(s) and device(s) are disclosed and claimed herein which integrate a fuel combustor and an integrated thermoelectric generation device to collectively transform and apply multiform energy to an individual, or multiple connected, heating assembly(s), by means of convective, conductive, and radiative heat transfer to an outer conduit of a media heating assembly which thermally conducts heat to contaminated impacted media in contact with the hybrid energy thermal remediation device, including soils, groundwater, non-aqueous phase liquids and other matrices with the intended purpose of contaminant removal, degradation, destruction, or stabilization, thereby, remediating the contaminant impacted media.

Hereinafter, with regards to, the disclosure and claims of the present invention, the meaning of the term "contaminant impacted media" means contaminated soils, groundwater, non-aqueous phase liquids, and a variety of other matrices with the intended purpose of contaminant removal, degradation, destruction, or stabilization or bringing to a favorable alteration of contaminants within the contaminated soils, groundwater, non-aqueous phase liquids, and other matrices.

Hereinafter, with regards to, the disclosure and claims of the present invention, the meaning of the term "refractory" means common types of castable and ceramic fiber cement. The method 100 for heating a contaminant impacted media 222 for remediation of the contaminant impacted media 222 implementing a hybrid energy thermal remediation system ("HETR") 210 is disclosed below in particularity in the flow diagrams of FIGS. 1A-2B with reference to FIGS. 3-12; and the hybrid energy thermal remediation system 210 is disclosed below in FIGS. 3-12 with reference to the method 100 heating a contaminant impacted media 222 for remediation of the contaminant impacted media 222 depicted in the flow diagrams of FIGS. 1A-2B.

In the following disclosure of the detailed description, the hybrid energy thermal remediation system 210 as depicted in FIGS. 3-12, is addressed prior to the method 100 of implementation of the hybrid energy thermal remediation system 210 for heating a contaminant impacted media 222 for remediation of the contaminant impacted media 222 to provide clarity and familiarity to elements, subassemblies, devices, of the hybrid energy thermal remediation system 210 as the method 100 of implementation of the hybrid energy thermal remediation system 210 is disclosed with reference to FIGS. 1A-2B.

Figure 10:
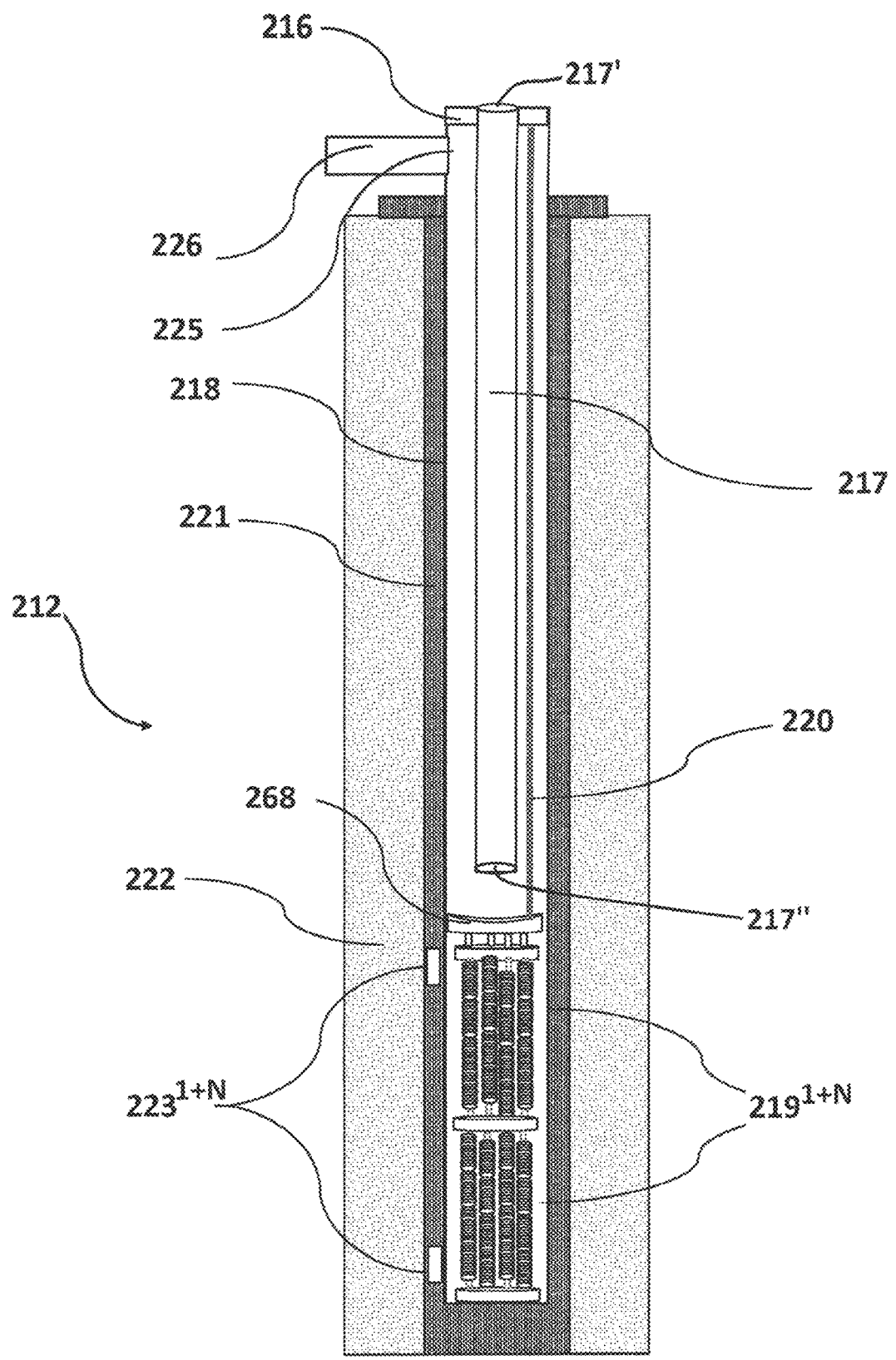
FIG. 10 depicts a cross sectional view of a media heating assembly configured with one or more electrically resistive heating units, of the hybrid energy thermoelectric system, according to an embodiment of the present invention.
Figure 11:
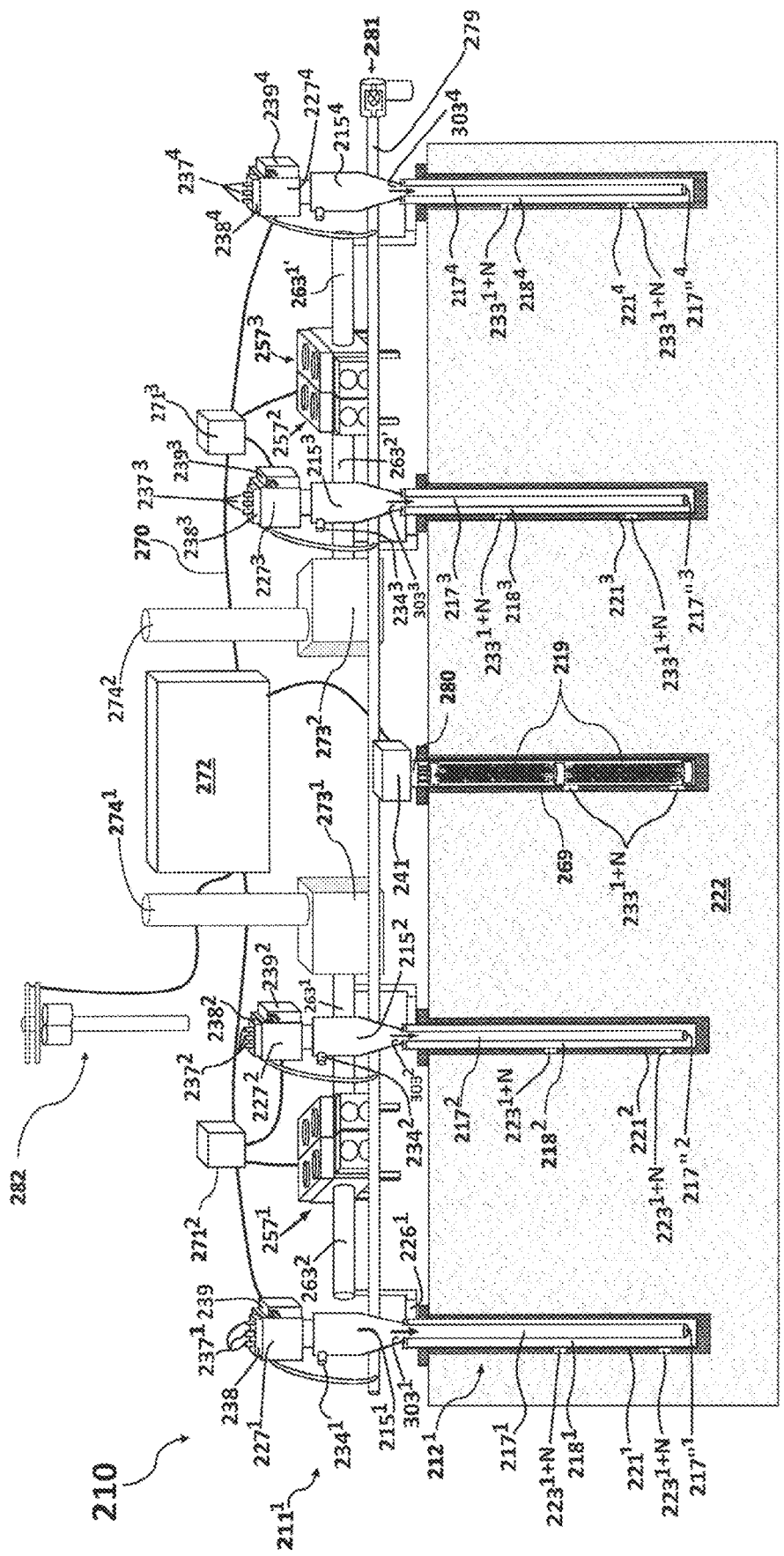
FIG. 11 depicts a hybrid energy thermal remediation system, according to an embodiment of the present invention.
Figure 12:
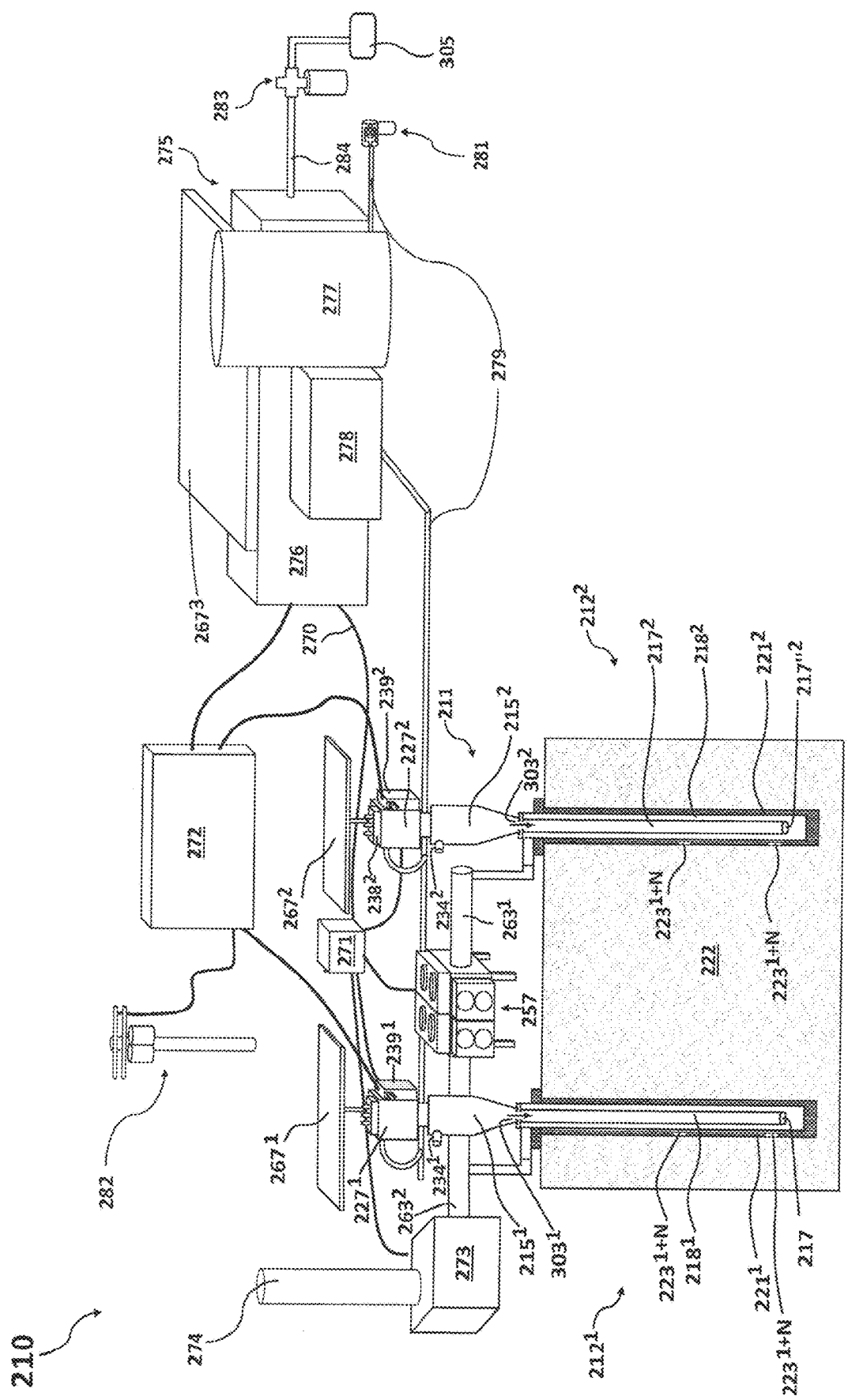
FIG. 12 depicts the hybrid energy thermal remediation system of FIG. 11 configured with a hydrogen generation system, according to an embodiment of the present invention.

FIG. 11 depicts a hybrid energy thermal remediation system 210, according to an exemplary embodiment of the present invention. FIG. 12 depicts a hybrid energy thermal remediation system 210 in another exemplary embodiment configured with a deionized water electrolyzing hydrogen generation system 275. FIGS. 3-10 depict subassemblies and devices of the hybrid energy thermal remediation system 210 which will be disclosed in detail forthwith with reference to FIGS. 11 and 12.

FIG. 11 shows an exemplary embodiment of the hybrid energy thermal remediation system 210, according to an embodiment of the present invention. FIG. 12 shows the hybrid energy thermal remediation system 210 further comprises the deionized water electrolyzing hydrogen generation system 275 according to the exemplary embodiment of the present invention, which is discussed in more detail below.

With reference to FIGS. 3-12, the hybrid energy thermal remediation system 210 comprises the hybrid energy thermal remediation system 210, and referring with particularity to FIGS. 11-12 comprises: an external electrical energy source; one or more energy co-generation assembly housings $215^{1+N}$; one or more energy co-generation assemblies $211^{1+N}$; one or more media heating assemblies $212^{1+N}$; one or more media heating assembly devices $212^{D(1+N)}$; one or more combustion air discharge chamber-thermoelectric generation (CADC-TEG) assemblies $257^{1+N}$; one or more galvanized steel spiral-duct combustion air discharge chamber (CADC) conduits 263, one or more centralized combustion air blowers $273^{1+N}$; one or more centralized combustion air discharge stacks $274^{1+N}$; a combustible fuel supply 281; a combustible fuel distribution conveyance network 279; a grid-based electric energy supply 282; a potable water source 305; a water deionization device 283; a hydrogen generating electrolyzer system 276; a centralized fuel blending unit 278; one or more centralized primary electrical energy conditioning and distribution boxes $271^{1+N}$; one or more secondary electrical energy conditioning and distribution devices $239^{1+N}$; a centralized electrical energy storage device 272; one or more auxiliary photovoltaic solar panels $267^{1+N}$; one or more electrical energy distribution cables $270^{1+N}$; one or more programmable logic controllers 224; a deionized water electrolyzing hydrogen generation system 275; a hydrogen generating electrolyzer system 276; a hydrogen gas storage unit 277; a centralized fuel blending unit 278; a combustible fuel distribution conveyance network 279; and a combustible fuel supply 281.

The deionized water electrolyzing hydrogen generation system 275, as depicted in FIG. 12, is operationally connected to the centralized electric energy storage device 272 and the hybrid energy thermal remediation system 210 by way of the one or more electrical energy distribution cables $270^{1+N}$. The deionized water electrolyzing hydrogen generation system 275 includes a water deionization device 283 having an inlet fluidly connected to the potable water source 305 and an outlet fluidly connected to a hydrogen generating electrolyzer system 276 by way of a deionized water conveyance piping 284, a hydrogen storage unit 277 fluidly connected to a centralized fuel blending unit 278 and the combustible fuel supply 281 being fluidly connected to a combustible fuel distribution conveyance network 279.

FIG. 3 depicts a front planar perspective view of an energy co-generation assembly 211; an energy co-generation assembly housing 215; and a cross-sectional view of a media heating assembly 212; of the hybrid energy thermal remediation system 210, according to an embodiment of the present invention. The hybrid energy thermal remediation system 210 as shown in FIGS. 11 and 12, includes one or more energy co-generation assemblies $211^{1+N}$; one or more energy co-generation assembly housings $215^{1+N}$; and one or more media heating assemblies $212^{1+N}$ as the hybrid energy thermoelectric remediation assembly 210 is implemented in the method 100 for heating in the contaminant impacted media 222 for the remediation of the contaminant impacted media 222.

FIG. 3 shows the energy co-generation assembly 211; the energy co-generation assembly housing 215; and the media heating assembly 212; of the hybrid energy thermoelectric remediation system 210. In an exemplary embodiment of the hybrid energy thermoelectric remediation system 210 one or more energy co-generation assemblies $211^{1+N}$ and one or more energy co-generation assembly housings $215^{1+N}$ are employed ex situ where the one or more media heating assemblies $212^{1+N}$ are employed in situ, as shown in FIGS. 11-12.

In particular, in the exemplary embodiment, as shown in FIGS. 3-4, 9-12, one or more media heating assemblies $212^{1+N}$ is inserted in situ within an identified volume of contaminant impacted media 222. In another exemplary embodiment of the present invention, the hybrid energy thermal remediation system 210 is applied to heating a contaminant impacted media 222 for remediation of the contaminant impacted media 222. In this manner, the one or more media heating assemblies $212^{1+N}$ is inserted within the contaminant impacted media in a variety of angled positions.

Figure 4:
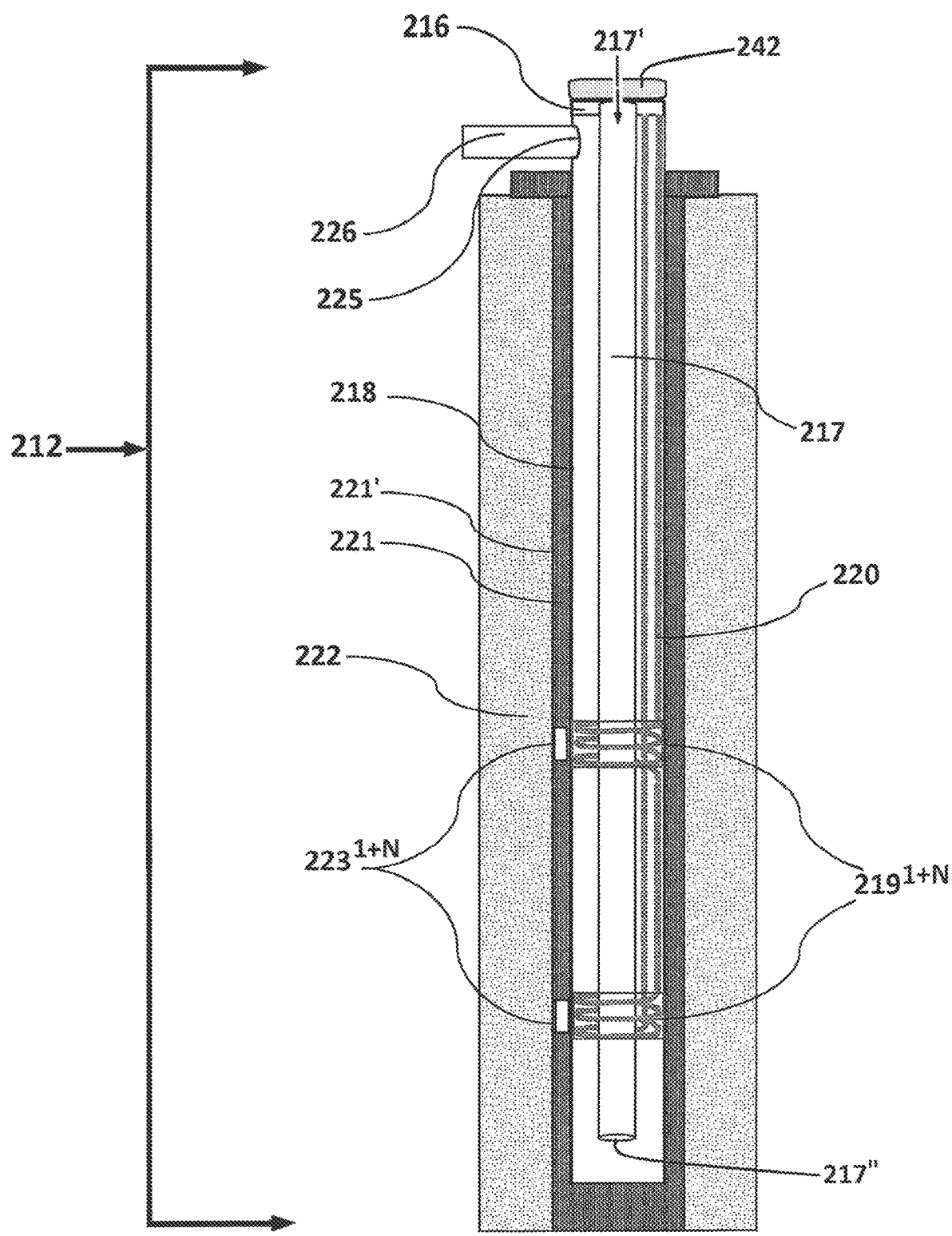
FIG. 4 depicts a cross-sectional view of the media heating assembly of FIG. 3, showing the media heating assembly inserted subterraneous into an identified volume of the contaminant impacted media, according to an embodiment of the present invention.
Figure 5:
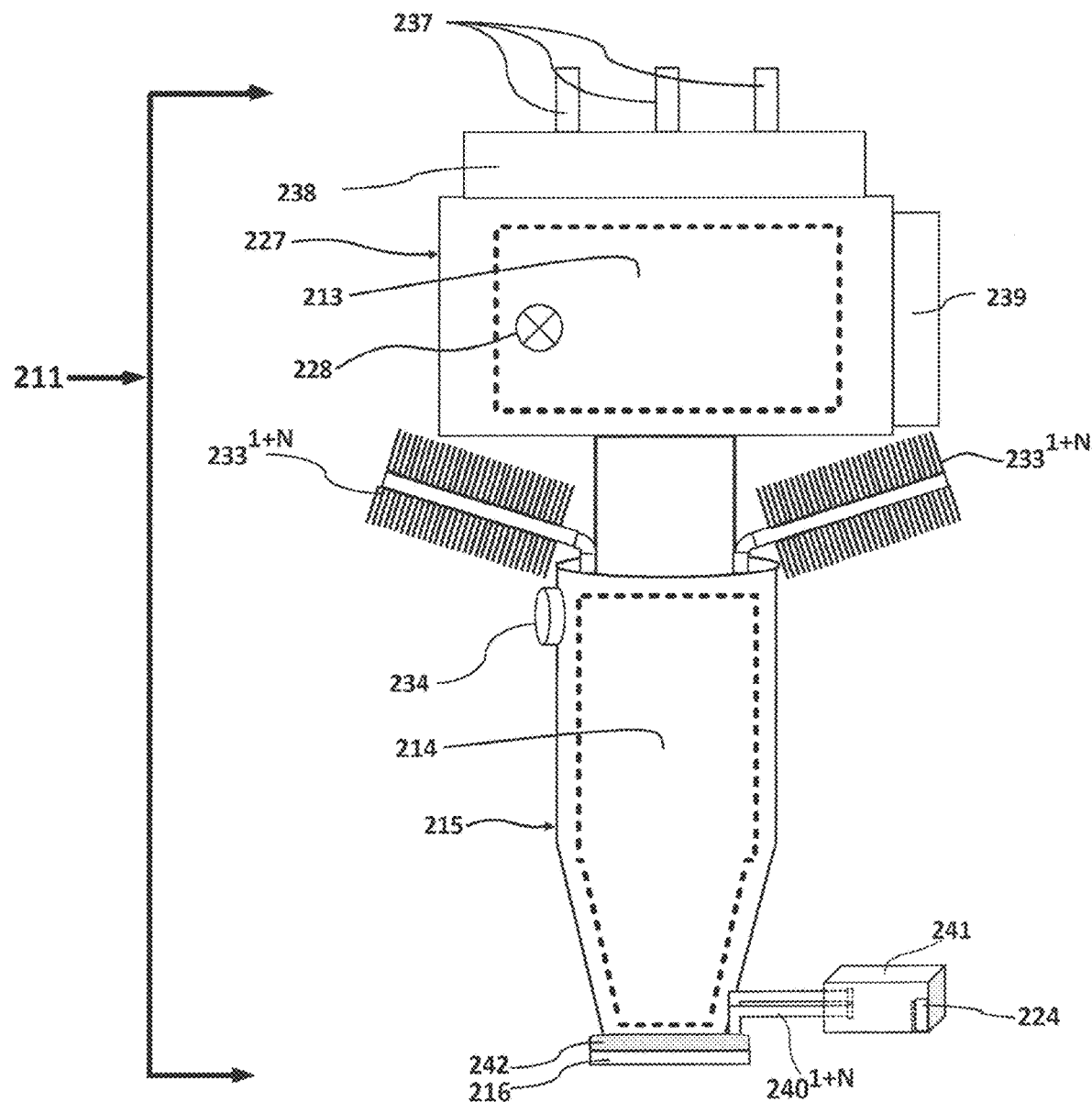
FIG. 5 depicts a perspective view of the energy cogeneration assembly and the energy co-generation assembly housing of FIG. 3, according to an embodiment of the present invention.

FIGS. 3-7 depicts the energy co-generation assembly 211, the energy co-generation assembly housing 215, and the media heating assembly 212 of the hybrid energy thermal remediation system 210. FIG. 3 shows a front perspective view of the energy co-generation assembly 211; the energy co-generation assembly housing 215; and the media heating assembly 212; of the hybrid energy thermal remediation system 210. FIG. 5 shows a front perspective view of the energy co-generation assembly 211 and the energy co-generation assembly housing 215.

FIG. 4 depicts a cross sectional view of the media heating assembly 212, showing a media heating assembly device $212^{D1}$ inserted subterraneous into an identified volume of the contaminant impacted media 222, according to an embodiment of the present invention. FIG. 5 depicts a perspective view of the energy co-generation assembly 211 and the energy co-generation assembly housing 215. Referring to FIG. 5, the fuel combustor 213 is configured being housed within a weatherproof fuel combustor enclosure housing 227 wherein the fuel combustor 213 is indicated by the dotted lines within the weatherproof fuel combustor enclosure housing 227. Referring to the energy co-generation assembly housing 215 in FIG. 5, the integrated thermoelectric generation device (TEG) is configured within the energy co-generation assembly housing 215 as indicated by the dotted lines within the energy co-generation assembly housing 215, as more particularly depicted in FIGS. 6 and 7.

Figure 6:
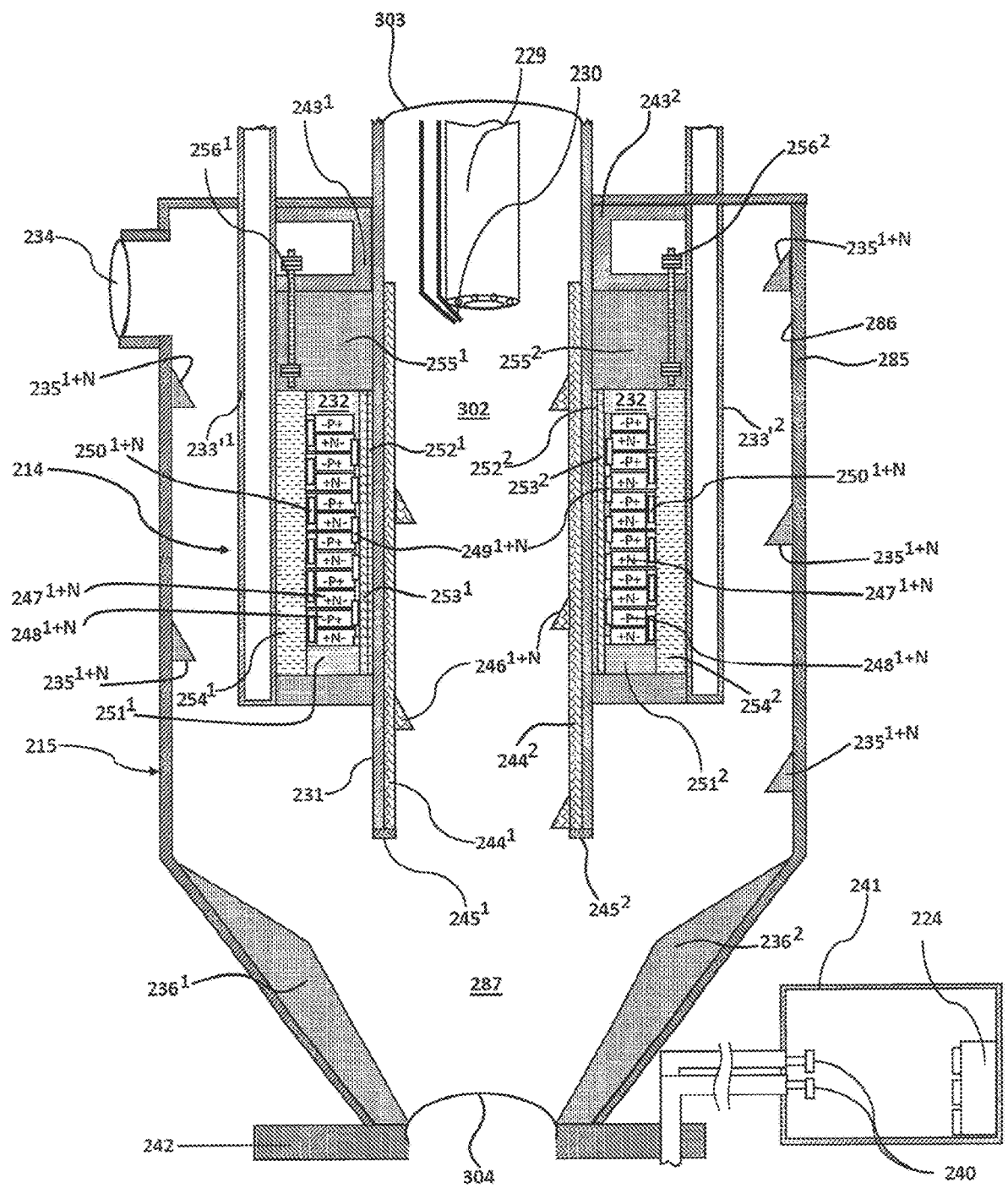
FIG. 6 depicts a cross-sectional view of the energy cogeneration assembly housing of FIG. 5 showing a cross-sectional view of an integrated thermoelectric generation device configured within the energy cogeneration assembly housing associated including one or more bent liquid filled gravity pipe heat exchangers and a burner nozzle with a fuel ignitor and a weatherproof electric connection box, of the hybrid energy thermoelectric remediation system, according to an embodiment of the present invention.
Figure 7:
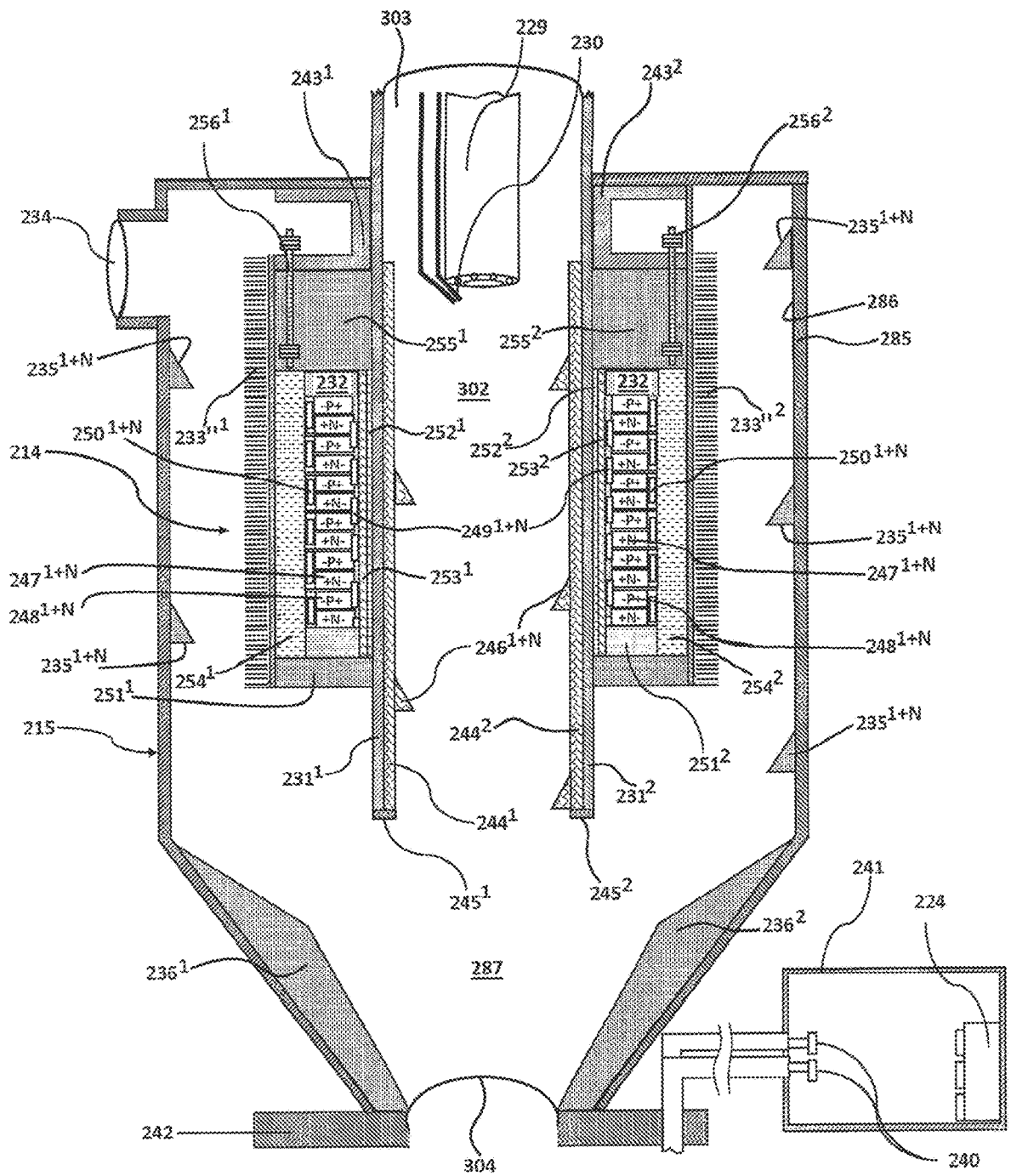
FIG. 7 depicts the cross-sectional view of the energy cogeneration assembly housing showing a cross-sectional view of the integrated thermoelectric generation device configured within the energy cogeneration assembly housing including one or more finned plate air-cooled heat exchangers and associated with a burner nozzle with a fuel ignitor; a weatherproof electrical connection box; of the hybrid energy thermoelectric remediation system, according to an embodiment of the present invention.

FIGS. 6 and 7 depict a cross-sectional view of the energy cogeneration assembly housing 215 showing a cross-sectional view of an integrated thermoelectric generation device (TEG) 214 configured within the energy co-generation assembly housing 215 associated with a burner nozzle 229 with a fuel ignitor 230 and a weatherproof electric connection box 241, discussed in more detail below. FIGS. 6 and 7 depict the cross-sectional view of the energy co-generation assembly housing 215 showing a cross-sectional view of the integrated thermoelectric generation device (TEG) 214 configured within the energy co-generation assembly housing 215 including one or more heater exchangers $233^{1+N}$ and associated with the burner nozzle 229 and with the fuel ignitor 230; the weatherproof electrical connection box 241; discussed in more detail below, of the hybrid energy thermal remediation system 210, according to an embodiment of the present invention.

With reference to FIGS. 3 and 5-7, each of the energy co-generation assembly 211 of the one or more energy co-generation assemblies $211^{1+N}$ comprises: a secondary electrical energy conditioning and distribution device 239; a weatherproof fuel combustor enclosure housing 227; a controllable primary combustor air aperture 228 disposed within the weatherproof fuel combustor enclosure 227; a fuel combustor 213 configured within the weatherproof fuel combustor enclosure housing 227, as indicated in dotted lines, in FIG. 5, having a series of indicator lights 237 for displaying a status of the energy co-generation assembly 211; one or more energy co-generation assembly combustion air conduits $231^{1+N}$, as shown in FIGS. 6 and 7, wherein each of the energy co-generation assembly combustion air conduits $231^{1+N}$ includes a proximal end and a distal end; a battery 238, wherein the battery 238 is disposed atop the weatherproof fuel combustor enclosure housing 227; an energy co-generation assembly housing 215 supporting one or more integrated thermoelectric generation devices (TEG) $214^{1+N}$, as shown in FIGS. 6-7.

Figure 9:
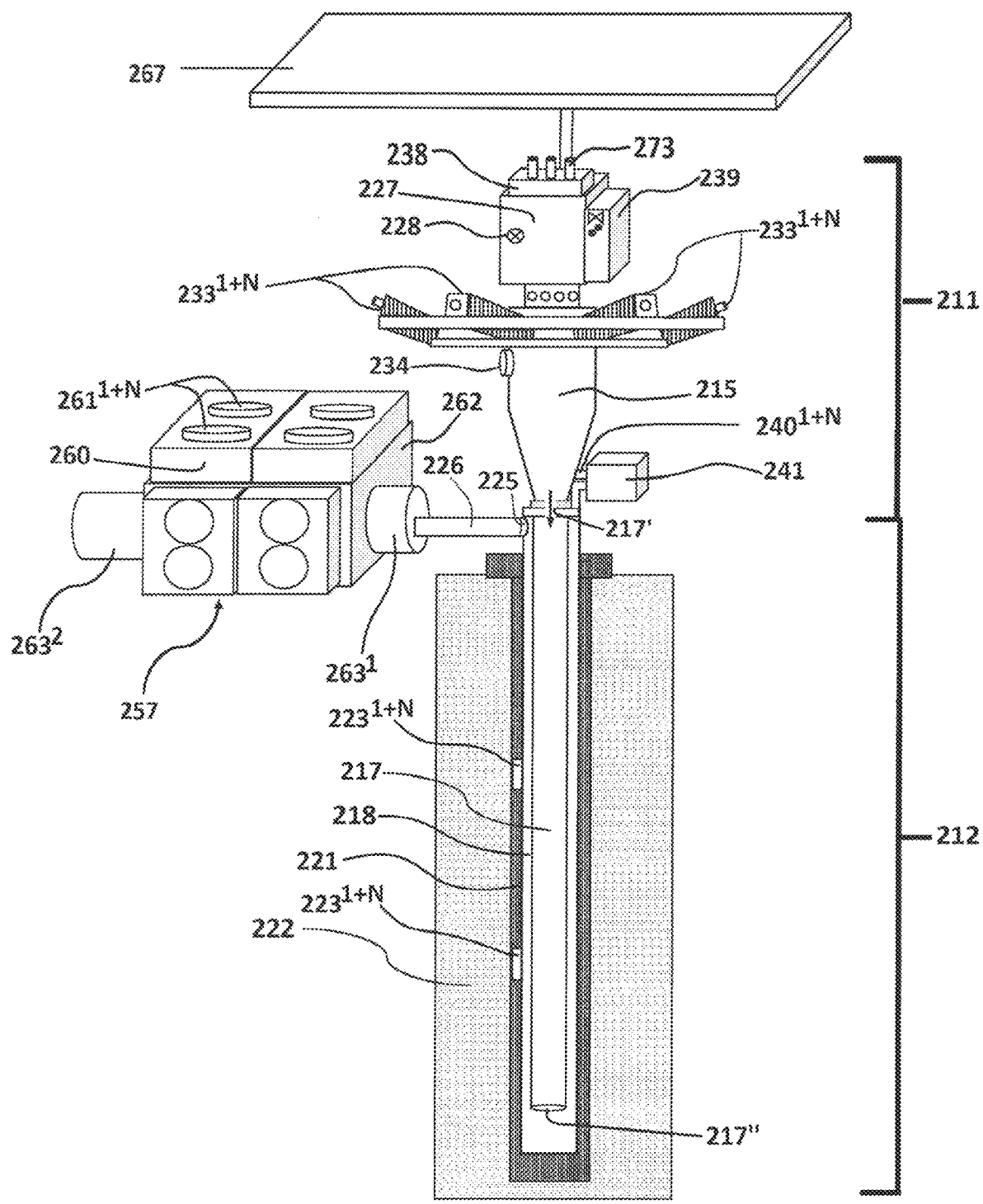
FIG. 9 depicts a front perspective view of the energy co-generation assembly and an energy co-generation assembly housing and the cross-sectional view of the media heating assembly of configured with an auxiliary photovoltaic solar panel and a combustion air discharge chamber thermoelectric generation assembly of FIG. 5, of the hybrid energy thermoelectric remediation system, according to an embodiment of the present invention.

With reference to FIGS. 3 and 5-7, each of the one or more energy co-generation assemblies $211^{1+N}$ includes the fuel combustor 213 which is fluidly connected to an energy co-generation assembly housing inner chamber 287 of an energy co-generation assembly housing 215 of the one or more energy co-generation assembly housings $215^{1+N}$ by way of a double flanged top connector 243, as shown in FIGS. 6 and 7 with reference to FIGS. 3, 5 and 9.

As shown in FIGS. 3 and 5-7 the energy co-generation assembly housing $215^1$ of each of the one or more energy co-generation assembly housings $215^{1+N}$, comprises: an outer peripheral wall 285 and an inner peripheral wall 286 securing an energy co-generation assembly housing inner chamber 287; a fuel inlet channel 302; one or more heat tube combustion air diffusers $246^{1+N}$ disposed on the inner peripheral wall of the energy co-generation assembly housings $215^{1+N}$; a burner nozzle 229; a fuel igniter 230; one or more heat tubes $244^{1+N}$; one or more heat exchangers $233^{1+N}$; three apertures, the three apertures including a top aperture 303, an induced air aperture 234, and a bottom aperture 304; one or more heat shielding components; and one or more combustion air diffusers $235^{1+N}$.

Looking with particularity to FIGS. 6 and 7, with reference to FIGS. 3, 5 and 9, the top aperture 303 of the energy co-generation assembly housing $215^1$ is disposed at a proximal end of the energy co-generation assembly housing 215 providing a fluid connection to the energy co-generation assembly housing inner chamber 287 allowing the one or more of the energy co-generation assembly combustion air conduit 231, the burner nozzle 229, and the fuel ignitor 230 to extend through an upper, portion of the energy co-generation assembly housing inner chamber 287. The induced air aperture 234 is disposed in an upper side portion of the energy co-generation assembly housing 215 fluidly connected to the energy co-generation assembly housing inner chamber 287.

The bottom aperture 304 disposed at a distal end of the energy co-generation assembly housing 215 is connected to the media heating assembly device $212^{D(1+N)}$ of the one of the one or more media heating assembly devices $212^{D(1+N)}$ such that the energy co-generation assembly housing inner chamber 287 of the energy co-generation assembly housing 215 is fluidly connected to the inner combustion air conduit of the media heating assembly devices $212^{D(1)}$ of the one or more media heating assemblies $212^{(1+N)}$ by way of a flanged collar 242. FIGS. 6 and 7 depicting the cross-section of the energy co-generation assembly housing 215 shows each energy co-generation assembly combustion air conduits $231^1$ of the one or more energy co-energy assembly combustion air conduits $231^{1+N}$ is positioned congruent to a corresponding heat tube 244 of the one or more heat tubes $244^{1+N}$ being terminated at a single rim 245 in a lower portion of the energy co-generation assembly housing inner chamber 287.

In addition, the energy co-generation assembly housing 215 includes one or more heat shielding components. The one or more heat shielding components can comprise one or more refractory materials $236^{1+N}$; one or more refractory cement conduit seals $255^{1+N}$; and one or more combustion air diffusers $235^{1+N}$. In the exemplary embodiment of the present invention, the one or more refractory materials $236^{1+N}$ are applied to an angled lower portion of the inner peripheral wall 286 of the energy co-generation assembly housing inner chamber 287 proximate to the bottom aperture 304 of the energy co-generation assembly housing 215. The one or more refractory cement conduit seals $255^{1+N}$ are each anchored by one or more cast in-place anchoring bolts $256^{1-N}$ located at an upper proximal end of the energy co-generation assembly housing inner chamber 287 one or more combustion air diffusers $235^{1+N}$ affixed to the inner peripheral wall 286 of the energy co-generation assembly housing inner chamber 287.

The one or more combustion air diffusers $235^{1+N}$ are affixed to the inner peripheral wall 286 of the energy co-generation assembly housing inner chamber 287. The energy co-generation assembly housing 215 secures therein one or more intergraded thermoelectric generation devices (TEG) $214^{1+N}$, as shown in FIGS. 6 and 7. Each of an integrated thermoelectric generation device $214^1$ of each of the one or more integrated thermoelectric generation devices (TEG) $214^{1+N}$ comprises one or more sealed thermoelectric generation units $251^{1+N}$. Each of the one or more sealed thermoelectric generation units $251^{1+N}$ includes a hot side and a cold side to generate electrical energy.

As shown in FIGS. 6 and 7 each of the one or more sealed thermoelectric generation units $251^{1+N}$, comprises a stack of semiconductor-based thermocouples $232^{1+N}$. The stack of semiconductor-based thermocouples $232^{1+N}$ comprises an alternating series of +N− semiconductor materials 247 and −P+ semiconductor materials 248 each joined electrically to one or more hot side electrodes $249^{1+N}$ and to one or more cold side electrodes $250^{1+N}$. The one or more hot side electrodes $249^{1+N}$ are insulated by an electric insulator 253 being disposed between the stack of semiconductor-based thermocouples $232^{1+N}$ and a thermally conductive high temperature compatible material 252 being disposed congruent to a corresponding energy co-generation assembly combustion air conduit $231^1$ of the one or more energy co-generation assembly combustion air conduit $231^1$. The hot side of the integrated thermoelectric generation device is formed proximate to the corresponding energy co-generation assembly combustion air conduit $231^1$ of the one or more energy co-generation assembly combustion air conduit $231^1$.

A thermally conductive high temperature compatible material 252 is disposed between the electrical insulator 253 and the corresponding energy co-generation assembly combustion air conduit $231^1$ being congruent to the corresponding heat tube 244. The one or more cold side electrodes $250^{1+N}$ are insulated by the electric insulator 253. The one or more cold side electrodes $250^{1+N}$ are disposed between the stack of semiconductor-based thermocouples $232^{1+N}$ and the thermally conductive low temperature compatible material 254. The thermally conductive low temperature compatible material 254 being disposed between the stack of semiconductor-based thermocouples and an operationally connected heat exchanger $233^1$ of the one or more heat exchangers $233^{1+N}$ of the integrated thermoelectric generation device (TEG) 214 whereby the cold side of the integrated thermoelectric generation device (TEG) 214 is formed proximate to the corresponding heat exchanger $233^1$.

With reference to FIGS. 6 and 7, a thermally conductive low temperature compatible material 254 is disposed between the one or more cold side electrodes $250^{1+N}$ associated with the stack of semiconductor-based thermocouples $232^{1+N}$ and the operationally connected heat exchanger 233 of the one or more heat exchangers $233^{1+N}$ of the integrated thermoelectric generation device (TEG) 214 whereby the cold side of the integrated thermoelectric generation device (TEG) 214 is formed proximate to the operationally connected heat exchangers 233.

Referring to FIGS. 3-4 and 9-12, the media heating assembly 212 of the one or more media heating assemblies $212^{1+N}$ is shown. FIGS. 3-4 and 9-12 shows a front perspective cross-sectional view of a media heating assembly device $212^{D1}$ of the one or more heating assemblies $212^{1+N}$ being operationally attached to the energy co-generation assembly 211 of the one or more energy co-generation assemblies $211^{1+N}$ wherein the energy co-generation assembly 211 includes the fuel combustor 213 which is operationally connected to the energy co-generation assembly housing 215. As shown in this exemplary embodiment, the media heating assembly device $212^{D1}$ is inserted in situ into the identified volume of contaminant impacted media 222 having the energy co-generation assembly 211 including the fuel combustor 213 and energy co-generation assembly housing 215 including the integrated thermoelectric generation device (TEG) 214 being disposed ex situ.

In another embodiment, the media heating assembly device $212^{D1}$ is inserted in any of a variety of predetermined angles into a designated contaminant impacted media 222 that is indicated for remediation. As shown in FIGS. 3-4 and 9-12, the media heating assembly device $212^{D1}$ of each of the one or more media heating assemblies $212^{1+N}$ comprises a flanged collar connector cap 216; an inner combustion air conduit 217 wherein the inner combustion air conduit 217 configured with an inner combustion air conduit inlet portal 217' and an inner combustion air conduit outlet portal 217''; an outer thermally conductive heating conduit 218; a combustion air discharge conduit 226 fluidly connected to a combustion air exhaust aperture 225 located on a proximal end of the outer thermally conductive heating conduit 218; one or more combustion air deflectors 268, as shown particularly in FIG. 10, disposed between the inner combustion air conduit outlet portal 217'' of the media heating assembly device $212^{D(1)}$ and a proximal edge of the electrically resistive heating unit 219 of the media heating assembly device $212^{D(1)}$; a heat tolerant electrically conductive low resistivity electrical cable and electrical connections 220, as shown particularly in FIG. 10; one or more electrically resistive heating units $219^{1+N}$; an annulus space 221' associated with a heat tolerant thermally conductive annulus fill 221; one or more external temperature monitoring thermocouples $223^{1+N}$ located within the heat tolerant thermally conductive annulus fill 221 of the annulus space 221'. A weatherproof electrical connection box 241, with reference to FIGS. 3, 5-7 and 9, is electrically operationally configured with electric connections $240^{1+N}$ to the one or more electrically resistive heating units $219^{1+N}$ and a programmable logic controller 224 of the one or more programmable logic controllers $224^{1+N}$ electrically and operationally connected to the one or more external temperature monitoring thermocouples $223^{1+N}$ and the one or more secondary electrical energy conditioning and distribution devices $239^{1+N}$.

Figure 8:
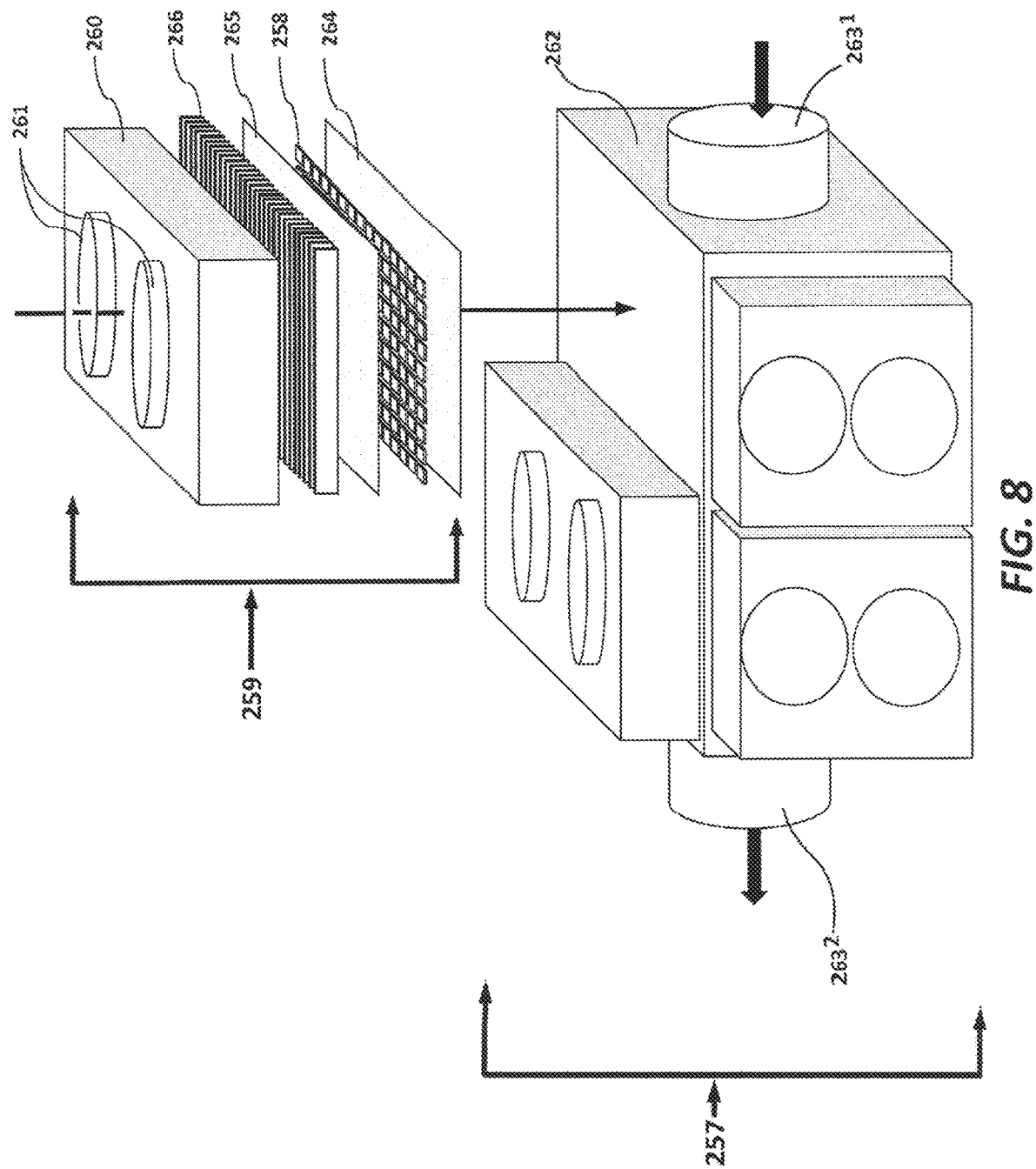
FIG. 8 depicts a perspective view of a combustion air discharge chamber thermoelectric generation assembly including ventilated enclosures being integrated with externally mounted thermoelectric cogeneration devices including a finned heat sink, a cold side heat transfer material, a hot side heat transfer material, thermoelectric generation modules, and air circulation fans, of the hybrid energy thermoelectric remediation system, according to an embodiment of the present invention.

Referring to FIGS. 8-9 and 11-12, and with more particularity to FIG. 8, each of the combustion air discharge chamber-thermoelectric generation assembly 257 of the one or more combustion air discharge chamber-thermoelectric generation assemblies $257^{1+n}$, comprises a combustion air discharge chamber (CADC) 262 having a rectangular shape; one or more externally mounted thermoelectric generation devices $259^{1+N}$; a finned heat-sink 266 for creating a cold side of a thermoelectric-generation module 258; a ventilated enclosure 260 with one or more air circulation fans $261^{1+N}$ to remove heat from the finned heat-sink 266.

The combustion air discharge chamber (CADC) 262 is constructed with thermally conductive temperature compatible metal, the combustion air discharge chamber (CADC) 262 including a galvanized steel spiral combustion air discharge chamber conduit 263 having an influent end $263^1$ and an effluent end $263^2$. The galvanized steel spiral combustion air discharge chamber (CADC) conduit 263 passes longitudinally through the center of the combustion air discharge chamber (CADC) 262 wherein, the influent end $263^1$ of the galvanized steel spiral combustion air discharge chamber (CADC) conduit 263 is fluidly connected to any one of the one or more centralized combustion air blowers $273^{1+N}$ and the effluent end $263^2$ is fluidly connected to the energy co-generation assembly housing inner chamber 287 within an energy co-generation assembly housing 215 operationally connected to an energy co-generation assembly 211 of the one or more energy co-generation assemblies $211^{1+N}$.

As shown in FIG. 8, the one or more of externally mounted thermoelectric generation devices $259^{1+N}$ are consecutively adhered on at least one side of the combustion air discharge chamber (CADC) 262 providing a heat source for a hot side of the combustion air discharge chamber 262. The one or more of externally mounted thermoelectric generation devices $259^{1+N}$ consecutively adhered to the at least one side of the combustion air discharge chamber (CADC) 262 includes a hot side heat transfer material 264; the thermoelectric generation module 258; and a cold side heat transfer material 265 which generates increased level of electricity as the temperature delta between the hot side and the cold side of the combustion air discharge chamber (CADC) 262 and the thermoelectric generation modules 258 increases.

In a preferred embodiment, the hybrid energy thermal remediation system 210 is comprised of a combustion system including the fuel combustor 213 centered around a commercially available combustor that uses liquid fuels such as gasoline, diesel, bio-diesel, propane, compressed liquid natural gas, or fuel gases such as natural gas, propane, hydrogen, or other renewable fuels which may be generated on-site, and blends of different fuels to generate heat through a focused and controlled combustion reaction. The heat generated by the fuel combustor 213 is pushed, using positive pressure by combustion fans (not shown) within the one or more fuel combustors $213^{1+N}$, induced using vacuum or negative pressure, through device conduits spanning the contaminant impacted media 222 using external combustion air blowers, or both, operating as an induced draft flow, or balanced draft flow system.

As shown in FIGS. 3, the fuel combustor 213 is located on the upper, or proximal, end of the vertical, angled, or horizontally oriented hybrid energy thermal remediation system 210 which is secured to the energy co-generation assembly housing 215 where it is integrated with the integrated thermoelectric generation device (TEG) 214 of one or more integrated thermoelectric generation devices (TEG) $214^{1+N}$ wherein each integrated thermoelectric generation device (TEG) 214 is configured with the stack of semiconductor based-thermocouples $232^{1+N}$. The fuel combustor 213 and integrated thermoelectric generation device (TEG) 214 is fluidly operationally connected by way of the energy co-generation assembly housing inner chamber 287 of the energy co-generation assembly housing 215, providing an energy co-generation assembly 211, as shown in FIGS. 3, 5, and 9.

The energy co-generation assembly housing 215 is configured using standard design and construction principles inherent to regulation combustion systems. In an exemplary embodiment of the energy co-generation assembly housing 215, the energy co-generation assembly housing 215 is constructed with a refractory cement to insulate non compatible materials from high temperature sources. The energy co-generation assembly housing inner chamber 287 of the energy co-generation assembly housing 215 is configured as an annulus between the heat tube 244 and outer peripheral walls of the energy co-generation assembly housing 215 which feature one or more screw, spiral or finned structures formed from materials, such as steel or refractory, to promote air circulation and cooling to the internal heat sink (cold side), and to promote mixing and control of the energy co-generation assembly discharge by-products into the inner combustion air conduit 217 of each of the media heating assembly devices $212^{D(1+N)}$ of the one or more media heating assemblies $212^{1+N}$. Refractory is used where necessary and applicable to the inside of the energy co-generation assembly housing 215 to shield each of the energy co-generation assembly combustion air conduits $231^{1+N}$ of the one or more energy co-generation assemblies $211^{1+N}$, or internal components, from excess temperatures. The term refractory is used herein to refer to common types of castable and ceramic fiber cement.

In the preferred embodiment, each of the one or more integrated thermoelectric generation assembly (TEG) $214^{1+N}$ includes the integrated thermoelectric generation device $214^{D(1)}$ maintained and supported within a coexistent energy co-generation assembly housing $215^{1}$. The integrated thermoelectric generation assembly device (TEG) $214^{D(1)}$ including the stack of semiconductor based-thermocouples $232^{1+N}$ which can either surround the one or more energy co-generation assembly combustion air conduits $231^{1+N}$, or penetrate the flue stream on the inside of the one or more energy co-generation assembly combustion air conduits $231^{1+N}$, of the one or more integrated thermoelectric generation devices (TEG) $214^{D(1)}$, and the one or more heat tubes $244^{1+N}$ to form the hot side of the one or more integrated thermoelectric generation devices (TEG) $214^{D(1)}$. A heat tube 244 installed inside of the energy co-generation assembly combustion air conduits $231^{1+N}$ can serve as a partial heat sink to improve heat conductance and control temperature on the hot side or heat sink side (cold side) of the one or more integrated thermoelectric generation devices (TEG devices) $214^{D(1)}$.

In the preferred embodiment, the length of the heat tube, which may form the hot side of the integrated thermoelectric generation device (TEG) 214 may be 6.00 inches longitudinally, preferably 12.00 inches, and includes a length of 24.00 inches. The heat tube 244 can be constructed with screw, spiral, or finned structures inside of the heat tube 244, acting as a combustion air diffuser, which may improve homogeneity of heat within the one or more integrated thermoelectric generation devices (TEG devices) $214^{D(1)}$ and increase energy efficiency within the one or more media heating assemblies $212^{1+N}$ and the greater hybrid energy thermal remediation system (HETR) 210. Similarly, this heat tube 244 can regulate conditions and improve mixing with induced air flow through the one or more energy co-generation assemblies $211^{1+N}$ favorably controlling output conditions of the one or more integrated thermoelectric generation device(s) (TEG) $214^{D(1)}$.

Commercially available thermoelectric generation devices TEG) that can be integrated into the in the exemplary embodiment of the present invention to provide the one or more integrated thermoelectric generation devices (TEG) $214^{D(1)}$ exist in a multitude of configurations and materials. The integrated thermoelectric generation devices (TEG) $214^{D(1)}$ provide optimal efficiency at temperature deltas of 300° C. or higher, preferably 400° C., and possibly upwards of 600° C. with a maximum heat tolerance on the hot side of temperatures between 500° C. to 800° C. The heat sink or cold side of the integrated thermoelectric generation device(s) (TEG) $214^{D(1)}$ within each of the energy co-generation assembly $211^{1}$ of the one or more energy co-generation assemblies $211^{1+N}$ is cooled using any one of ambient air, air-cooled fan systems, or using a liquid-based heat exchanger such as bent gravity or loop style pipe heat exchangers, depending on the ambient air temperatures and climate of the application of the method of the remediation of the contaminant impacted media 222.

The energy co-generation assembly housing 215 of the energy co-generation assembly $211^{1}$ of the one or more energy co-generation assemblies $211^{1+N}$ secures to a corresponding media heating assembly $212^{1}$ of the one or more media heating assemblies $212^{1+N}$ by way of the flanged collar 242 connection to a flanged collar connector cap 216 disposed at a proximal end of the inner combustion air conduit 217 which is open ended having an inner combustion air conduit inlet portal 217' and an inner combustion air conduit outer portal 21" thereby the inner combustion air conduit 217 thereby fluidly connecting the energy co-generation assembly housing inner chamber 287 to the inner combustion air conduit 217 of the media heating assembly $212^{1}$.

The inner combustion air conduit inlet portal 217' and the inner combustion air conduit outlet portal 217" of the inner combustion air conduit 217 measuring between 2.00 inches and 5.00 inches in nominal diameter. The bottom closed end 306 of the outer thermally conductive heating conduit 218 can be between 4.00 and 8.00 inches in nominal diameter. In the preferred embodiment, the inner combustion air conduit 217 can be 3.50 inches in nominal diameter, and the outer thermally conductive heating conduit 218 may be 6.00 inches in nominal diameter. The combustion air may be circulated through the inner combustion air conduit 217 and up the outer thermally conductive heating conduit 218 where the combustion air is discharged through the combustion air exhaust aperture 225 venting into the combustion air discharge conduit 226 as shown in FIGS. 3 and 9, being directed into a fluidly connected combustion air discharge chamber-thermoelectric generation assembly (CADC-TEG)

$257^1$ of the one or more combustion air discharge chamber-thermoelectric generation assemblies $257^{1+N}$, as shown in FIGS. 9 and 11-12, with reference to FIG. 8. The discharge temperature of the combustion process at the discharge point can be between 150° C. and 600° C., depending on the length of the connected media heating assembly $212^1$ and the burner output parameters as it enters the combustion air discharge chamber-thermoelectric generation assembly (CADC-TEG) 257.

In another exemplary embodiment of the hybrid energy thermal remediation system (HETR) 210, the combustion air discharge chamber-thermoelectric generation assembly (CADC-TEG) 257 is used as a location for the externally mounted thermoelectric generation devices $259^{1+N}$, as shown in FIG. 8. In the exemplary embodiment of the hybrid energy thermal remediation system (HETR) 210, the combustion air discharge chamber (CADC) 262 of the combustion air discharge chamber-thermoelectric generation assembly (CADC-TEG) 257 is mounted with the externally mounted thermoelectric generation device 259 including a finned heat-sink 266, a cold side heat transfer material, a thermoelectric generation module, and a hot side heat transfer material 264. The externally mounted thermoelectric generation devices (TEG) provide an additional thermoelectric generation source from waste heat prior to discharge through a fluidly connected centralized combustion air blowers $273^1$ of the one or more centralized combustion air blowers $273^{1+N}$ and a fluidly connected centralized combustion air discharge stacks $274^1$ of the one or more centralized combustion air discharge stacks $274^{1+N}$ of the combustion air discharge chamber-thermoelectric generation assembly (CADC-TEG) 257.

In yet another exemplary embodiment of the present invention, the integrated thermoelectric generation device (TEG) 214 is fluidly connected to the combustion air discharge chamber-thermoelectric generation assembly (CADC-TEG) $257^1$ which is used as a primary externally mounted thermoelectric generation device $259^1$ of a primary energy cogeneration assembly $211^1$ of the one or more energy co-generation assemblies $211^{1+N}$ of the hybrid energy thermal remediation system (HETR) 210. Referring to FIGS. 8-9 and 11-12, the combustion air discharge chamber-thermoelectric generation assembly (CADC-TEG) $257^1$ can range in size and shape depending on the application and one or more externally mounted thermoelectric generating devices $259^{1+N}$ being applied. In the preferred embodiment of the present invention, the combustion air discharge chamber-thermoelectric generation assembly (CADC-TEG) $257^1$ consists of a rectangular, 24.00 inches in height by 24.00 inches wide by 36.00 inches long metal housing configured with one or more combustion air discharge chambers $262^{1+N}$ configured with the galvanized steel spiral combustion air discharge chamber (CADC) conduit 263 having an influent end $263^1$ and an effluent end $263^2$ extending through each opposing ends of the galvanized spiral combustion air discharge chamber (CADC) $262^1$ of each of the combustion air discharge chamber-thermoelectric generation assembly (CADC-TEG) $257^1$, as shown in FIGS. 8-9, and 11-12.

In this exemplary embodiment, any one of three sides of the combustion air discharge chamber (CADC) $262^{1+N}$ is used as the heat source (hot side). Any one of the three sides of the combustion air discharge chambers (CADC) $262^{1+N}$ are covered and adhered with the one or more of the externally mounted thermoelectric generation devices $259^{1+N}$ including the hot side heat transfer material 264, the thermoelectric generation module 258; and the cold side heat transfer material 265, a finned heat-sink 266, generating increased level of electricity as the temperature delta between the hot side and the cold side of the combustion air discharge chamber (CADC) 262 and the thermoelectric generation modules 258 increases. The heat sink on the cold side may also be constructed using liquid filled heat exchanger systems, particularly in applications where ambient air temperatures are higher, or airflow may be restricted such as indoor applications.

The combustion air discharge chamber (CADC) $262^{1+N}$ can be assembled using commercially available materials and devices. Similarly, fully assembled and self-contained thermoelectric generation systems are commercially available from a number of different market sectors and vendors, which may include electrical wiring, distribution systems, heat exchanger(s), and ventilation systems, and are well suited to provide the one or more externally mounted thermoelectric generation devices $259^{1+N}$. The commercially available self-contained thermoelectric generation systems can provide the one or more combustion air discharge chamber-thermoelectric generation assemblies (CADC-TEG) $257^{1+N}$.

The one or more externally mounted thermoelectric generation devices $259^{1+N}$ in the exemplary embodiment of the present invention endure optimal efficiency at temperature deltas of 100° C. or higher, with a capacity to endure deltas of up to 300° C. with a maximum heat tolerance on the hot side of temperatures between 150° C. to 350° C. and cold side temperature between 0 and 80° C. The hybrid energy thermal remediation system (HETR) 210 includes a wide range of individual stacks of semiconductor-based thermocouples $232^{2+N}$, with as few as 1 to 10 and includes over 500 one or more semiconductor-based thermocouples $232^{2+N}$ of varying design, materials, and compatibility.

Electrical power sources integrated with the hybrid energy thermal remediation system (HETR) 210, in addition to, or as a substitution to, the grid-based electric energy supply 282, as shown in FIGS. 11 and 12, are provided by any one of the following electrical power sources comprising the one or more integrated thermoelectric generation devices $214^{1+N}$ integrated into the energy co-generation assembly housing 215, the one or more externally mounted thermoelectric generation devices $259^{1+N}$ of the one or more combustion air discharge chamber-thermoelectric generation (CADC-TEG) assemblies $257^{1+N}$, and one or more auxiliary DC electricity generating devices that may be incorporated such as one or more auxiliary photovoltaic solar panels $267^{1+N}$, or turbine generators, all of which connect back to main terminal block(s) prior to making an electrical connection to the one or more secondary electrical energy conditioning and distribution devices $239^{1+N}$ and voltage limiting modules. The one or more secondary electrical energy conditioning and distribution devices $239^{1+N}$ prevents the DC power source(s) from exceeding voltage setpoint to ensures that the power unit operates within the optimal power region and that the maximum tolerable power unit voltage may not be exceeded. A DC-to-DC converter is used to adjust the voltage output of the voltage limiting modules. A shunt style regulator and voltage limiter can be is included to divert power from the one or more batteries $238^{1+N}$ or devices of the hybrid energy thermal remediation system (HETR) 210 being directly powered by the one or more integrated thermoelectric generation devices $214^{1+N}$ and/or the one or more externally mounted thermoelectric generation devices $259^{1+N}$ to the one or more electrically resistive heating units $219^{1+N}$ disposed in an annulus of the outer thermally conductive heating conduit 218 of the media heating assembly device 212 of one or more media heating assemblies 212$^{1+N}$.

The one or more secondary electrical energy conditioning and distribution devices 239$^{1+N}$ provide optimal load conditions, constant voltage, and protect from overvoltage and reverse current from connections. Power generation modules, and the battery 238 can feature a series of indicator lights 237, which signal displaying a status of the energy co-generation assembly 211, the one or more integrated thermoelectric generation device (TEG) 214$^{1+N}$ or the one or more externally mounted thermoelectric generation devices 259$^{1+N}$ is producing electricity, and/or how that electricity is being used by the hybrid electric thermal remediation system (HETR) 210.

In an exemplary embodiment of the present invention, the integrated thermoelectric generation device 214$^{1+N}$ of the energy co-generation assembly 211$^{1+N}$ can produce between 100 and 500-watts of direct current using a limited design but can produce greater than 1,000-Watts in other exemplary embodiments of the present invention. The hot junction of the stack of the semiconductor-based thermocouples 232$^{2+N}$ may be maintained at 500-800° C. by the burner nozzle 229 output of the fuel combustor 213.

In the preferred embodiment of the present invention, one or more heat exchangers 233$^{1+N}$ is an array of one or more bent liquid filled gravity pipe heat exchangers 233'$^{1+N}$ which transfer heat to the ambient air externally, along with additional induced cooling air flow, works in concert to maintain cold side temperatures of the one or more integrated thermoelectric generation devices 214$^{1+N}$ between 150 and 190° C.

In another exemplary embodiment of the hybrid energy thermal remediation system (HETR) 210, the one or more heat exchangers 233$^{1+N}$ is a finned plate air-cooled heat exchanger 233''$^{1+N}$, surrounding the one or more integrated thermoelectric generation devices (TEG) 214$^{1+N}$ to form the cold side of the one or more integrated thermoelectric generation devices 214$^{1+N}$ being cooled from the induced air aperture 234. In this embodiment, the cold junction of the stack of the semiconductor-based thermocouples 232$^{2+N}$ may be maintained at 200 to 260° C. by the finned plate air-cooled heat exchanger 233'''$^{1+N}$.

In an exemplary embodiment of the present invention, the energy co-generation assembly 211 with the integrated thermoelectric generation device 214$^{1+N}$ is configured using the stack of the semiconductor-based thermocouples 232$^{2+N}$ with a matched voltage of 80-mV and current of 1.75-Amps arranged in 6 parallel strings of 60 series of the stack of the semiconductor-based thermocouples 232$^{1+N}$, a combustor output of 130,000-BTUh, a controlled hot side temperature of 600° C., a heat sink temperature of 180° C., and a maximum power point (MPP) resistance of 4.6-ohms produces approximately 504 Watts at 48 Volts and 10.5 Amperes, Whereas the same energy co-generation assembly 211, configured in series produces 288-volts at 1.75 Amps with an MPP resistance of 164-ohms.

The one or more combustion air discharge chamber-thermoelectric generation assemblies CADC-TEG 257$^{1+N}$ are capable of producing a significant amount of electrical power, with as little as 20-watts being generated from a single thermoelectric generation module 258, depending on design and configuration, over 1,000-watts being generated using multiple connected module(s) arranged within the one or more externally mounted thermoelectric generation devices 259$^{1+N}$. The combustion air discharge chamber-thermoelectric generation assembly (CADC-TEG) 257$^{1+N}$ design using 60 commercially available Bi—Te based TEG modules (2"×2"×0.1") wired in 6 series of 10 parallel featuring a matched voltage of 7.2-V and matched amperage of 3-Amps with an ideal resistance of 1.2 ohms for each module, a combustion air outlet chamber temperature of 300° C. (hot side temperature) and air or liquid heat exchanger heat sink temperature of 30° C. (cold side temperature) produces 1,080 Watts at 36 volts and 30 Amps. The same configuration, as 2 parallel strings of 30 in-series modules, produces 1,296-watts at 216 volts and 6-amps with an MPP of 36 ohms.

Various configurations of the stack of the semiconductor-based thermocouples 232$^{2+N}$, within both the integrated power assembly of the integrated thermoelectric generation devices (TEG) 214$^{1+N}$ and externally mounted thermoelectric generation devices 259$^{1+N}$ in the combustion air discharge chamber-thermoelectric generation assemblies (CADC-TEG) 257$^{1+N}$ allow power generation to match intended applications of remediation of the contaminant impacted media 222. A variety of different combinations of series and parallel connection may be configured to match ideal resistance of the one or more electrically resistive heating units 219$^{1+N}$, or to provide a more suitable power stream for powering auxiliary devices or charging power storage systems for the hybrid energy thermal remediation system (HETR) 210.

In the preferred embodiment of the present invention, a DC electric power generated by all systems, including any required auxiliary sources of power from the grid-based electric energy supply 282, as shown in FIGS. 11-12, or renewable sources generated on-site, is dump or diversion loaded directly onto the electrically resistive heating unit as DC power. The one or more electrically resistive heating units 219$^{1+N}$ is housed in the annulus space 221' formed between an open-ended inner combustion air conduit 217 and the outer thermally conductive heating conduit 218. In the preferred embodiment, the outer thermally conductive heating conduit 218 is closed ended being sealed at the distal end, as shown in FIGS. 3-4, 9-12. In another exemplary embodiment, the distal end of the outer thermally conductive heating conduit 218 is left open.

In an exemplary embodiment of the present invention, the one or more electrically resistive heating units 219$^{1+N}$ can extend the entire length of the outer thermally conductive heating conduit 218. A variety of commercially available electrically resistive heating units 219$^{1+N}$ are provided which are integrated into the hybrid energy thermal remediation system (HETR) 210 including, but not limited to, braided high temperature heating cord, open coil heater units, flat plate units, or tube-shaped units, which provide a homogeneous, albeit lower heat output, augmenting the combustion derived heat energy. The one or more electrically resistive heating units 219$^{1+N}$ are constructed as moveable, thin mica or ceramic insulated Nicor wire reverse band heaters, providing additional heat energy output at discrete intervals, engendering boosted heat energy transfer to the volume of contaminant impacted media 222 at intended intervals and sections of the volume of contaminant impacted media 222. In all embodiments, the one or more electrically resistive heating units 219$^{1+N}$ will not impede the circulation of combustion air, and are configured to occupy less than 20% of the available annulus space 221' between the inner combustion air conduit 217 and the outer thermally conductive heating conduit 218, including any electrically or physically isolating spacers or insulators such as ceramic disks, beads, plates, or rods to prevent turbulent flow patterns in combustion air circulation causing hot spot formations which lead to heterogeneous heating, potential backpressure generation, and premature degradation of materials.

In another exemplary embodiment, power generated by the one or more energy co-generation assemblies $211^{1+n}$, and any auxiliary forms of grid-based electric energy supply 282, as shown in FIGS. 11-12, or on-site renewably generated DC electrical energy through additional one or more combustion air discharge chamber-thermoelectric generation assemblies (CADC-TEG) $257^{1+N}$, solar, wind, or turbine based energy generation assemblies, are conveyed to and stored in a centralized electrical energy storage device 272 or battery 238, along with one or more secondary electrical energy conditioning and distribution devices $239^{1+N}$, one or more centralized primary electrical energy conditioning and distribution boxes $271^{1+N}$, a power distribution system and power inverter for redistribution to the one or more electrically resistive heating units $219^{1+N}$, or to power other on-site equipment, electronics, and devices related to the remediation system.

In another exemplary embodiment, the inner combustion air conduit 217 extends only a partial distance of the overall length of each of the one or more media heating assemblies $212^{1+N}$, with the outer thermally conductive heating conduit 218 and heat tolerant thermally conductive annulus fill 221 extending a minimum of 10.00 feet beyond the inner combustion air conduit outlet portal 217" disposed at the distal end of the inner combustion air conduit 217, likely between 10.00 feet and 50.00 feet, and less likely at lengths greater than 50.00 feet. This exemplary embodiment is best applied to total heating assembly lengths of at least 25.00 feet, preferably 75.00 feet, and less likely over 200.00 ft.

In the exemplary embodiment of the hybrid energy thermal remediation system (HETR) 210, the one or more electrically resistive heating units $219^{1+N}$ are constructed at a minimum of 2.00 feet below the inner combustion air conduit outlet portal 217" of the inner combustion air conduit 217 but is placed a greater distance below the inner combustion air conduit outlet portal 217" if specific applications within the method of heating the volume of impacted contaminant media justify to do so. In this specific application of the method, the one or more electrically resistive heating units $219^{1+N}$ extends the entire length of the outer thermally conductive heating conduit 218, truncating 4.00 inches to 12.00 inches above the bottom closed end of the outer thermally conductive heating conduit 218.

Traditional combustion-based thermal remediation technologies and associated device(s) which use an end mounted fuel combustor as the sole energy source have been proven less effective at lengths greater than 50.00 feet, and more specifically less effective at 80.00 feet, and entirely ineffective at lengths greater than 100.00 feet due to the cooling of the combustion air and combustion reaction byproducts during the upward recycling of the air stream causing water condensate to form, fouling the airflow and leading to critical device failure. The truncation of the inner combustion air conduit 217 at the specified lengths, and placement of the one or more electric resistive heating units $219^{1+N}$ to generate the heat energy in the lower sections of the outer thermally conductive heating conduit 218 extending to these greater lengths circumvents the issue of less effectiveness of the end mounted fuel combustor and allows the hybrid energy thermal remediation system (HETR) 210 to be applied to many remediation projects incapable of being addressed using current thermal remediation technologies relying solely on combustion processes.

In the exemplary embodiment, electric power generated by the one or more integrated thermoelectric generation device(s) $214^{1+N}$, externally mounted thermoelectric generation devices $259^{1+N}$ in the combustion air discharge chamber-thermoelectric generation assemblies (CADC-TEG) $257^{1+N}$, and auxiliary renewable energy power sources integrated into the HETR device(s), may be conveyed to and stored in an electrical energy storage cell or battery, along with a power distribution system and power inverter, which along with any required additional grid power, may then be applied to the lower electric heater units. Power requirements are dictated by the specifics of the application, with intended heat output of over 100° C., but preferably over 500° C., and in some instances at temperatures up to 1,000° C. This may be necessary to achieve desired output temperatures of greater than 200° C. at the outer thermally conductive conduit, preferably 300° C., in a lesser instance, temperatures of over 450° C. may be targeted at the outer thermal conductive conduit interface with impacted media intended to be heated. In these higher temperature instances, the materials of the electrically resistive heating unit(s), power cables, leads, connectors, and materials of the outer thermally conductive conduit may require substitution.

In another exemplary embodiment of the present invention, an electrically resistive heating unit 219 of the one or more electrically resistive heating units $219^{1+N}$ having a lower temperature feature is designed to produce temperatures lower than 100° C. in the contaminant impacted media 222 being remediated. In this exemplary embodiment, dump loading of DC onto the lower temperature electrically resistive heating unit $219^L$ without the need for addition power storage or distribution systems, or one or more centralized primary electrical energy conditioning and distribution boxes $271^{1+N}$ or grid-based electric energy supply 282, as shown in FIGS. 11-12, can suffice to generate these lower intended temperatures targeting 100° C. or lower at the outer thermally conductive conduit. However, certain situations requiring functional electrically resistive heating unit lengths greater than 10-feet may require the grid-based electric energy supply 282 or energy storage and power distribution systems described above, including the one or more secondary electrical energy conditioning and distribution devices $239^{1+N}$ and the one or more centralized primary electrical energy conditioning and distribution boxes $271^{1+N}$ and, also, including auxiliary power sources. In this exemplary embodiment of the present invention, contaminant impacted media 222, including groundwater and soil with lower levels of contaminant impacted media 222, is better remediated by certain biotic and abiotic remediation mechanisms that do not require the higher temperatures required to achieve energy intensive removal, destruction and stabilization mechanisms. In this manner, the inner combustion air conduit 217 can truncate at a length no less than 10.00 feet of heated interval, preferably over 20.00 feet, and up to 80.00 feet. The outer thermally conduit heating conduit 218 can extend a minimum of 10.00 feet below the inner combustion air conduit outlet portal 217', preferably over 20.00 feet, and may extend upwards of 200.00 feet lower. In this exemplary embodiment, the one or more electrically resistive heating units $219^{1+N}$ are designed to output temperatures below 300° C. at the one or more electrically resistive heating units $219^{1+N}$ with preference to temperatures below 200° C. in order to achieve average temperatures of lower than 100° C. in the formation, preferably lower than 80° C. to target hydrolysis and other abiotic forms of degradation, lower than 50° C. to target certain forms of biotic degradation.

In another exemplary embodiment of the present invention, one or more separate, outer thermally conductive conduits of 2.00 to 6.00 inches in nominal diameter, closed at the distal (subsurface) end, may be installed subterraneous, within a wellfield installation of one or more HETR devices. The separate subterraneous installation of one or more outer thermally conductive heating conduits $218^{1+N}$ is placed a distance from other hybrid energy thermal remediation system (HETR) 210 installations, at distances greater than 2.00 feet, more likely greater than 10.00 ft, and less likely at distances greater than 30.00 feet laterally from other hybrid energy thermoelectric remediation device (HETR) installations within the wellfield. One or more electrically resistive heating unit(s) may be installed in the interior of the one or more outer thermally conductive heating conduit $218^{1+N}$, and the proximal end of each of the outer thermally conductive heating conduit 218, at or slightly above grade, features a commercially available end cap containing orifices or prefabricated terminal connections for electric connections $240^{1+N}$ between the one or more electrically resistive heating units $219^{1+N}$ and the weatherproof electrical connection box 241. The one or more electrically resistive heating units $219^{1+N}$ can be constructed, or purchased, in configurations which may accept DC directly from the network of hybrid energy modules as dump loading if adequate power generation can be achieved.

Additionally, the electric power generated by the hybrid energy modules from each device may be conveyed to, and stored in, the centralized electrical energy storage device 272 or battery 238, along with a power distribution system including one or more centralized primary electrical energy conditioning and distribution boxes $271^{1+N}$ which may include a power inverter, along with any required additional on-site renewably generated power or auxiliary power from a grid source, the grid-based electric energy supply 282, and then be applied to the lower electrically resistive heating unit $219^L$.

Power requirements are dictated by the specifics of the application of the remediation of the contaminant impacted media 222, with intended heat output of the one or more electrically resistive heating units $219^{1+N}$ to match or exceed that of the combustor wells, reaching temperatures of over 100° C., but preferably over 300° C., and in some instances at temperatures up to 1,000° C. This may be necessary to achieve desired output temperatures of greater than 100° C. at the outer thermally conductive heating conduit 218, preferably 300° C., in a lesser instance, temperatures of over 600° C. may be targeted at the outer thermal conductive heating conduit 218 interface with contaminant impacted media 222 intended to be heated. In these higher temperature instances, the materials of the one or more heater electrically resistive heating units $219^{1+N}$, power cables, the one or more-electrical energy distribution cables $270^{1+n}$, heat tolerant electrically conductive low resistivity electrical cable and connections 220, leads, connectors, and materials of the outer thermally conductive heating conduit 218 may require substitution.

In another embodiment of the hybrid energy thermal remediation system (HETR) 210, the electrical energy generated by the hybrid energy thermal remediation system (HETR) 210 may be used to power the one or more electrically resistive heating units $219^{1+N}$ during portions of the remediation trajectory where higher energy input may be needed, and additional power application may be advantageous. During periods where additional energy input may not be required or may not be an advantageous use of the hybrid energy being generated, excess electrical power may be stored in the battery 238, or the centralized electrical energy storage device 272, or used to generate hydrogen gas ($H_2$) using an on-site electrolysis device, a hydrogen generating electrolyzer system 276 and accompanying the hydrogen gas storage unit 277, more particularly, a liquid hydrogen storage unit, as shown in FIG. 12. Hydrogen gas ($H_2$) by this process can then be blended with the primary fuel used in the combustors to offset the fossil fuel consumption, thereby reducing the overall carbon footprint of the hybrid energy thermal remediation system (HETR) 210 and operations.

A front perspective view of elements of the hybrid energy thermal remediation system (HETR) system 210 the energy co-generation assembly 211, energy co-generation assembly housing 215, and media heating assembly 212 is presented in FIGS. 3, 9-12. A cross-sectional view of the interior of the media heating assembly 212 is shown in FIGS. 4 and 10-11, of the hybrid energy thermal remediation (HETR) system 210 inserted subterraneous into an identified region of contaminant impacted media 222 showing the media heating assembly 212 includes the use of two discrete reverse band style electrically resistive heating units $219^{1+N}$ connected in series as a circuit through heat tolerant electrically conductive low resistivity electrical cable and connections 220. In this exemplary embodiment, the media heating assembly device $212^{D(1)}$, also, includes the use of one or more external temperature monitoring thermocouples $223^{1+N}$ placed within the heat tolerant thermally conductive annulus fill 221 at strategic intervals of length along the length of the heat tolerant thermally conductive annulus fill 221.

The one or more media heating assemblies $212^{1+N}$ includes the flanged collar 242 between the flanged collar connector cap 216 of the media heating assembly 212 and a double flanged top connector 243 of the energy co-generation assembly housing 215 connecting the inner combustion air conduit 217 and the energy co-generation assembly housing 215 while sealing a proximal end of the outer thermally conductive heating conduit 218 of the media heating assembly 212.

In the preferred embodiment, the one or more electrically resistive heating units $219^{1+N}$ are commercially available reverse ceramic band heating unit(s) connected in series to the energy co-generation assembly 211 through heat tolerant electrically conductive low resistivity electrical cable and connections 220. The outer thermally conductive heating conduit 218 is in direct contact with the impacted soils and/or groundwater of the contaminant impacted media 222, or encapsulated in a heat tolerant thermally conductive annulus fill 221 constructed using industry standard commercially available materials with suitable thermally conductive properties, such as a high temperature grout or grout mixture. One or more external temperature monitoring thermocouples $223^{1+N}$ are placed in the heat tolerant thermally conductive annulus fill 221 at strategic intervals of length along the length of the heat tolerant thermally conductive annulus fill 221.

In the preferred embodiment, the outer thermally conductive heating conduit 218 extends beyond the contaminant impacted media 222 horizon by a nominal amount of no less than 5.00 inches, ideally 12.00 inches, and less ideally greater than 56.00 inches, depending on configuration and application, with the combustion air exhaust aperture 225 in the extended portion above the horizon, connecting the outer thermally conductive heating conduit 218 to a combustion air discharge conduit 226 by means of welded, threaded, or flanged connection.

A detailed exterior front view of an embodiment of the energy co-generation assembly housing 215 and energy co-generation assembly 211, featuring one or more liquid filled gravity heat pipe heat exchangers 233' on the heat sink side of the integrated thermoelectric generation device (TEG) 214, is depicted in FIG. 5. A detailed cross-sectional view of the integrated thermoelectric generation device (TEG) 214 integrated into the energy co-generation assembly housing 215 is presented in FIGS. 6 and 7. The fuel combustor 213 features the weatherproof fuel combustor enclosure housing 227, a controllable primary combustion air aperture 228, a burner nozzle 229, a fuel ignitor 230, and the energy co-generation assembly combustion air conduit 231. One or more integrated thermoelectric generation devices (TEG) 214 contain one or more sealed thermoelectric generation units $251^{1+N}$, including a first sealed thermoelectric generation unit $251^1$ and a second thermoelectric generation unit $251^2$ each containing the type +N− semiconductive material 247 and the type −P+ semiconductor material 248 of one or more stacks of semiconductor-based thermocouples $232^{1+n}$, including a first stack of semiconductor-based thermocouples $232^1$ and a second stack of semiconductor-based thermocouples $232^2$ located between the combustion air conduit 211 (wrong numeral and which conduit or is it the annulus) which forms the hot side of each of a first integrated thermoelectric generation devices (TEG) $214^1$ and a second integrated thermoelectric generation device (TEG) $214^2$ and a congruent heat exchanger 233 of the one or more heat exchangers $233^{1+N}$, particularly, a first heat exchanger $233^1$ and a second heat exchanger $233^2$.

The one or more heat exchangers $233^{1+N}$ in this exemplary embodiment are constructed using liquid filled gravity heat pipe style heat exchangers 233' as depicted in FIG. 6, or are constructed using finned plate air-cooled heat exchangers 233'' as depicted in FIG. 7, forming the cold side of each of the integrated thermoelectric generation devices (TEG) $214^1$ and $214^2$. The energy co-generation assembly housing 215 features: an induced air aperture 234 to cool the external cold side of the one or more sealed thermoelectric generation unit(s) $251^{1+N}$ further; screw, spiral or finned structures from appropriate materials, such as welded steel or refractory inserts, to promote air circulation and cooling to the internal heat sink (cold side), and to promote mixing and control of the energy co-generation assembly discharge products into the inner combustion air conduit 217 of the device; and refractory materials 236 to thermally insulate incompatible materials from higher temperature streams generated within the combustion air conduit and TEG unit(s).

The energy co-generation assembly features a series of indicator light(s) 237 which signal whether the combustor is operating, the integrated thermoelectric generation device (TEG) 214 is producing electricity, and/or how that electricity is being used by the hybrid energy thermal remediation system (HETR) 210; an electrical energy storage system, a battery 238; and power conditioner system 239 of the one or more secondary electrical energy conditioning and distribution devices $239^{1+N}$, to provide optimal load conditions, constant and controlled voltage, and protect from overvoltage and reverse current from electrical connections at the terminals of the electrically resistive heating unit 219 connections, completed within a weatherproof electrical connection box 241. A programmable logic controller 224 is mounted internally within the weatherproof electrical connection box 241, and is connected to one or more temperature monitoring thermocouples $223^{1+N}$ placed within the heat tolerant thermally conductive annulus fill 221, as shown in FIGS. 3 and 9, and the power conditioning and distribution device(s) 239 of the one or more secondary electrical energy conditioning and distribution devices $239^{1+N}$ to inform the programmable logic controller 224 setpoints and control power input to the one or more electrically resistive heating units $219^{1+N}$.

As shown in FIG. 6, the fuel combustor 213 attaches to the integrated thermoelectric generation device (TEG) 214 within the energy co-generation assembly housing 215 via a double flanged top connector 243. The burner nozzle 229 and the fuel igniter 230 extend into the energy co-generation assembly combustion air conduit 321, which features an inner Silica Carbide Ceramic, or compatible material heat tube 244 and the one or more heat tube combustion air diffuser $246^{1+N}$ held by the single rim 245 extending inward from the combustion air conduit at a thickness no greater than the heat tube 244 which may act as a partial heat sink to improve heat conductance and control temperature on the heat sink (hot) side of the integrated thermoelectric generation device(s) 214. The heat tube 244 may also be constructed with screw, spiral, or finned heat tube combustion air diffuser structures 246, acting as a combustion air diffuser 235, which may improve homogeneity of heat within the energy co-generation assembly 211 and the hybrid energy thermal remediation system (HETR) 210.

With reference to FIGS. 6 and 7, the one or more integrated thermoelectric generation devices (TEG) $214^{1+N}$, including the first integrated thermoelectric generation device $214^1$ and the second integrated thermoelectric generation device $214^2$, as shown, includes of one or more sealed thermoelectric generation units $251^{1+n}$, particularly, a first sealed thermoelectric generation unit $251^1$, and a second sealed thermoelectric generation unit $251^2$, each containing the stack of the semiconductor-based thermocouple $232^{1+N}$ including the first stack of semiconductor-based thermocouples $232^1$ and the second stack of semiconductor-based thermocouples $232^2$ of +N− semiconductor materials 247 and −P+ semiconductor materials 248 joined electrically by at least one hot side electrode 249 of one or more hot side electrodes $249^{1+N}$ and at least one cold side electrode 250 of one or more cold side electrodes $250^{1+N}$. The hot side of the module created by the energy co-generation assembly combustion air conduit 231 is in contact with the one or more sealed thermoelectric generation unit(s) $251^{1+N}$, particularly, a first sealed thermoelectric generation unit $251^1$ and a second sealed thermoelectric generation unit $251^2$ by each of one or more thermally conductive high temperature compatible materials 252, particularly, a first thermally conductive high temperature compatible material $252^1$ and a second thermally conductive high temperature compatible material $252^2$, and each of one or more electric insulators 253, particularly a first electric insulator $253^1$ and a second electric insulator $253^2$, as shown in FIGS. 6 and 7.

Each of the first heat exchanger $233^1$ and the second heat exchanger $233^2$ contacts the corresponding first sealed thermoelectric generation units $251^1$ and the second first sealed thermoelectric generation units $251^2$, respectively, through each of one or more associated thermally conductive low temperature compatible material(s) 254, including a first thermally conductive low temperature compatible material $254^1$ and a second thermally conductive low temperature compatible material $254^2$, respectively. FIG. 6 shows the integrated thermoelectric device 214 is configured with one or more bent liquid filled gravity pipe heat exchanger(s)

$233'^{1+n}$ in particular a first bent liquid filled gravity pipe heat exchanger(s) $233'^{1}$ and a second bent liquid filled gravity pipe heat exchanger(s) $233'^{2}$. Each of the first integrated thermoelectric generation device $214^1$ and the second integrated thermoelectric generation device $214^2$ is contained or encapsulated in a refractory cement conduit seal 255, particularly, a first refractory cement conduit seal $255^1$ and a second a refractory cement conduit seal $255^2$, respectively, which allows it to be connected to the fuel combustor 213 and energy co-generation assembly housing 215 via one or more cast in-place anchoring bolts 256, particularly, a first cast in-place anchoring bolt $256^1$ and a second cast in-place anchoring bolt $256^2$, respectively, within each of a refractory cement conduit seal $255^{1+N}$ connecting to the double flanged top connector 243. Another embodiment of the energy co-generation assembly 211 is portrayed in a detailed cross-sectional view in FIG. 7, showing the integrated thermoelectric generation device 214 and the energy co-generation assembly housing 215, featuring one or more finned plate air-cooled heat exchanger(s) $233''^{1+N}$, in particular, a first finned plate air-cooled heat exchanger(s) $233''^{1}$ and a second finned plate air-cooled heat exchanger(s) $233''^{2}$ to create the heat sink (cool) side of the one or more integrated thermoelectric generation device(s) (TEG) $214^{1+N}$.

A combustion air discharge chamber-thermoelectric generation assembly (CADC-TEG) 257 is depicted in FIG. 8 using 900 commercially available thermoelectric generation modules 258 (1.25 in ×1.25 in by 0.1 in) housed within 6 externally mounted thermoelectric generation devices 259, such that each of the 6 externally mounted thermoelectric generation devices 259 feature 150 commercially available thermoelectric generation modules 258, a forced air-cooled heat sink using the ventilated enclosures 260 and the one or more air circulation fans $261^{1+N}$.

In the exemplary embodiment of the hybrid energy thermal remediation system (HETR) 210, the combustion air discharge chamber (CADC) 262 are used as a location for auxiliary thermoelectric generation device(s), providing additional thermoelectric generation from waste heat prior to discharge. In a further embodiment, the combustion air discharge chamber-thermoelectric generation assembly (CADC-TEG) 257 are used as the primary thermoelectric generation device of the hybrid energy thermal remediation system (HETR) 210. The one or more combustion air discharge chambers (CADC) $262^{1+n}$ can range in size and shape depending on the application and the one or more externally mounted thermoelectric generation devices $259^{1+N}$ being applied. In a preferred embodiment of the present invention, one or more combustion air discharge chambers (CADC) $262^{1+n}$ can consist of a rectangular, 24.00 inches in height, by 24.00 inches wide by 36.00 inches long metal housing that may be constructed of stainless steel, galvanized steel, or other thermally conductive, temperature compatible materials, before reducing to galvanized spiral combustion air conduits on the influent and effluent ends of each of the one or more combustion air discharge chambers (CADC) $262^{1+N}$.

In this embodiment, three sides of the chamber may be used as the heat source (hot side) of the externally mounted thermoelectric generation devices $259^{1+N}$. The three sides are covered in a heat transfer material 264; commercially available thermoelectric generation modules 258 which may be connected either or both in series and in parallel within the externally mounted thermoelectric generation device 259; a cold side heat transfer material 265; a finned heat-sink 266, which may be constructed of copper, aluminum, or other suitable metals or alloys; and a ventilated enclosure 260 with the one or more air circulation fans 261 to promote forced air cooling. The heat sink on the cold side may also be constructed using liquid filled heat exchanger systems, particularly in applications where ambient air temperatures are higher, or airflow may be restricted such as indoor applications.

FIG. 9 depicts a front perspective view of the energy co-generation assembly 211 and an energy co-generation assembly housing 215 and the cross-sectional view of the media heating assembly 212, as shown in FIG. 3, configured with an auxiliary photovoltaic solar panel 267, and a combustion air discharge chamber-thermoelectric generation assembly 257, as shown in of FIG. 8, of the hybrid energy thermoelectric remediation system 210, according to an embodiment of the present invention. The media heater assembly 212 including the media heating assembly device $212^{D1}$ is inserted in situ into contaminant impacted media 222. The media heating assembly 212 is fluidly connected to the energy co-generation assembly inner chamber 287 of the energy co-generation housing 215. The media heating assembly, in this exemplary embodiment includes the inner combustion air conduit 217 and the outer thermally conductive heating conduit 218. One or more external temperature monitoring thermocouples $223^{1+N}$ are placed in the heat tolerant thermally conductive annulus fill 221 of the annulus space 221'.

The energy co-generation assembly 211 features one or more heat exchanger(s) $233^{1+N}$, with reference to FIGS. 6 and 7, an auxiliary combustion air discharge chamber-thermoelectric generation assembly (CADC-TEG) 257, located at the combustion air exhaust aperture 225 and combustion air discharge conduit 226 of the thermally conductive heating conduit 218, and the auxiliary photovoltaic solar panel 267 is constructed on top of the energy co-generation assembly 211. The auxiliary combustion air discharge chamber-thermoelectric generation assembly (CADC-TEG) 257 is configured with the galvanized steel spiral combustion air discharge chamber (CADC) conduit 263 having an influent end $263^1$ and an effluent end $263^2$ extending through each opposing ends of the combustion air discharge chamber (CADC) $262^1$ of each of the combustion air discharge chamber-thermoelectric generation assembly (CADC-TEG) $257^1$, as shown in FIGS. 8-9, and 11-12. In this exemplary embodiment, the influent end $263^1$ is fluidly connected to the outer thermally conductive heating conduit 218 of the media heating assembly device $212^{D1}$ by way of the combustion air discharge conduit 226 being fluidly connected to the combustion air exhaust aperture 225 of the media heating assembly 212, as shown in FIG. 9.

FIG. 10 depicts a cross sectional view of the media heating assembly 212 configured with the one or more electrically resistive heating units $219^{1+N}$, of the hybrid energy thermal remediation system 210, according to an embodiment of the present invention. In this exemplary embodiment of the outer thermally conductive heating conduit 218 extends at least 10.00 feet beyond the inner combustion air conduit outlet portal 217" of the inner combustion air conduit 217. One or more electrically resistive heating units $219^{1+N}$ are of at least 5.00 feet in length and are placed at least 2.00 feet below the inner combustion air conduit outlet portal 217" of the inner combustion air conduit 217. One or more external temperature monitoring thermocouples $223^{1+N}$ are placed the heat tolerant thermally conductive annulus fill 221 of the annulus space 221'.

The one or more electrically resistive heating units $219^{1+N}$ features a combustion air deflector 268 at the end of the electrically resistive heating units 219 proximal to the inner combustion air conduit outlet portal 217" of the inner combustion air conduit 217, connected electrically to the energy co-generation assembly 211 through heat tolerant electrically conductive low resistivity electrical cable and connections 220. The one or more electrically resistive heater units $219^{1+N}$ are commercially available with open coil pipe heater designs, with a standard circular ceramic spacers or plugs (i.e., WATTCO™ Open Coil Pipe Heaters).

An exemplary embodiment of the hybrid energy thermal remediation system (HETR) 210 is depicted in FIGS. 11-12. In an exemplary embodiment of the present invention, FIG. 11 shows the hybrid energy thermal remediation system (HETR) 210 including four energy co-generation assemblies $211^{1-4}$ of the one or more energy co-generation assemblies $211^{1+N}$, being positioned ex situ, operationally connected to four media heating assemblies $212^{1-4}$ of the one or more media heating assemblies $212^{1+N}$ wherein the four media heating assemblies are inserted being spaced a lateral distance apart in situ with the contaminant impacted media 222. It is known by a person of ordinary skill in the art that the hybrid energy thermal remediation assembly 210 is not limited by the amount of the four energy co-generation assemblies $211^{1-4}$ and the amount of the four media heating assemblies $212^{1-4}$ where the quantity of each of the energy co-generation assemblies $211^{1-4}$ and media heating assemblies $212^{1-4}$ is predetermined by the evaluation of the contaminant impacted media.

The hybrid energy thermal remediation assembly 210, according to this exemplary embodiment, includes, two combustion air discharge chamber-thermoelectric generation assemblies (CADC-TEG) $257^{1-2}$ of the one or more combustion air discharge chamber-thermoelectric generation assemblies (CADC-TEG) $257^{1+N}$; two centralized combustion air blowers $273^{1-2}$ each fluidly connected to each of two corresponding centralized combustion air discharge stacks $274^{1-4}$, respectively. The grid-based electric energy supply 282 is shown operationally electrically connected to the centralized electrical energy storage device 272 by way of the one or more electrical energy distribution cables $270^{1+N}$ being operationally electrically connected to two (but not limited to) centralized primary electrical energy conditioning and distribution boxes $271^{1-2}$ of the one or more centralized primary electrical energy conditioning and distribution boxes $271^{1+N}$ and operationally connected to each of four (but not limited to) secondary electrical energy conditioning and distribution devices $239^{1-4}$ associated with each of four weatherproof fuel combustor enclosure housings $227^{1-4}$ of the four energy co-generation assemblies $211^{1-4}$.

FIG. 11 shows the hybrid energy thermal remediation assembly 210, according to this exemplary embodiment, includes the combustible fuel supply 281 being fluidly connected to the combustible fuel distribution conveyance network 279 through to each of the two combustion air discharge chamber-thermoelectric generation assemblies (CADC-TEG) $257^{1-2}$. FIG. 11 shows the one or more multiple energy co-generation assembly(s) $211^{1-N}$ and one or more combustion air discharge chamber-thermoelectric generation assemblies (CADC-TEG) $257^{1+N}$ being indirectly connected, electrically, to a separately located installation, in situ, containing an electrically resistive heating unit 219' housed within a resistive heating specific outer thermally conductive conduit 269, capped or otherwise sealed at both ends using an end cap containing orifices or prefabricated terminal connections 280 being operationally connected to the weatherproof electrical connection box 241. This embodiment of the hybrid energy thermal remediation system 210 shows each of the energy co-generation assemblies $211^{1-4}$, and the one or more combustion air discharge chamber-thermoelectric generation assemblies (CADC-TEG) $257^{1+N}$ are initially powered by a the combustible fuel supply 281 connected through the combustible fuel distribution conveyance network 279, and the grid-based electric energy supply 282, as shown in FIGS. 11-12, connected to the one or more centralized primary electrical energy conditioning and distribution boxes $271^{1+N}$ through one or more one or more electrical energy distribution cables $270^{1+N}$.

Electrical energy produced from the one or more energy co-generation assemblies $211^{1+N}$, and the one or more combustion air discharge chamber-thermoelectric generation assemblies (CADC-TEG) $257^{1+n}$ is conveyed to one or more centralized primary electrical energy conditioning and distribution boxes $271^{1+N}$ through one or more electrical energy distribution cables $270^{1+N}$ before being applied to a centralized electrical energy storage device (battery) 272, from which electrical power is controlled and applied to the one or more electrically resistive heating units $219^{1+N}$ disposed in the resistive heating specific outer thermally conductive conduit 269, as shown in FIG. 11. In this embodiment, an induced draft flow from the one or more centralized combustion air blowers $273^{1+N}$ are used to circulate combustion air from multiple fuel combustors 213, media heater assemblies 212, and the combustion air discharge chamber-thermoelectric generation assembly (CADC-TEG) 257, prior to discharge of waste combustion air through the one or more centralized combustion air discharge stacks $274^{1-12}$.

FIG. 12 shows another embodiment of the hybrid energy thermal remediation assembly configured with the foundation of the hybrid energy thermal remediation assembly 210 as depicted in FIG. 11, further comprises two (but not limited to) auxiliary photovoltaic solar panels $267^{1-2}$ of the one or more auxiliary photovoltaic panels $267^{1+N}$ operationally connected to each of two (but not limited to) weatherproof fuel combustor enclosure housings $227^{1-2}$; and the deionized water electrolyzing hydrogen generation system 275. The deionized water electrolyzing hydrogen generation system 275 includes a hydrogen generating electrolyzer system 276; a hydrogen gas storage unit 277; a centralized fuel blending unit 278; a combustible fuel distribution conveyance network 279; and a combustible fuel supply 281. The deionized water electrolyzing hydrogen generation system 275 further configured with a third (but not limited to) auxiliary photovoltaic solar panel $267^3$ of the one or more auxiliary photovoltaic solar panels $267^{1+N}$.

The deionized water electrolyzing hydrogen generation system 275, as depicted in FIG. 12, is operationally connected to the centralized electrical energy storage device 272 and the hybrid energy thermal remediation system 210 as depicted in FIG. 11. The deionized water electrolyzing hydrogen generation system 275 includes a water deionization device 283 having an inlet fluidly connected to the potable water source 305 and an outlet fluidly connected to a hydrogen generating electrolyzer system 276 by way of a deionized water conveyance piping 284, a hydrogen storage unit 277 fluidly connected to a centralized fuel blending unit 278 and the combustible fuel supply 281 being fluidly connected to a combustible fuel distribution conveyance piping.

The method steps with reference to FIGS. 3-12, and more particularly to FIGS. 8 and 11-12, for the hybrid energy thermal remediation method of contaminant impacted media includes the hybrid energy thermal remediation system 210. As discussed above, the hybrid energy thermal remediation system (HETR) 210, as shown in FIGS. 1A-12 are disclosed and claimed herein which integrate one or more one or more energy co-generation assemblies 211$^{1+N}$ including the fuel combustors 213$^{1-N}$, and one or more integrated thermoelectric generating device (TEG) 214$^{1+N}$ or one or more externally mounted thermoelectric generation devices 259$^{1+N}$ and more, and disclosed herein, and as shown in FIGS. 1A-12 to collectively transform and apply multiform energy to an individual, or multiple connected, media heating assembly (s), by means of convective, conductive, and radiative heat transfer to the outer thermally conductive heating conduit 218 which thermally conducts heat to the contaminant impacted media 222 in contact with the hydrogen energy thermal remediation system (HETR) 210, including soils, groundwater, non-aqueous phase liquids and other matrices with the intended purpose of contaminant removal, degradation, destruction, or stabilization, thereby remediating said contaminant impacted media.

FIGS. 1A-2B represent flow charts of the steps involved in a method for hybrid energy thermal remediation of contaminant impacted media 100 method for heating a contaminant impacted media 222 for remediation of the contaminant impacted media.

Referring to FIGS. 1A-2B, the method steps 100-142 are disclosed with reference to FIGS. 3-12. The hybrid energy thermal remediation method 100 comprises a method for heating a contaminant impacted media 222 for remediation of the contaminant impacted media comprises:

1. 101 identifying a volume of the contaminant impacted media 222;
2. 102 providing a hybrid energy thermal remediation system 210 for remediating the volume of contaminant impacted media 222, wherein, the hybrid energy thermal remediation system 210, comprises the hybrid energy thermal remediation system 210 comprises: an external electrical energy source; one or more energy co-generation assembly housings 215$^{1+N}$; one or more energy co-generation assemblies 211$^{1+N}$; one or more media heating assemblies 212$^{1+N}$; one or more media heating assembly devices 212$^{D(1+N)}$; one or more combustion air discharge chamber-thermoelectric generation assemblies (CADC-TEG) 257$^{1+N}$; one or more galvanized steel spiral combustion air discharge chamber (CADC) conduits 263; one or more centralized combustion air blowers 273$^{1+N}$; one or more centralized combustion air discharge stacks 274$^{1+N}$; a combustible fuel supply 281; a combustible fuel distribution conveyance network 279; a grid-based electric energy supply 282; a potable water source 305; a water deionization device 283; a hydrogen generating electrolyzer system 276; a centralized fuel blending unit 278; one or more centralized primary electrical energy conditioning and distribution boxes 271$^{1+N}$; one or more secondary electrical energy conditioning and distribution devices 239$^{1+N}$; a centralized electrical energy storage device 272; one or more auxiliary photovoltaic solar panels 267$^{1+N}$; one or more electrical energy distribution cables 270$^{1+N}$; one or more programmable logic controllers 224$^{1+N}$; a deionized water electrolyzing hydrogen generation system 275 including a hydrogen generating electrolyzer system 276; a hydrogen gas storage unit 277; a centralized fuel blending unit 278; a combustible fuel distribution conveyance network 279; and a combustible fuel supply 281. (as disclosed and described in detail above, and not repeated, here, for brevity);
3. 103 producing a cylindrical opening within the volume of the contaminant impacted media 222, having the cylindrical opening extending a length of at least 1.00 foot beyond each of the one or more media heating assembly devices 212$^{D1+N}$;
4. 104 installing the media heating assembly device 212$^{D1}$ of the one or more media heating assembly devices 212$^{D(1+N)}$ within the cylindrical opening;
5. 105 positioning the one or more external temperature monitoring thermocouples 223$^{1+N}$ within the annulus space 221' between the outer thermally conductive heating conduit 218 and the contaminant impacted media 222;
6. 106 sealing the annulus space 221' with heat tolerant thermally conductive anulus fill 221 securing the outer thermally conductive heating conduit 218 thereby preventing hot vapors formed along exterior walls of the outer thermally conductive heating conduit 218 during a heating process from exiting the volume of the contaminant impacted medial 222;
7. 107 positioning the one or more electrically resistive heating units 219$^{1+N}$ and the heat tolerant electrically conductive low resistivity electrical cable and connections 220 within the annulus space 221' existing between the inner combustion air conduit 217 and the outer thermally conductive heating conduit 218 such that the one or more electrical resistive heating units 219$^{1+N}$ are occupying a maximum 20% of the annulus space 221' at any given interval of length;
8. 108 fluidly connecting the media heating assembly device 212$^{D(1)}$ of the one or more media heating assembly devices 212$^{D(1+N)}$ to the energy co-generation assembly housing inner chamber 287 of the energy co-generation assembly housing 215 by way of the flanged collar 242 and the flanged collar connector cap 216 such that the flanged collar connector cap 216 seals the proximal end of the outer thermally conductive heating conduit 218 from the energy co-generation assembly housing inner chamber 287 of the energy co-generation assembly housing 215 contemporaneously providing a fluid connection-between the inner combustion air conduit 217 and the energy co-generation assembly housing inner chamber 287 of the energy co-generation assembly housing 215;
9. 109 connecting the one or more electrical resistive heating units 219$^{1+N}$ located within the media heating assembly device 212$^{D1}$ of the one or more media heating assembly devices 212$^{D(1+N)}$ to a corresponding electrical connection 240 and a corresponding programmable logic controller 224$^{1}$ of the one or more programmable logic controllers 224$^{1+N}$ housed within the weatherproof electrical connection box 241 thereby actuating the distribution of electrical energy from an electrically operationally connected energy co-generation assembly 211$^{1}$ of the one or more energy co-generation assemblies 211$^{1+N}$ to the one or more electrical resistive heating units 219$^{1+N}$;
10. 110 managing electrical energy distribution by way of the corresponding programmable logic controller 224$^{1}$ to temperature setpoints and temperature readings of the one or more electrical resistive heating units 219$^{1+N}$ from the one or more external temperature monitoring thermocouple 223$^{1+N}$ placed within the heat tolerant thermally conductive annulus fill 221 encasing the media heating assembly 212$^{1}$;
11. 111 introducing combustible fuel from the combustible fuel supply 281 into the fuel combustor 213 of the energy co-generation assembly $211^1$ wherein the fuel combustor 213 is fluidly connected to the inner chamber of the energy co-generation assembly housing inner chamber 287 of the energy co-generation assembly housing 215 of the integrated thermoelectric generation device (TEG) $214^1$;

12. 112 igniting the combustible fuel with the fuel ignitor 230 causing a combustion reaction producing fuel combustion heating providing a sustained source of heat energy and combustion byproducts being introduced into the identified volume of contaminant impacted media 222;

13. 113 generating an induced draft flow by way of a centralized combustion air blower $273^1$ of the one or more centralized combustion air blowers $273^{1+N}$ being fluidly connected to the energy co-generation assembly housing inner chamber 287 of the energy co-generation assembly housing 215 of the integrated thermoelectric generation device (TEG) $214^1$ of the one or more integrated thermoelectric generation devices (TEG) $214^{1+N}$ thereby moving the heat energy through the energy co-generation assembly $211^1$ through each of the one or more energy co-generation assembly combustion air conduit $231^{1+N}$ and each of the one or more heat tubes $244^{1+N}$ such that the heat energy and the combustion byproducts within each of one or more the energy co-generation assembly combustion air conduits $231^1$ create a hot side on the each of the one or more sealed thermoelectric generation units $251^{1+N}$ within the energy co-generation assembly housing inner chamber 287 of the energy co-generation assembly housing 215 of each of the one or more integrated thermoelectric generation devices (TEG) $214^{1+N}$;

14. 114 dissipating heat energy away from the hot side of the one or more sealed thermoelectric generation units $251^{1+N}$ creating a cold side of each of the one or more sealed thermoelectric generation units $251^{1+N}$ causing a temperature delta across the one or more sealed thermoelectric generation units $251^{1+N}$ forcing a diffusion of electric carriers towards the cold side of the one or more sealed thermoelectric generation units $251^{1+N}$ creating a voltage potential such that the voltage potential causing the one or more sealed thermoelectric generation units $251^{1+N}$ to generate electrical energy;

15. 115 introducing the heat energy and combustion byproducts from the fuel combustor 213 to the inner combustion air conduit inlet portal 217' of the inner combustion air conduit 217 of the media heating assembly $212^1$ pulled by way of the induced draft flow of the centralized combustion air blower $273^1$ of the one or more centralized combustion air blowers $273^{1+N}$ through the inner-combustion air conduit outlet portal 217" of the inner combustion air conduit 217 and upward through the outer thermally conductive heating conduit 218 exiting the combustion air exhaust aperture 225 and through the combustion air discharge conduit 226 such that the heat energy and combustion byproducts transfer heat energy to an exterior surface of the outer thermally conductive heating conduit 218 by way of convective heat transfer wherein when as the temperature of the outer thermally conductive heating conduit 218 increases heat energy is transferred by convective heat transfer to the contaminant impacted media 222;

16. 116 augmenting the fuel combustion heating by way of distributing electrical energy generated within the energy co-generation assembly 211 of the one or more energy co-generation assemblies $211^{1+N}$ to the one or more electrically resistive heating units $219^{1+N}$ such that temperatures of the one or more electrically resistive heating units resists a flow of direct current, wherein, the electrical energy generated by the integrated thermoelectric generating devices (TEG) $214^{1+N}$ is dump or diversion loaded as direct current (DC) from the one or more secondary electrical energy conditioning and distribution devices $239^{1+N}$ directly into the one or more electrically resistive heating units $219^{1+N}$ such that the temperature of the one or more electrically resistive heating units $219^{1+N}$ increases to a range of 100 to 1200 degrees centigrade as the one or more electrically resistive heating units $219^{1+N}$ resist the flow of direct current providing supplemental heat energy at discrete intervals along a length of the outer thermally conductive heating conduit 218;

17. 117 transferring heat and co-generated electrical energy from the outer thermally conductive heating conduit 218 through to the heat tolerant thermally conductive annulus fill 221 of the annulus space 221' and through the identified volume of the contaminant impacted media 222 by way of thermal conduction thereby causing degradation of contaminants within the identified volume of contaminant impacted media 222 and affecting remediation of the identified volume of contaminant impacted media 222 providing a remediated impacted media;

18. 118 providing the combustion air discharge chamber-thermoelectric generation assembly 257 of the one or more combustion air discharge chamber-thermoelectric generation assemblies $257^{1+N}$.

19. 119 positioning the combustion air discharge chamber-thermoelectric generation assembly 257 between the energy co-generation assemblies $211^1$ and the centralized combustion air blower $273^1$;

120. 120 utilizing a portion of abeyant heat energy flowing from the combustion air discharge chamber-thermoelectric generation assembly $257^1$ prior to expelling the portion of the abeyant heat energy into the external atmosphere by way of the one or more centralized combustion air discharge stacks $272^{1+N}$ wherein each of the one or more combustion air discharge chamber-thermoelectric generation assemblies $257^{1+n}$, comprises a combustion air discharge chamber (CADC) 262 having a rectangular shape, a one or more of the externally mounted thermoelectric generation devices $259^{1+N}$, a finned heat-sink 266 for creating a cold side of a thermoelectric generation module 258, a ventilated enclosure 260 with the one or more air circulation fans $261^{1+N}$ to remove heat from the finned heat-sink 266, wherein, the combustion air discharge chamber (CADC) 262 is constructed with thermally conductive temperature compatible metal, the combustion air discharge chamber (CADC) 262 including a galvanized steel spiral combustion air discharge chamber (CADC) conduit 263 having an influent end $263^1$ and an effluent end $263^2$, the galvanized steel spiral combustion air discharge chamber (CADC) conduit 263 passing longitudinally through the center of the combustion air discharge chamber (CADC) 262 wherein, the influent end $263^1$ of the galvanized steel spiral combustion air discharge chamber (CADC) conduit 263 is fluidly connected to any one of the one or more centralized combustion air blowers $273^{1+N}$ and the effluent end $263^2$ is fluidly connected to the energy co-generation assembly housing inner chamber 287 within the energy co-generation assembly housing of the any one of the one or more energy co-generation assemblies $211^{1+N}$, wherein the one or more of the externally mounted thermoelectric generation devices $259^{1+N}$ being consecutively adhered on at least one side of the combustion air discharge chamber (CADC) 262 providing a heat source for a hot side of the combustion air discharge chamber (CADC) 262, wherein the one or more of the externally mounted thermoelectric generation devices $259^{1+N}$ consecutively adhered, comprises a hot side heat transfer material 264, the thermoelectric generation module 258; and a cold side heat transfer material 265, a finned heat-sink 266, generating increased level of electricity as the temperature delta between the hot side and the cold side of the combustion air discharge chamber (CADC) 262 and the thermoelectric generation modules 258 increases;

121. 121 providing the one or more electrical energy distribution cables $270^{1+N}$ delivering a two way transfer of the electrical energy among a plurality of ex situ components, wherein the ex situ components, comprises the grid-based electric energy supply 282, the centralized electrical energy storage device 272, the one or more centralized primary electrical energy conditioning and distribution boxes $271^{1+N}$; and the one or more secondary electrical energy conditioning and distribution device $239^{1+N}$ located on the weatherproof fuel combustion enclosure housing 227;

122. 122 transferring electrical energy from the one or more combustion air discharge chamber-thermoelectric generation assemblies $257^{1+N}$ to the one or more centralized primary electrical energy conditioning and distribution boxes $271^{1+N}$, 123. 123 transferring electrical energy from the one or more energy co-generation assemblies $211^{1+N}$ and from the one or more auxiliary photovoltaic solar panels $267^{1+N}$ to the one or more secondary electrical energy conditioning and distribution devices $239^{1+N}$, 124. 124 providing a plurality of electrical energy transfers to the hybrid energy thermal remediation system 210 wherein the plurality of the electrical energy transfers, including: an electrical energy transfer from the grid-based electric energy supply 282 to the centralized electrical energy storage device 272 fully energizing the centralized electrical energy storage device 272, an electric energy transfer from the centralized electrical energy storage device 272 to the centralized primary electrical energy conditioning and distribution box $271^{1}$ of the one or more centralized primary electrical energy conditioning and distribution boxes $271^{1+N}$, an electric energy transfer from the centralized primary electrical energy conditioning and distribution box $271^{1}$ to the secondary electrical energy conditioning and distribution devices $239^{1}$ of the one or more secondary electrical energy conditioning and distribution devices $239^{1+N}$, an electric energy transfer from the centralized primary electrical conditioning and distribution box $271^{1}$ to the water deionization device 283, an electric energy transfer from the centralized primary electrical conditioning and distribution boxes $271^{1}$ to the hydrogen generating electrolyzer system 276, an electric energy transfer from the centralized primary electrical conditioning and distribution boxes $271^{1}$ to the centralized combustion air blower $273^{1}$ of the one or more centralized combustion air blowers $273^{1+N}$.

125. 125 determining periods of time characterized with low levels of the electrical energy for operation of the hybrid energy thermal remediation system 210 and determining periods of time characterized with surplus levels of the electrical energy for the operation of the hybrid energy thermal remediation system 210;

126. 126 providing a plurality of reverse energy transfers to the hybrid energy thermal remediation system 210; the plurality of reverse energy transfers, including: a reverse energy transfer from the one or more secondary electrical energy conditioning distribution devices $239^{1+N}$ to the centralized primary electrical energy conditioning and distribution boxes $271^{1+N}$ a reverse energy transfer from the centralized primary electrical energy conditioning distribution boxes $271^{1}$ to the centralized electrical energy storage device 272, and a reverse energy transfer from the centralized electrical energy storage device 272 onto the grid-based electric energy supply 282;

127. 127 converting a predetermined quantity of the heat energy from the fuel combustor 213 to electrical energy by way of the sealed thermoelectric generation units $251^{1+N}$ of the energy co-generation assembly $211^{1}$ and the sealed thermoelectric generation modules 258 of the combustion air discharge chamber-thermoelectric generation assemblies $257^{1+N}$;

128. 128 storing and conditioning the electrical energy in the centralized electrical energy storage device 272, the one or more centralized primary electrical energy conditioning and distribution boxes $271^{1+N}$, the one or more secondary electrical energy conditioning and distribution devices $239^{1+N}$.

129. 129 returning excess electrical energy from the one or more secondary electrical energy conditioning and distribution device $239^{1}$ device thereto the one or more centralized primary electrical energy conditioning and distribution boxes $271^{1+N}$ and thereto the electrical energy grid at the grid-based electric energy supply 282; and 130. 130 removing the hybrid energy thermal remediation system from the remediated impacted media.

As illustrated in FIGS. 2A-2B, in the exemplary embodiment to the method for heating a contaminant impacted media 222 for remediation of the contaminant impacted media 222 further comprises:

131. 131 providing a deionized water electrolyzing hydrogen generation system 275 wherein the deionized water electrolyzing hydrogen generation system 275 comprises a centralized electrical energy storage device 272, a deionized water electrolyzing hydrogen generation system 275, a water deionization device 283 having an inlet fluidly connected to the potable water source 305 and an outlet fluidly connected to a hydrogen generating electrolyzer system 276 by way of deionized water conveyance piping 284, a hydrogen generating electrolyzer system 276, a hydrogen gas storage unit 277, a centralized fuel blending unit 278, a combustible fuel distribution conveyance network 279, a combustible fuel supply 281, one or more auxiliary photovoltaic solar panels $267^{1+N}$;

132. 132 conveying the electric energy generated from each of the one or more Integrated thermoelectric co-generation devices (TEG) $214^{1+N}$ of the one or more energy co-generation assemblies $211^{1+N}$ and/or one or more externally mounted thermoelectric generation devices $259^{1+N}$ of the one or more combustion air discharge chamber-thermoelectric generation assemblies (CADC-TEG) $257^{1+N}$ to the deionized water electrolyzing hydrogen generation system 275 by way of the one or more centralized electrical energy distribution cables $270^{1+N}$, 133. 133 conveying a metered flow of deionized water supply from the water deionization device 283 through the deionized water conveyance piping 284 to the hydrogen generating electrolyzer system 276 of the deionized water electrolyzing hydrogen generation system 275 thereby providing a predetermined volume of deionized water $283^W$ being contained in the hydrogen generating electrolyzer system 276;
134. 134 passing the conveyed electric energy generated from the one or more integrated thermoelectric co-generation devices (TEG) $214^{1+N}$ and/or one or more externally mounted thermoelectric generation devices $259^{1+N}$ of the one or more combustion air discharge chamber-thermoelectric generation assemblies (CADC-TEG) $257^{1+N}$ through the predetermined volume of deionized water $283^W$ thereby actuating the electric energy from the hydrogen generating electrolyzer system 276 causing the decomposing of the deionized water producing oxygen gas ($O_2$) and hydrogen gas ($H_2$);
135. 135 storing the hydrogen gas ($H_2$) in the hydrogen gas storage unit 277;
136. 136 providing a sustainable source of an on-site hydrogen gas ($H_2$) supply;
137. 137 combining a combustible fuel from the combustible fuel supply 281 with the hydrogen gas ($H_2$) from the hydrogen gas storage unit 277 within the centralized fuel blending unit 278 providing a blended fuel mixture 301;
138. 138 supplying the blended fuel mixture 301 to each of the fuel combustors 213 of the one or more energy co-generation assemblies $211^{1+N}$,
139. 139 igniting the blended combustible fuels and hydrogen gas within the fuel combustor 213 causing a combustion reaction whereby cogenerating additional heat energy, combustion byproducts, and additional electric energy from the one or more integrated thermoelectric generation devices $124^{1+N}$ and/or one or more externally mounted thermoelectric generation devices $259^{1+N}$ of the one or more combustion air discharge chamber-thermoelectric generation assemblies (CADC-TEG) $257^{1+N}$ for use in the thermal remediation of contaminates from the volume of the contaminant impacted media 222; and
140. 140 removing the deionized water electrolyzing hydrogen generation system 275.

The method for heating a contaminant impacted media 222 for remediation of the contaminant impacted media 222 can employ an external electrical energy source which is selected from any one of the groups of external electrical energy sources consisting of non-renewable electrical energy, and renewable electrical energy. The non-renewable electrical energy is obtained from a grid-based electric energy supply 282. The renewable electrical energy is obtained from the one or more auxiliary photovoltaic solar panels $267^{1+N}$ and the one or more combustion air discharge chamber-thermoelectric generation assemblies (CADC-TEG) $257^{1+N}$.

The method for heating a contaminant impacted media 222 for remediation of the contaminant impacted media 222 the electric energy is co-generated electric energy by way of harvesting waste energy from the one or more energy co-generation assemblies $211^{1+N}$ and the one or more combustion air discharge-thermoelectric generation assemblies (CADC-TEG) $257^{1+N}$ and the combustible fuel includes non-renewable combustible fuel from grid-based energy, commercial sources, or renewable supplemental fuel from the hydrogen generating electrolyzer system 276. In another exemplary embodiment the combustible fuel consists of grid-based natural gas. In another exemplary embodiment of the present invention, the source of combustible fuel for the hybrid energy thermal remediation system 210 can comprise propane, gasoline, diesel or biodiesel.

In the method 100 for heating a contaminant impacted media 222 for remediation of the contaminant impacted media 222, the one or more combustion air diffusers $235^{1+N}$ are configured in a shape selected from the group consisting of a screw shape, a spiral shape, and a finned shape. The generation of the draft flow by way of the centralized combustion air blower $273^1$ of the one or more centralized combustion air blowers $273^{1+N}$ includes a forced draft flow or balanced draft flow by way of the one or more centralized combustion air blowers $273^{1+N}$.

In the method 100 for heating a contaminant impacted media 222 for remediation of the contaminant impacted media 222 the inner combustion air conduits 217 can extend a partial length of a total length of the media heating assembly devices $212^{D(1+N)}$; and the outer thermally conductive heating conduit 218 and annulus space 221' extends at least 10.00 feet beyond the combustion air conduit outlet portal 217" of the inner combustion air conduit 217. Each of the one or more media heating assembly devices $212^{D(1+N)}$ is configured with a length of at least 25.00 feet. Each of the one or more media heating assembly devices $212^{D(1+N)}$ is configured with a length of about 75.00 feet. Each of the one or more media heating assembly devices $212^{D(1+N)}$ is configured with a length within the range of having a minimum foot of 75.00 feet and a maximum feet of 200.00 feet.

In an exemplary embodiment of the method 100 of heating a contaminant impacted media 222 for remediation of the contaminant impacted media 222, the heat energy input from the hybrid energy thermal remediation system 210 into the contaminant impacted media 222 within the influence of the hybrid energy thermoelectric remediation system increases the temperature of the contaminants within the impacted media increases such that the contaminants undergo one or more abiotic or biotic contaminant remediation mechanisms resulting in contaminant removal through, degradation, destruction, or favorable alteration thereby remediating the contaminants from the identified volume of contaminant impacted media 222.

With reference to FIGS. 3-4, 9, and 11-12 the method heating a contaminant impacted media 222 for remediation of the contaminant impacted media 222 includes identifying the volume of contaminant impacted media 222 for remediation 102. Once identified, at least one hybrid energy thermal remediation assembly (HETR) 210 is provided for method for heating the contaminant impacted media 222 for remediation of the contaminant impacted media 222 thereby causing remediation of contaminants from the identified contaminant impacted media 104. In an exemplary embodiment of the present invention, the hybrid energy thermal remediation system (HETR) 210 including the one or more energy co-generation assemblies $211^{1+N}$ wherein each of the one or more energy co-generation assembly $211^{1+N}$ having the fuel combustor 213 and the integrated thermoelectric generation device (TEG) $214^{1+N}$ being installed ex situ and each of the one or more energy co-generation assemblies $211^{1+N}$ being attached to a corresponding media heating assembly device $212^{1+N}$ of the one or more media heating assembly devices $212^{1+N}$ wherein the one or more media heating assembly devices $212^{1+N}$ is connected at, or above, grade with an energy co-generation assembly housing 215 using by way of the flanged collar 242.

Electrical power supply from the grid-based electric energy supply 282, or a connection to auxiliary source(s) s of continuous electrical power such as a combustion based generator or generator set, or renewable based electrical power system is provided to the one or more energy co-generation assemblies $211^{1+N}$, along with a supply of combustible fuel from a grid based supply, portable storage based supply, a renewable energy based supply, or a hybrid supply from a combination of any of the aforementioned sources, to the one or more fuel combustors $213^{1+N}$ of the one or more energy co-generation assemblies $211^{1+N}$.

Combustible fuel is supplied into the one or more fuel combustors $213^{1+N}$ of the one or more energy co-generation assemblies $211^{1+N}$, where it is ignited by the fuel ignitor 230 producing the sustained source of heat energy from the resulting combustion reaction being discharged by the burner nozzle 229 into the one or more one or more energy co-generation assembly combustion air conduits $231^{1+N}$ and one or more heat tubes $244^{1+N}$ of the one or more integrated thermoelectric generation devices (TEG) $214^{D(1+N)}$ of the one or more energy co-generation assemblies $215^{1+N}$.

Heat energy moves through each of the one or more energy co-generation assembly combustion air conduits $231^{1+N}$ and each of the one or more heat tubes $244^{1+N}$ by way of the forced draft flow, induced draft flow, or balanced draft flow, generated by the one or more centralized combustion air blowers $273^{1+N}$. Heat energy on a side of the integrated thermoelectric generation device (TEG) $214^{1+N}$ is dissipated by one or more heat exchangers $233^{1+N}$ integrated into the energy co-generation assembly housing 215, creating a heat energy delta across the stack of the semiconductor-based thermocouples $232^{1+N}$ of the one or more integrated thermoelectric generating devices (TEG) $214^{1+N}$. Heat energy delta(s) across the stack of semiconductor-based thermocouples $232^{1+N}$ force diffusion of charge carriers towards the cold side of the one or more integrated thermoelectric generation devices (TEG) $214^{1+N}$ creating a voltage potential and generate electrical current and voltage, thereby, producing electrical power.

Further, heat energy and combustion air byproducts from the one or more fuel combustors $213^{1+N}$ move through the bottom aperture 304 of the energy co-generation assembly housing 215 and discharge into the inner combustion air conduit inlet portal 217' of the inner combustion air conduit 217 of the corresponding media heating assembly device $212^{D(1)}$ of the one or more media heating assembly devices $212^{D(1+N)}$ of the one or more media heating assemblies $212^{1+N}$ through the inner combustion air conduit outlet portal 217" of the inner combustion air conduit 217 and travelling upwards through the outer thermally conductive heating conduit 218 by way of the flow generated from the one or more centralized combustion air blowers $273^{1+N}$. Heat energy, as combustion reaction byproduct(s), is transferred to the outer thermally conductive heating conduit 218 by conductive and convective heat transfer as combustion air is moved through the interior of the outer thermally conductive heating conduit 218 flowing out the combustion air exhaust aperture 225 and through the combustion air discharge conduit 226 and through to the one or more centralized combustion air discharge stacks $274^{1+N}$ by forced draft, induced draft, or balanced draft flow from the one or more centralized combustion air blowers $273^{1+N}$.

The electric power from the one or more integrated thermoelectric generation devices (TEG) $214^{1+N}$ is distributed to the one or more secondary electrical energy conditioning and distribution devices $239^{1+N}$, or to the one or more centralized primary electrical energy conditioning and distribution boxes $271^{1+N}$ and the centralized electrical energy storage device 272, or the battery 238 of each of the one or more energy co-generation assemblies $211^{1+N}$ where the electric power is used to power the electrical components of the hybrid energy thermal remediation system 210, or be distributed to the one or more electrically resistive heating units $219^{1+N}$ of the one or more media heating assembly devices $212^{D(1+N)}$ based on temperature readings from the one or more external temperature monitoring thermocouples $223^{1+N}$ and predefined temperature setpoints in the programmable logic controller 224 being housed in the weatherproof electrical connection box 241.

The one or more external temperature monitoring thermocouples $223^{1+N}$ is placed within the heat tolerant thermally conductive annulus fill 221 of each of the one or more media heating assemblies $212^{1+N}$. The programmable logic controller 224 can use temperature setpoints to limit, supply, control, or stop electrical power delivery to each of the one or more electrically resistive heating units $219^{1+N}$, thereby automating the optimization of the hybrid energy thermal remediation system 210 heat output and performance.

The one or more electrically resistive heating units $219^{1+N}$ generates heat as the resistive material resists the flow of electrical current being applied by the one or more secondary electrical energy conditioning and distribution devices $239^{1+N}$, or to the one or more centralized primary electrical energy conditioning and distribution boxes $271^{1+N}$ causing an expression of heat based on work done by the charge carriers as they move to a lower potential. The additional heat energy generated by the electrical power applied to the one or more electrically resistive heating unit $219^{1+N}$ is then transferred to the outer thermally conductive heating conduit 218 by thermal conduction, convection, and radiative heat transfer. Heat energy which has been transferred to the outer thermally conductive heating conduit 218 by both the combustive and resistive sources of heat energy, is then transferred to the heat tolerant thermally conductive annulus fill 221 and then again to the contaminant impacted media 222 by means of thermal conduction.

The transfer of heat energy to the contaminant impacted media 222 causing the surrounding media to increase in temperature as heat energy is propagated radially outward from the hybrid energy thermal remediation device, as dictated by the thermal conductivity of said media(s) 132. The increase in temperature of the media within the radius of thermodynamic influence of the hybrid energy thermal remediation device is remediated by one or more abiotic or biotic mechanisms engendered by increased heat energy causing contaminant removal, degradation, destruction, or favorable alteration of contaminants within the contaminant impacted media 222.

The method 100 for heating a contaminant impacted media 222 for remediation of the contaminant impacted media 222 involves the temporary installation and operation of the hybrid energy thermal remediation system 210, and all devices and constructions related to the method having the hybrid energy thermal remediation system 210, and all devices and constructions removed once the contaminant impacted media 222 has been remediated to the remedial objectives of each implementation of the method 100. FIGS. 2A-2B presents further steps 133-142 in the method 100 for remediating identified region(s) of contaminant impacted media 222 using the hybrid energy thermal remediation system 210. The hybrid energy thermal remediation system 210 further includes, with reference to FIG. 12, the deionized water electrolyzing hydrogen generation system 275. The deionized water electrolyzing hydrogen generation system 275 is commercially available to be readily implemented with the hybrid energy thermal remediation system 210.

The deionized water electrolyzing hydrogen generation system 275 comprises a hydrogen generating electrolyzer system 276, a hydrogen gas storage unit 277, a centralized fuel blending unit 278; and a potable water source 305, a water deionization device 283, deionized water conveyance piping 284. In this exemplary embodiment, electric power generated from the one or more integrated thermoelectric generation devices (TEG) $214^{1+N}$ and/or one or more externally mounted thermoelectric generation devices $259^{1+N}$ of the one or more combustion air discharge chamber-thermoelectric generation assemblies (CADC-TEG) $257^{1+N}$ is conveyed to the deionized water electrolyzing hydrogen generation system 275 by one or more electrical energy distribution cables $270^{1+N}$ and one or more centralized primary electrical energy conditioning and distribution boxes $271^{1+N}$ and batteries $238^{1+N}$.

Deionized water is supplied to the deionized water electrolyzing hydrogen generation system 275. The deionized water electrolyzing hydrogen generation system 275 including the hydrogen generating electrolyzer system 276 utilizes electrical power from the one or more integrated thermoelectric generation devices (TEG) $214^{1+N}$ and/or one or more externally mounted thermoelectric generation devices $259^{1+N}$ of the one or more combustion air discharge chamber-thermoelectric generation assemblies (CADC-TEG) $257^{1+N}$ and deionized water from the potable water source 305 and decomposes the deionized water through electrolysis, producing byproducts of oxygen gas as oxygen ($O_2$) and hydrogen gas ($H_2$).

The hydrogen gas ($H_2$) generated through electrolysis is transferred to the hydrogen gas storage unit 277. Stored hydrogen gas is then blended with the natural gas supply in the centralized fuel blending unit 278 of the deionized water electrolyzing hydrogen generation system 275 before being supplied back to the one or more energy co-generation assemblies $211^{1+N}$ for combustion in the one or more fuel combustors $213^{1+N}$ thereby cogenerating further heat and electric energy for use in thermal remediation of contamination of the contaminant impacted media 222. The method 100 is repeated as required to complete remediation of the contaminant impacted media 222.

Heat energy which has been transferred to the outer thermally conductive heating conduit 218 by the combustive sources of heat energy, is then transferred to the heat tolerant thermally conductive annulus fill 221 and then again to the contaminant impacted media 222 by way of thermal conduction. The transfer of heat energy to the contaminant impacted media 222 causes the surrounding media to increase in temperature as heat energy is propagated radially outward from the hybrid energy thermal remediation system 210 as dictated by the thermal conductivity of contaminant impacted media 222. The increase in temperature of the impacted contaminant media 222 within the radius of thermodynamic influence of the hybrid energy thermal remediation system (HETR) 210 is remediated by one or more abiotic or biotic mechanisms engendered by increased heat energy causing contaminant removal, degradation, destruction, or favorable alteration of contaminants within said contaminant impacted media 222. This process including steps 101-140 repeats until remediation of said contaminant impacted media 222 is complete and the one or more hybrid energy thermal remediation system 210 and the deionized water electrolyzing hydrogen generation system 275 is removed.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies and systems found in the marketplace, or to enable others of ordinary skill in the art to understand the embodiments disclosed herein.

What is claimed is:

1. A method for heating a contaminant impacted media for remediation of the contaminant impacted media, the method comprising:
   1. identifying a volume of the contaminant impacted media;
   2. providing a hybrid energy thermal remediation system for remediating the volume of the contaminant impacted media;
   wherein, the hybrid energy thermal remediation system comprises:
      an external electrical energy source;
      one or more energy co-generation assembly housings;
      one or more energy co-generation assemblies;
      one or more media heating assemblies;
      one or more media heating assembly devices;
      one or more combustion air discharge chamber-thermoelectric generation assemblies;
      one or more galvanized steel spiral combustion air discharge chamber conduits;
      one or more centralized combustion air blowers;
      one or more centralized combustion air discharge stacks;
      a combustible fuel supply;
      a combustible fuel distribution conveyance network;
      a grid-based electrical energy supply;
      a potable water source;
      a water deionization device;
      a hydrogen generating electrolyzer system;
      a centralized fuel blending unit;
      one or more centralized primary electrical energy conditioning and distribution boxes;
      one or more secondary electrical energy conditioning and distribution devices;
      a centralized electrical energy storage device;
      one or more auxiliary photovoltaic solar panels;
      one or more electrical energy distribution cables; and
      one or more programmable logic controllers;
   wherein, each of the one or more energy co-generation assemblies comprises:
      a secondary electrical energy conditioning and distribution device of the one or more secondary electrical energy conditioning and distribution devices;
      a weatherproof fuel combustor enclosure;
      a controllable primary combustion air aperture disposed within the weatherproof fuel combustor enclosure;
      a fuel combustor;
      one or more energy co-generation assembly combustion air conduits wherein each of the one or more energy co-generation assembly combustion air conduits includes a proximal end and a distal end;

a battery; and a series of indicator lights for displaying a status of the energy co-generation assembly;

wherein the fuel combustor is fluidly connected to an energy co-generation assembly housing inner chamber of the one or more energy co-generation assembly housings by way of a double flanged top connector;

wherein the energy co-generation assembly housing of each of the one or more energy co-generation assembly housings comprises:

an outer peripheral wall and an inner peripheral wall securing the energy co-generation assembly housing inner chamber;

one or more combustion air diffusers disposed on the inner peripheral wall of the energy co-generation assembly housing;

a burner nozzle;

a fuel igniter;

one or more heat tubes integrated with one or more heat tube combustion air diffusers;

one or more heat exchangers;

three apertures, the three apertures comprises:
a top aperture;
an induced air aperture; and
a bottom aperture;

wherein the top aperture is disposed at a proximal end of the energy co-generation assembly housing providing a fluid connection to the energy co-generation assembly housing inner chamber allowing the one or more energy co-generation assembly combustion air conduits, the burner nozzle, and the fuel ignitor to extend through an upper portion of the energy co-generation assembly housing inner chamber;

wherein the induced air aperture is disposed in an upper side portion of the energy co-generation assembly housing fluidly connected to the energy co-generation assembly housing inner chamber;

wherein the bottom aperture is disposed at a distal end of the energy co-generation assembly housing and is connected to a media heating assembly device of the one of the one or more media heating assembly devices such that the energy co-generation assembly housing inner chamber of the energy co-generation assembly housing is fluidly connected to an inner combustion air conduit of the media heating assembly devices of the one or more media heating assemblies by way of a flanged collar;

wherein each of the energy co-generation assembly combustion air conduits of the one or more energy co-generation assembly combustion air conduits is positioned congruent to a corresponding heat tube of the one or more heat tubes being terminated at a single rim in a lower portion of the energy co-generation assembly housing inner chamber;

one or more heat shielding components;

wherein the one or more heat shielding components comprises:

refractory materials applied to an angled lower portion of the energy co-generation assembly housing inner chamber;

one or more refractory cement conduit seals anchored by one or more cast in-place anchoring bolts located at an upper proximal end of the energy co-generation assembly housing inner chamber of the energy co-generation assembly housing;

one or more combustion air diffusers affixed to the inner peripheral wall of the energy co-generation assembly housing inner chamber of each of the one or more energy co-generation assembly housings;

one or more integrated thermoelectric generation devices;

wherein an integrated thermoelectric generation device of each of the one or more integrated thermoelectric generation devices comprises:

one or more sealed thermoelectric generation units including a hot side and a cold side to generate electrical energy;

wherein each of the one or more sealed thermoelectric generation units comprises:

a stack of semiconductor-based thermocouples;

wherein the stack of semiconductor-based thermocouples comprises:

an alternating series of +N− semiconductor materials and −P+ semiconductor materials each joined electrically to one or more hot side electrodes and to one or more cold side electrodes;

wherein the one or more hot side electrodes insulated by an electric insulator being disposed between the stack of semiconductor-based thermocouples and a thermally conductive high temperature compatible material disposed on a corresponding energy co-generation assembly combustion air conduit of the one or more energy co-generation assembly combustion air conduits;

whereby the hot side of the integrated thermoelectric generation device is formed proximate to the corresponding energy co-generation assembly combustion air conduit;

wherein the thermally conductive high temperature material being disposed between the electrical insulator and the corresponding energy co-generation assembly combustion air conduit, wherein the energy co-generation assembly combustion air conduit being disposed congruent to the corresponding heat tube of the one or more heat tubes;

wherein the cold side electrodes are insulated by the electric insulator being disposed between the stack of semiconductor-based thermocouples and an operationally connected heat exchanger of the one or more heat exchangers;

whereby the cold side of the integrated thermoelectric generation device is formed proximate to the operationally connected heat exchangers of the one or more heat exchangers;

wherein a thermally conductive low temperature compatible material is disposed between the one or more cold side electrodes associated with the stack of semiconductor-based thermocouples and the operationally connected heat exchanger whereby the cold side of the integrated thermoelectric generation device is formed proximate to the operationally connected heat exchangers;

wherein the media heating assembly device of each of the one or more media heating assembly devices comprises:

a flanged collar connector cap;

the inner combustion air conduit configured with an inner combustion air conduit inlet portal and an inner combustion air conduit outlet portal;

an outer thermally conductive heating conduit;

a combustion air discharge conduit fluidly connected to a combustion air exhaust aperture located on a proximal end of the outer thermally conductive heating conduit;

one or more electrically resistive heating units;

one or more combustion air deflectors disposed between the inner combustion air conduit outlet portal of the media heating assembly device and a proximal edge of the electrically resistive heating unit of the media heating assembly device;

a heat tolerant electrically conductive low resistivity electrical cable and connections;

an annulus space;

a heat tolerant thermally conductive annulus fill;

one or more external temperature monitoring thermocouples located within the heat tolerant thermally conductive annulus fill of the annulus space;

a weatherproof electrical connection box electrically operationally configured with electric connections to the one or more electrically resistive heating units and the one or more programmable logic controllers;

3. producing a cylindrical opening within the volume of the contaminant impacted media, having the cylindrical opening extending a length of at least 1.00 foot beyond a length of each of the one or more media heating assembly devices;

4. installing the media heating assembly device of the one or more media heating assembly devices within the cylindrical opening;

5. positioning the one or more external temperature monitoring thermocouples within the annulus space between the outer thermally conductive heating conduit and the contaminant impacted media;

6. sealing the annulus space with the heat tolerant thermally conductive annulus fill thereby securing the outer thermally conductive heating conduit thereby preventing hot vapors formed along exterior walls of the outer thermally conductive heating conduit during a heating process from exiting the volume of the contaminant impacted media;

7. positioning the one or more electrically resistive heating units and the heat tolerant electrically conductive low resistivity electrical cable and connections within the annulus space existing between the inner combustion air conduit and the outer thermally conductive heating conduit such that the one or more electrically resistive heating units are occupying a maximum of 20% of the annulus space at any given interval of length;

8. fluidly connecting the media heating assembly device of the one or more media heating assembly devices to the energy co-generation assembly housing inner chamber of the energy co-generation assembly housing by way of the flanged collar and the flanged collar connector cap such that the flanged collar connector cap seals a proximal end of the outer thermally conductive heating conduit from the energy co-generation assembly housing inner chamber of the energy co-generation assembly housing contemporaneously providing a fluid connection between the inner combustion air conduit and the energy co-generation assembly housing inner chamber of the energy co-generation assembly housing;

9. connecting the one or more electrically resistive heating units located within the media heating assembly device of the one or more media heating assembly devices to a corresponding electrical connection and a corresponding programmable logic controller of the one or more programmable logic controllers housed within the weatherproof electrical connection box thereby actuating the distribution of electrical energy from an electrically operationally connected energy co-generation assembly of the one or more energy co-generation assemblies to the one or more electrically resistive heating units;

10. managing electrical energy distribution by way of the corresponding programmable logic controller to temperature setpoints and temperature readings from the one or more external temperature monitoring thermocouple placed within the heat tolerant thermally conductive annulus fill encasing the media heating assembly device;

11. introducing combustible fuel from the combustible fuel supply into the fuel combustor of the energy co-generation assembly wherein the fuel combustor is fluidly connected to the inner chamber of the energy co-generation assembly housing inner chamber of the energy co-generation assembly housing of the integrated thermoelectric generation device;

12. igniting the combustible fuel with the fuel ignitor causing a combustion reaction producing fuel combustion heating providing a sustained source of heat energy and combustion byproducts being introduced into the identified volume of contaminant impacted media;

13. generating an induced draft flow by way of a centralized combustion air blower of the one or more centralized combustion air blowers being fluidly connected to the energy co-generation assembly housing inner chamber of the energy co-generation assembly housing of the integrated thermoelectric generation device of the one or more integrated thermoelectric generation devices of the one or more energy co-generation assemblies thereby moving the heat energy through the energy co-generation assembly through each of the one or more energy co-generation assembly combustion air conduits and each of the one or more heat tubes such that the heat energy and the combustion byproducts within the energy co-generation assembly combustion air conduits create a hot side on each of the one or more sealed thermoelectric generation units within the energy co-generation assembly housing inner chamber of the energy co-generation assembly housing of each of the one or more integrated thermoelectric generation devices;

14. dissipating heat energy away from the hot side of the one or more sealed thermoelectric generation units creating a cold side of each of the one or more sealed thermoelectric generation units causing causes a heat energy delta across the one or more sealed thermoelectric generation units forcing a diffusion of electric carriers towards the cold side of the one or more sealed thermoelectric generation units creating a voltage potential such that the voltage potential causing the one or more sealed thermoelectric generation units to generate electrical energy;

15. introducing the heat energy and combustion byproducts from the fuel combustor to the inner combustion air conduit inlet portal of the inner combustion air conduit of the media heating assembly device pulled by way of the induced draft flow of the centralized combustion air blower of the one or more centralized combustion air blowers through the inner-combustion air conduit outlet portal of the inner combustion air conduit and upward through the outer thermally conductive heating conduit exiting the combustion air exhaust aperture and through the combustion air discharge conduit such that the heat energy and combustion byproducts transfer heat energy to an exterior surface of the outer thermally conductive heating conduit by way of convective heat transfer, wherein when the temperature of the outer thermally conductive heating conduit increases heat energy is transferred by convective heat transfer to the volume of the contaminant impacted media;

16. augmenting the fuel combustion heating by distributing electrical energy generated within the energy generated within the energy co-generation assembly of the one or more energy co-generation assemblies to the one or more electrically resistive heating units such that temperatures of the one or more electrically resistive heating units resists a flow of direct current (DC);

wherein the electrical energy generated by the integrated thermoelectric generation devices is dump or diversion loaded as direct current (DC) from the one or more secondary electrical energy conditioning and distribution devices directly into the one or more electrically resistive heating units such that the temperature of the one or more electrically resistive heating units increases to a range of 100 to 1200 degrees centigrade as the one or more electrically resistive heating units resist the flow of direct current providing supplemental heat energy at discrete intervals along a length of the outer thermally conductive heating conduit;

17. transferring heat and co-generated electrical energy from the outer thermally conductive heating conduit through to the heat tolerant thermally conductive annulus fill of the annulus space and through the volume of the contaminant impacted media by way of thermal conduction thereby causing reduction of contaminants within the volume of the contaminant impacted media and affecting remediation of the volume of the contaminant impacted media thereby providing a remediated impacted media;

18. providing the combustion air discharge chamber-thermoelectric generation assembly of the one or more combustion air discharge chamber-thermoelectric generation assemblies;

19. positioning the combustion air discharge chamber-thermoelectric generation assembly between the energy co-generation assembly and the centralized combustion air blower;

20. utilizing a portion of abeyant heat energy flowing through the combustion air discharge chamber-thermoelectric generation assembly prior to expelling the portion of the abeyant heat energy into the external atmosphere by way of the one or more centralized combustion air discharge stacks;

wherein each of the one or more combustion air discharge chamber-thermoelectric generation assemblies comprises:
  a combustion air discharge chamber having a rectangular shape;
  a plurality of externally mounted thermoelectric generation devices;
  a finned heat-sink for creating a cold side of a thermoelectric generation module;
  a ventilated enclosure with one or more air circulation fans to remove heat from the finned heat-sink;

wherein the combustion air discharge chamber is constructed with thermally conductive temperature compatible metal, the combustion air discharge chamber including a galvanized steel spiral combustion air discharge chamber conduit of the one or more galvanized steel spiral combustion air discharge chamber conduits having an influent end and an effluent end, the galvanized steel spiral combustion air discharge chamber conduit passing longitudinally through the center of the combustion air discharge chamber;

wherein, the influent end of the galvanized steel spiral combustion air discharge chamber conduit is fluidly connected to any one of the one or more centralized combustion air blowers and the effluent end is fluidly connected to the energy co-generation assembly housing inner chamber within the energy co-generation assembly housing of the any one of the one or more energy co-generation assemblies;

wherein the plurality of externally mounted thermoelectric generation devices being consecutively adhered on at least one side of the combustion air discharge chamber providing a heat source for a hot side of the combustion air discharge chamber;

wherein the plurality of externally mounted thermoelectric generation devices consecutively adhered comprises a hot side heat transfer material, the thermoelectric generation module, and a cold side heat transfer material, generating increased level of electricity as the temperature delta between the hot side and the cold side of the combustion air discharge chamber and the thermoelectric generation modules increases;

21. providing the one or more electrical energy distribution cables delivering a two-way transfer of the electrical energy among a plurality of ex situ components;
wherein the plurality of ex situ components comprises:
  the grid-based electrical energy supply;
  the centralized electrical energy storage device;
  the one or more centralized primary electrical energy conditioning and distribution boxes; and
  the one or more secondary electrical energy conditioning and distribution device located on a weatherproof fuel combustion enclosure housing;

22. transferring electrical energy from the one or more combustion air discharge chamber-thermoelectric generation assemblies to the one or more centralized primary electrical energy conditioning and distribution boxes;

23. transferring electrical energy from the one or more energy co-generation assemblies and from the one or more auxiliary photovoltaic solar panels to the one or more secondary electrical energy conditioning and distribution devices;

24. providing a plurality of electrical energy transfers to the hybrid energy thermal remediation system;
wherein the plurality of the electrical energy transfers comprises:
  an electrical energy transfer from the grid-based electrical energy supply to the centralized electrical energy storage device fully energizing the centralized electrical energy storage device;
  an electric energy transfer from the centralized electrical energy storage device to the centralized primary electrical energy conditioning and distribution box of the one or more centralized primary electrical energy conditioning and distribution boxes;
  an electric energy transfer from the centralized primary electrical energy conditioning and distribution box to the secondary electrical energy conditioning and distribution devices of the one or more secondary electrical energy conditioning and distribution devices;
  an electric energy transfer from the centralized primary electrical energy conditioning and distribution box to the water deionization device;

an electric energy transfer from the centralized primary electrical energy conditioning and distribution boxes to the hydrogen generating electrolyzer system;
an electric energy transfer from the centralized primary electrical energy conditioning and distribution boxes to the centralized combustion air blower of the one or more centralized combustion air blowers;
25. determining periods of time characterized with low levels of the electrical energy for operation of the hybrid energy thermal remediation system, and determining periods of time characterized with surplus levels of the electrical energy for the operation of the hybrid energy thermal remediation system;
26. providing a plurality of reverse energy transfers to the hybrid energy thermal remediation system;
wherein the plurality of reverse energy transfers includes:
a reverse energy transfer from the one or more secondary electrical energy conditioning and distribution devices to the centralized primary electrical energy conditioning and distribution boxes;
a reverse energy transfer from the centralized primary electrical energy conditioning and distribution boxes to the centralized electrical energy storage device; and
a reverse energy transfer from the centralized electrical energy storage device onto the grid-based electric energy supply;
27. converting a predetermined quantity of the heat energy from the fuel combustor to electrical energy by way of the one or more sealed thermoelectric generation units of the energy co-generation assembly and the thermoelectric generation modules of the one or more combustion air discharge chamber-thermoelectric generation assemblies;
28. storing and conditioning the electrical energy in the centralized electrical energy storage device, the one or more primary electrical energy conditioning and distribution boxes, and the one or more secondary electrical energy conditioning and distribution devices;
29. returning excess electrical energy from the one or more secondary electrical energy conditioning and distribution devices to the one or more primary electrical energy conditioning and distribution boxes and to the electrical energy grid at the grid-based electric energy supply; and
30. removing the hybrid energy thermal remediation system from the remediated impacted media.

2. The method for remediating the contaminant impacted media for the remediation of the contaminant impacted media of claim 1 further comprises:
31. providing a deionized water electrolyzing hydrogen generation system operationally electrically connected to the centralized electrical energy storage device by way of the one or more electrical energy distribution cables;
wherein the deionized water electrolyzing hydrogen generation system comprises:
the water deionization device having an inlet fluidly connected to the potable water source and an outlet fluidly connected to a hydrogen generating electrolyzer system by way of a deionized water conveyance piping;
a hydrogen generating electrolyzer system;
a hydrogen gas ($H_2$) storage unit;
a centralized fuel blending unit;
a combustible fuel distribution conveyance network;
the combustible fuel supply; and
the one or more auxiliary photovoltaic solar panels;
32. conveying the electric energy generated from each of the one or more integrated thermoelectric generation devices of the one or more energy co-generation assemblies and/or the one or more externally mounted thermoelectric generation devices of the one or more combustion air discharge chamber-thermoelectric generation assemblies to the deionized water electrolyzing hydrogen generation system by way of the one or more electrical energy distribution cables;
33. conveying a metered flow of deionized water supply from the water deionization device through the deionized water conveyance piping to the hydrogen generating electrolyzer system of the deionized water electrolyzing hydrogen generation system thereby providing a predetermined volume of deionized water being contained in the hydrogen generating electrolyzer system;
34. passing the conveyed electric energy generated from the one or more integrated thermoelectric generation device(s) and/or one or more externally mounted thermoelectric generation devices of the one or more combustion air discharge chamber-thermoelectric generation assemblies through the predetermined volume of deionized water thereby actuating the electric energy from the hydrogen generating electrolyzer system causing the decomposing of the deionized water producing oxygen gas ($O_2$) and hydrogen gas ($H_2$);
35. storing the hydrogen gas ($H_2$) in the hydrogen gas ($H_2$) storage unit;
36. providing a sustainable source of an on-site hydrogen gas ($H_2$) supply;
37. combining a combustible fuel from the fuel supply with the hydrogen gas ($H_2$) from the hydrogen gas ($H_2$) storage unit within the centralized fuel blending unit providing a blended fuel mixture;
38. supplying the blended fuel mixture to the fuel combustor;
39. igniting the blended combustible fuels and hydrogen gas ($H_2$) within the fuel combustor causing a combustion reaction whereby cogenerating additional heat energy, combustion byproducts, and additional electric energy from the one or more integrated thermoelectric generation devices and/or one or more externally mounted thermoelectric generation devices of the one or more combustion air discharge chamber-thermoelectric generation assemblies for use in the thermal remediation of contaminates within the volume of the contaminant impacted media; and
40. removing the deionized water electrolyzing hydrogen generation system.

3. The method for heating the contaminant impacted media for remediation of the contaminant impacted media of claim 1, wherein the external electrical energy source is selected from any one of the group of external electrical energy sources consisting of non-renewable electrical energy, and renewable electrical energy wherein:
the non-renewable energy is obtained from a grid based electrical energy supply; and
the renewable energy is obtained from the auxiliary photovoltaic solar panels and one or more combustion air discharge chamber-thermoelectric generation assemblies.

4. The method for heating the contaminant impacted media for remediation of the contaminant impacted media of claim 1, wherein the electric energy is co-generated electric energy by way of harvesting waste energy from the one or more energy co-generation assemblies and the one or more combustion air discharge chamber-thermoelectric generation assemblies.

5. The method for heating the contaminant impacted media for remediation of the contaminant impacted media of claim 1, wherein, the combustible fuel includes non-renewable combustible fuel from grid-based energy, commercial sources, or renewable supplemental fuel from the hydrogen generating electrolyzer system.

6. The method for heating the contaminant impacted media for remediation of the contaminant impacted media of claim 1, wherein the one or more combustion air diffusers are configured in a shape selected from the group consisting of a screw shape, a spiral shape, and a finned shape.

7. The method for heating the contaminant impacted media for remediation of the contaminant impacted media of claim 1, wherein generating the draft flow by way of the centralized combustion air blower of the one or more combustion air blowers includes a forced draft flow or balanced draft flow by way of the one or more combustion air blowers.

8. The method for heating the contaminant impacted media for remediation of the contaminant impacted media of claim 1, wherein:
the inner combustion air conduit extends a partial length of a total length of the media heating assembly device; and
the outer thermally conductive heating conduit and annulus space extends at least 10.00 feet beyond the combustion air conduit outlet portal of the inner combustion air conduit.

9. The method for heating the contaminant impacted media for remediation of the contaminant impacted media of claim 1, wherein each of the one or more media heating assembly devices is configured with a length of at least 25.00 feet.

10. The method for heating the contaminant impacted media for remediation of the contaminant impacted media of claim 1, wherein each of the one or more media heating assembly devices is configured with a length of about 75.00 feet.

11. The method for heating the contaminant impacted media for remediation of the contaminant impacted media of claim 1, wherein each of the one or more media heating assembly devices is configured with a length within the range of 75 feet to 200 feet.

12. The method for heating the contaminant impacted media for remediation of the contaminant impacted media of claim 1, wherein the one or more heat exchangers is selected from the group consisting of one or more bent liquid filled gravity pipe heat exchangers, and one or more finned plate air-cooled heat exchangers.

13. A hybrid energy thermal remediation system for remediation of contaminant impacted media, the hybrid energy thermal remediation system comprises:
an external electrical energy source;
one or more energy co-generation assembly housings;
one or more energy co-generation assemblies;
one or more media heating assemblies;
one or more media heating assembly devices;
one or more combustion air discharge chamber-thermoelectric generation assemblies;
one or more galvanized steel spiral combustion air discharge chamber conduits;
one or more centralized combustion air blowers;
one or more centralized combustion air discharge stacks;
a combustible fuel supply;
a combustible fuel distribution conveyance network;
a grid-based electrical energy supply;
a potable water source;
a water deionization device;
a hydrogen generating electrolyzer system;
a centralized fuel blending unit;
one or more primary centralized electrical energy conditioning and distribution boxes;
one or more secondary electrical energy conditioning and distribution devices;
a centralized electrical energy storage device;
one or more auxiliary photovoltaic solar panels;
one or more electrical energy distribution cables;
one or more programmable logic controllers;
wherein the external electrical energy source is selected from the group consisting of non-renewable electrical energy, and renewable electrical energy;
wherein the non-renewable electrical energy is obtained from the grid-based electrical energy supply wherein the grid-based electrical energy supply is operationally electrically connected to the centralized electrical energy storage device by way of an electrical energy distribution cable of the one or more electrical energy distribution cables being operationally electrically connected to a centralized primary electrical energy conditioning and distribution box of the one or more centralized primary electrical energy conditioning and distribution boxes and operationally connected to a secondary electrical energy conditioning and distribution device of the one or more secondary electrical energy conditioning and distribution devices associated with a weatherproof fuel combustor enclosure of an energy co-generation assembly of the one or more energy co-generation assemblies;
wherein the renewable electrical energy is obtained from an auxiliary photovoltaic solar panel of the one or more of the auxiliary photovoltaic solar panels and a combustion air discharge chamber-thermoelectric generation assembly of the one or more combustion air discharge chamber-thermoelectric generation assemblies;
wherein the auxiliary photovoltaic solar panel of the one or more of the auxiliary photovoltaic solar panels is constructed on top of the energy co-generation assembly of the one or more energy co-generation assemblies operationally connected to the weatherproof fuel combustor enclosure of the energy co-generation assembly;
wherein the combustion air discharge chamber-thermoelectric generation assembly of the one or more combustion air discharge chamber-thermoelectric generation assemblies is fluidly connected to a combustion air exhaust aperture and combustion air discharge conduit of a thermally conductive heating conduit of the energy co-generation assembly of the one or more energy co-generation assemblies;
wherein any one of the one or more energy co-generation assemblies comprises:
a secondary electrical energy conditioning and a distribution device of the one or more secondary electrical energy conditioning and distribution devices;
a weatherproof fuel combustor enclosure housing;

a controllable primary combustion air aperture disposed within the weatherproof fuel combustor enclosure;
a fuel combustor housed within the weatherproof fuel combustor enclosure housing; one or more energy co-generation assembly combustion air conduits wherein each of the one or more energy co-generation assembly combustion air conduits includes
a proximal end and a distal end;
a battery; and
a series of indicator lights mounted on top of the battery for displaying a status of an energy co-generation assembly of the one or more energy co-generation assemblies;
wherein the battery is disposed on top of the weatherproof fuel combustor enclosure housing of an energy co-generation assembly of the one or more energy co-generation assemblies where electric energy generated by the hybrid energy thermal remediation system is conveyed to the battery and is stored within the battery;
wherein the fuel combustor is fluidly connected to any one of the one or more energy co-generation assembly housings by way of a double flanged top connector;
wherein any one of the one or more energy co-generation assembly housings comprises:
an outer peripheral wall and an inner peripheral wall securing an energy co-generation assembly housing inner chamber;
one or more combustion air diffusers is disposed on the inner peripheral wall of the any one of the one or more energy co-generation assembly housings;
a burner nozzle;
a fuel igniter;
one or more heat tubes;
one or more heat exchangers;
three apertures, the three apertures comprises:
 a top aperture;
 an induced air aperture; and
 a bottom aperture;
wherein the top aperture is disposed at a proximal end of the energy co-generation assembly housing providing a fluid connection to the energy co-generation assembly housing inner chamber allowing the one or more of the energy co-generation assembly combustion air conduits, the burner nozzle, and the fuel igniter to extend through an upper portion of the energy cogeneration assembly housing inner chamber;
wherein any one of the energy co-generation assembly combustion air conduits of the one or more energy co-generation assembly combustion air conduits is positioned congruent to a corresponding heat tube of the one or more heat tubes being terminated at a single rim in a lower portion of the energy co-generation assembly housing inner chamber;
one or more heat shielding components;
wherein the one or more heat shielding components comprises
 refractory materials applied to an angled lower portion of the energy co-generation assembly housing inner chamber;
 one or more refractory cement conduit seals anchored by one or more cast in-place anchoring bolts located at an upper proximal end of the energy co-generation assembly housing inner chamber of the energy co-generation assembly housing;
 one or more combustion air diffusers affixed to the inner peripheral wall of the energy co-generation assembly housing inner chamber;
one or more intergraded integrated thermoelectric generation devices;
wherein any one of the one or more integrated thermoelectric generation devices comprises:
 one or more sealed thermoelectric generation units including a hot side and a cold side to generate electrical energy;
wherein each of the one or more sealed thermoelectric generation units comprises:
 a stack of semiconductor-based thermocouples;
 wherein the stack of semiconductor-based thermocouples comprises:
  an alternating series of +N− semiconductor materials and −P+ semiconductor materials each joined electrically to one or more hot side electrodes and to one or more cold side electrodes;
 wherein the one or more hot side electrodes insulated by an electric insulator being disposed between the stack of semiconductor-based thermocouples and the any one of the one or more energy co-generation assembly combustion air conduits whereby the hot side of the integrated thermoelectric generation device is formed proximate to the any one of the one or more energy co-generation assembly combustion air conduits;
 wherein the cold side electrodes insulated by the electric insulator being disposed between the stack of semiconductor-based thermocouples and any one of the one or more heat exchangers whereby the cold side of the integrated thermoelectric generation device is formed proximate to the any one of the one or more heat exchangers;
 wherein a thermally conductive high temperature compatible material is disposed between the electrical insulator and the any one of the one or more energy co-generation assembly combustion air conduits being congruent to the corresponding heat tube;
 wherein a thermally conductive low temperature compatible material is disposed between the one or more cold side electrodes and the any one of the one or more heat exchangers;
wherein the induced air aperture is disposed in an upper side portion of the energy co-generation assembly housing fluidly connected to the energy co-generation assembly housing inner chamber;
wherein the bottom aperture is disposed at a distal end of the energy co-generation assembly housing and is connected to any one of the one or more media heating assembly devices of the one or more media heating assemblies such that energy co-generation assembly housing inner chamber is fluidly connected to an inner combustion air conduit of the any one of the one or more media heating assembly devices of the one or more media heating assemblies by way of a flanged collar;
wherein any one of the one or more media heating assemblies comprises:
a flanged collar connector cap;
the inner combustion air conduit;
an outer thermally conductive heating conduit;
wherein a media heating assembly device of the one or more media heating assembly devices is fluidly connected to the energy co-generation assembly housing inner chamber of the one or more energy co-generation assembly housings by way of the flanged collar connector cap such that the flanged collar connector cap seals a proximal end of the outer thermally conductive heating conduit from the energy co-generation assembly housing inner chamber of the one or more energy co-generation assembly housings contemporaneously providing a fluid connection between the inner combustion air conduit and the energy co-generation assembly housing inner chamber of the one or more energy co-generation assembly housings;

wherein the outer thermally conductive heating conduit extends at least 10.00 feet beyond an inner combustion air conduit outlet portal of the inner combustion air conduit;

a combustion air discharge conduit fluidly connected to the combustion air exhaust aperture located on a proximal end of the outer thermally conductive heating conduit;

wherein the combustion air is discharged through the combustion air exhaust aperture venting into the combustion air discharge conduit being directed into a fluidly connected combustion air discharge chamber-thermoelectric generation assembly of the one or more combustion air discharge chamber-thermoelectric generation assemblies;

one or more combustion air deflectors is disposed between an inner combustion air conduit outlet portal of the one or more media heating assembly devices, and a proximal edge of an electrically resistive heating unit of the one or more media heating assembly devices;

a heat tolerant electrically conductive low resistivity electrical cable and connections; one or more electrically resistive heating units;

wherein an electrically resistive heating unit of the one or more electrically resistive heating units includes a combustion air deflector of the one or more combustion air deflectors at the end of the electrically resistive heating unit of the one or more electrically resistive heating units disposed proximal to the inner combustion air conduit outlet portal of the inner combustion air conduit, connected electrically to the energy co-generation assembly through the heat tolerant electrically conductive low resistivity electrical cable and connections;

an annulus space disposed between the outer thermally conductive heating conduit and the contaminated impacted media;

a heat tolerant thermally conductive annulus fill;

one or more external temperature monitoring thermocouples located within the heat tolerant thermally conductive annulus fill of the annulus space;

a weatherproof electrical connection box electrically operationally configured with electric connections to the one or more electrically resistive heating units and the one or more programmable logic controllers;

wherein each of the one or more combustion air discharge chamber-thermoelectric generation assemblies comprises:

a combustion air discharge chamber having a rectangular shape;

a plurality of externally mounted thermoelectric generation devices;

a finned heat-sink for creating a cold side of a thermoelectric generation module;

a ventilated enclosure with one or more air circulation fans to remove heat from the finned heat-sink;

wherein the combustion air discharge chamber is constructed with thermally conductive temperature compatible metal, the combustion air discharge chamber including a galvanized steel spiral combustion air discharge chamber conduit of the one or more galvanized steel spiral combustion air discharge chamber conduits having an influent end and an effluent end, the galvanized steel spiral combustion air discharge chamber conduit passing longitudinally through the center of the combustion air discharge chamber;

wherein the influent end of the galvanized steel spiral combustion air discharge chamber conduit is fluidly connected to a centralized combustion air blower of the one or more centralized combustion air blowers and the effluent end is fluidly connected to the energy co-generation assembly housing inner chamber within the energy co-generation assembly housing of the energy co-generation assembly of the one or more energy co-generation assemblies;

wherein a centralized combustion air discharge stack of the one or more centralized combustion air discharge stacks is fluidly connected to the centralized combustion air blower of the one or more centralized combustion air blowers where waste combustion air is discharged through the centralized combustion air discharge stack of the one or more centralized combustion air discharge stacks;

wherein the plurality of externally mounted thermoelectric generation devices being consecutively adhered on at least one side of the combustion air discharge chamber providing a heat source for a hot side of the combustion air discharge chamber whereby an increased level of electricity is generated as a temperature delta between the hot side of the combustion air discharge chamber and the cold side of the combustion air discharge chamber and the thermoelectric generation modules;

wherein the plurality of externally mounted thermoelectric generation devices includes:

a hot side heat transfer material;

the thermoelectric generation module; and a cold side heat transfer material;

the one or more electrical energy distribution cables delivering a two-way transfer of the electrical energy among a plurality of ex situ components;

wherein the ex situ components comprises:

the grid-based electrical energy supply;

the centralized electrical energy storage device;

the one or more primary centralized electrical energy conditioning and distribution boxes;

the one or more secondary electrical energy conditioning and distribution devices located on the weatherproof fuel combustor enclosure housing;

a deionized water electrolyzing hydrogen generation system;

wherein the deionized water electrolyzing hydrogen generation system comprises:

the centralized electrical energy storage device;

the water deionization device having an inlet fluidly connected to the potable water source and an outlet fluidly connected to a hydrogen generating electrolyzer system by way of a deionized water conveyance piping;

the hydrogen generating electrolyzer system;

a hydrogen gas ($H_2$) storage unit;

the centralized fuel blending unit;

the combustible fuel distribution conveyance network;

the combustible fuel supply; and the one or more auxiliary photovoltaic solar panels; and wherein the deionized water electrolyzing hydrogen generation system is operationally connected to the centralized electric energy storage device by way of the one or more electrical energy distribution cables, the hydrogen gas (H2) storage unit fluidly connected to the centralized fuel blending unit and the combustible fuel supply being fluidly connected to the combustible fuel distribution conveyance network, and an auxillary photovoltaic solar panel of the one or more auxiliary photovoltaic solar panels is disposed on top of the hydrogen generating electrolyzer system.

\* \* \* \* \*